DATA ABSTRACT RECORDING MACHINES

Filed June 1, 1964 36 Sheets-Sheet 1

INVENTORS.
LOUIS A. SMITZER
ADOLPH J. GAWIN
ANDREW BALINT
ROBERT F. PORAZINSKI
PAUL G. BIELIK

BY Hill, Sherman, Meroni, Gross & Simpson Attys.

DATA ABSTRACT RECORDING MACHINES

Filed June 1, 1964 36 Sheets-Sheet 2

INVENTORS.
LOUIS A. SMITZER
ADOLPH J. GAWIN
ANDREW BALINT
ROBERT F. PORAZINSKI
PAUL G. BIELIK
BY Hill, Sherman, Meroni, Gross & Simpson Attys.

INVENTORS.
LOUIS A. SMITZER
ADOLPH J. GAWIN
ANDREW BALINT
ROBERT F. PORAZINSKI
PAUL G. BIELIK

BY Hill, Sherman, Meroni, Gross & Simpson Attys.

INVENTORS.
LOUIS A. SMITZER
ADOLPH J. GAWIN
ANDREW BALINT
ROBERT F. PORAZINSKI
PAUL G. BIELIK

BY Hill, Sherman, Meroni, Gross & Simpson ATTYS.

INVENTORS.
LOUIS A. SMITZER
ADOLPH J. GAWIN
ANDREW BALINT
ROBERT F. PORAZINSKI
PAUL G. BIELIK

BY Hill, Sherman, Meroni, Gross & Simpson ATTYS.

INVENTORS.
LOUIS A. SMITZER
ADOLPH J. GAWIN
ANDREW BALINT
ROBERT F. PORAZINSKI
PAUL G. BIELIK
BY Hill, Sherman, Meroni, Gross & Simpson ATTYS.

DATA ABSTRACT RECORDING MACHINES

Filed June 1, 1964 56 Sheets-Sheet 7

INVENTORS.
LOUIS A. SMITZER
ADOLPH J. GAWIN
ANDREW BALINT
ROBERT F. PORAZINSKI
PAUL G. BIELIK

BY Hill, Sherman, Meroni, Gross & Simpson

DATA ABSTRACT RECORDING MACHINES

Filed June 1, 1964

INVENTORS.
LOUIS A SMITZER
ADOLPH J. GAWIN
ANDREW BALINT
ROBERT F. PORAZINSKI
PAUL G. BIELIK

BY Hill, Sherman, Meroni, Gross & Simpson ATTYS.

INVENTORS.
LOUIS A. SMITZER
ADOLPH J. GAWIN
ANDREW BALINT
ROBERT F. PORAZINSKI
PAUL G. BIELIK

BY Hill, Sherman, Meroni, Gross & Simpson ATTYS.

INVENTORS.
LOUIS A. SMITZER
ADOLPH J. GAWIN
ANDREW BALINT
ROBERT F. PORAZINSKI
PAUL G. BIELIK

BY Hill, Sherman, Meroni, Gross & Simpson ATTYS.

INVENTORS.
LOUIS A. SMITZER
ADOLPH J. GAWIN
ANDREW BALINT
ROBERT F. PORAZINSKI
PAUL G. BIELIK

BY Hill, Sherman, Meroni, Gross & Simpson ATTYS.

INVENTORS.
LOUIS A. SMITZER
ADOLPH J. GAWIN
ANDREW BALINT
ROBERT F. PORAZINSKI
PAUL G. BIELIK

BY Hill, Sherman, Meroni, Gross & Simpson Attys.

DATA ABSTRACT RECORDING MACHINES

Filed June 1, 1964 36 Sheets-Sheet 13

INVENTORS.
LOUIS A. SMITZER
ADOLPH J. GAWIN
ANDREW BALINT
ROBERT F. PORAZINSKI
PAUL G. BIELIK

BY Hill, Sherman, Meroni, Gross & Simpson ATTYS

INVENTORS.
LOUIS A. SMITZER
ADOLPH J. GAWIN
ANDREW BALINT
ROBERT F. PORAZINSKI
PAUL G. BIELIK
BY Hill, Sherman, Meroni, Gross & Simpson ATTYS.

DATA ABSTRACT RECORDING MACHINES

Filed June 1, 1964

INVENTORS.
LOUIS A. SMITZER
ADOLPH J. GAWIN
ANDREW BALINT
ROBERT F. PORAZINSKI
PAUL G. BIELIK

BY Hill, Sherman, Meroni, Gross & Simpson ATTYS.

INVENTORS.
LOUIS A. SMITZER
ADOLPH J. GAWIN
ANDREW BALINT
ROBERT F. PORAZINSKI
PAUL G. BIELIK
BY Hill, Sherman, Meroni, Gross & Simpson Attys.

INVENTORS.
LOUIS A. SMITZER
ADOLPH J. GAWIN
ANDREW BALINT
ROBERT F. PORAZINSKI
PAUL G. BIELIK

BY Hill, Sherman, Meroni, Gross & Simpson Att'ys.

DATA ABSTRACT RECORDING MACHINES

Filed June 1, 1964

INVENTORS.
LOUIS A. SMITZER
ADOLPH J. GAWIN
ANDREW BALINT
ROBERT F. PORAZINSKI
PAUL G. BIELIK

BY Hill, Sherman, Meroni, Gross & Simpson Attys.

INVENTORS.
LOUIS A. SMITZER
ADOLPH J. GAWIN
ANDREW BALINT
ROBERT F. PORAZINSKI
PAUL G. BIELIK
BY Hill, Sherman, Meroni, Gross & Simpson ATTYS.

INVENTORS.
LOUIS A. SMITZER
ADOLPH J. GAWIN
ANDREW BALINT
ROBERT F. PORAZINSKI
PAUL G. BIELIK
BY Hill, Sherman, Meroni, Gross & Simpson ATT'YS INVENTORS.
LOUIS A. SMITZER
ADOLPH J. GAWIN
ANDREW BALINT
ROBERT F. PORAZINSKI
PAUL G. BIELIK BY Hill, Sherman, Meroni, Gross & Simpson ATTYS.

INVENTORS.
LOUIS A. SMITZER
ADOLPH J. GAWIN
ANDREW BALINT
ROBERT F. PORAZINSKI
PAUL G. BIELIK
BY Hill, Sherman, Meroni, Gross & Simpson ATTYS.

DATA ABSTRACT RECORDING MACHINES

INVENTORS.
LOUIS A. SMITZER
ADOLPH J. GAWIN
ANDREW BALINT
ROBERT F. PORAZINSKI
PAUL G. BIELIK

BY Hill, Sherman, Meroni, Gross & Simpson ATTYS.

DATA ABSTRACT RECORDING MACHINES

Filed June 1, 1964 36 Sheets-Sheet 24

INVENTORS.
LOUIS A. SMITZER
ADOLPH J. GAWIN
ANDREW BALINT
ROBERT F. PORAZINSKI
PAUL G. BIELIK

BY Hill, Sherman, Meroni, Gross & Simpson ATTYS.

DATA ABSTRACT RECORDING MACHINES

Filed June 1, 1964

INVENTORS.
LOUIS A. SMITZER
ADOLPH J. GAWIN
ANDREW BALINT
ROBERT F. PORAZINSKI
PAUL G. BIELIK

Hill, Sherman, Meroni, Gross & Simpson Attys.

INVENTORS.
LOUIS A. SMITZER
ADOLPH J. GAWIN
ANDREW BALINT
ROBERT F. PORAZINSKI
PAUL G. BIELIK

BY Hill, Sherman, Meroni, Gross & Simpson Attys.

INVENTORS.
LOUIS A. SMITZER
ADOLPH J. GAWIN
ANDREW BALINT
ROBERT F. PORAZINSKI
PAUL G. BIELIK

BY Hill, Sherman, Meroni, Gross & Simpson ATTYS.

DATA ABSTRACT RECORDING MACHINES

Filed June 1, 1964 36 Sheets-Sheet 28

INVENTORS.
LOUIS A. SMITZER
ADOLPH J. GAWIN
ANDREW BALINT
ROBERT F. PORAZINSKI
PAUL G. BIELIK

BY Hill, Sherman, Meroni, Gross & Simpson ATTYS.

INVENTORS.
LOUIS A. SMITZER
ADOLPH J. GAWIN
ANDREW BALINT
ROBERT F. PORAZINSKI
PAUL G. BIELIK

BY Hill, Sherman, Meroni, Gross & Simpson Attys

Nov. 28, 1967 L. A. SMITZER ETAL 3,354,774

DATA ABSTRACT RECORDING MACHINES

Filed June 1, 1964 36 Sheets-Sheet 30

INVENTORS.
LOUIS A. SMITZER
ADOLPH J. GAWIN
ANDREW BALINT
ROBERT F. PORAZINSKI
PAUL G. BIELIK

BY Hill, Sherman, Meroni, Gross & Simpson ATTYS.

Nov. 28, 1967 L. A. SMITZER ETAL 3,354,774

DATA ABSTRACT RECORDING MACHINES

Filed June 1, 1964 36 Sheets-Sheet 31

INVENTORS.
LOUIS A. SMITZER
ADOLPH J. GAWIN
ANDREW BALINT
ROBERT F. PORAZINSKI
PAUL G. BIELIK

BY Hill, Sherman, Meroni, Gross & Simpson Att'ys

DATA ABSTRACT RECORDING MACHINES

Filed June 1, 1964 36 Sheets-Sheet 32

INVENTORS.
LOUIS A. SMITZER
ADOLPH J. GAWIN
ANDREW BALINT
ROBERT F. PORAZINSKI
PAUL G. BIELIK

BY Hill, Sherman, Meroni, Gross & Simpson ATTYS.

DATA ABSTRACT RECORDING MACHINES

Filed June 1, 1964 36 Sheets-Sheet 33

INVENTORS.
LOUIS A. SMITZER
ADOLPH J. GAWIN
ANDREW BALINT
ROBERT F. PORAZINSKI
PAUL G. BIELIK
BY Hill, Sherman, Meroni, Gross & Simpson ATTYS.

INVENTORS.
LOUIS A. SMITZER
ADOLPH G. GAWIN
ANDREW BALINT
ROBERT F. PORAZINSKI
PAUL G. BIELIK

BY Hill, Sherman, Meroni, Gross & Simpson ATTYS.

DATA ABSTRACT RECORDING MACHINES
Filed June 1, 1964 36 Sheets-Sheet 35
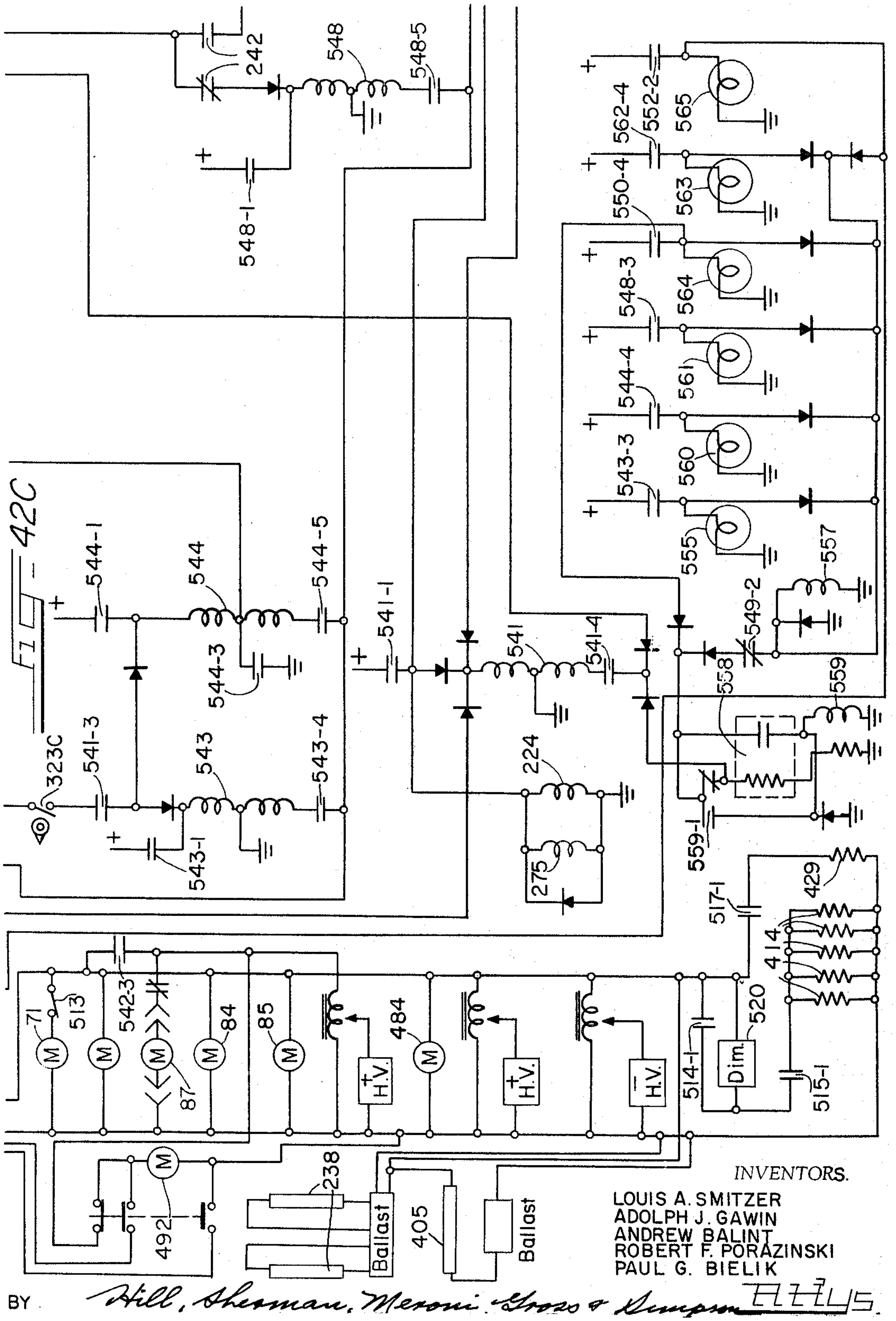
INVENTORS.
LOUIS A. SMITZER
ADOLPH J. GAWIN
ANDREW BALINT
ROBERT F. PORAZINSKI
PAUL G. BIELIK
BY *Hill, Sherman, Meroni, Gross & Simpson* ATTYS.

INVENTORS.
LOUIS A. SMITZER
ADOLPH J. GAWIN
ANDREW BALINT
ROBERT F. PORAZINSKI
PAUL G. BIELIK
BY
BY Hill, Sherman, Meroni, Gross & Simpson ATTYS.

3,354,774

DATA ABSTRACT RECORDING MACHINES

Louis A. Smitzer, Chicago, Adolph J. Gawin, Skokie, Andrew Balint, Park Ridge, Robert F. Porazinski, Norridge, and Paul G. Bielik, North Riverside, Ill., assignors to Bell & Howell Company, Chicago, Ill., a corporation of Illinois Filed June 1, 1964, Ser. No. 371,633
62 Claims. (Cl. 88—24)

This invention relates to improvements in machines for reproducing documentary information automatically and at relatively high speed in convenient form for efficient storage in and retrieval from information files, and more particularly concerns such machines in which the information, exemplified by comprehensive data abstracts contained on master documents, is reproduced in reduced size on available space on convenient file cards, in any desired number of copies.

Information storage and retrieval has assumed increasing importance with the vast proliferation of useful intelligence, much of which may be lost or at least difficult to find for reference unless readily available through an efficient system of retrievably stored information. Much progress has been made in punched-card index systems. Typically, in such a system when a document is available carrying information which is desirably referenced in the retrieval system, an analyst prepares a master document or cover sheet which outlines various facts concerning the document such as source, contents, classification, distribution, etc. From this master document, a further shortened abstract may be prepared and typed onto one or more electronic accounting machine cards key punched with appropriate holes representing certain descriptor terms and to be placed in an index file adapted to be interrogated for retrieval of information associated with certain descriptors by selection of the matching cards.

Where a substantial number of cards was needed for various departmental distribution or because of numerous possible classifications of the subject matter, and the like, time consuming and tedious typing was involved, with the ever present possibility of typing errors. Probably more importantly, however, the further shortening of the already brief abstracts often makes it difficult to determine whether the abstracted document is sufficiently relevant to warrant retrieval from a master storage file.

An important object of the present invention is to provide new and improved apparatus for reproducing on convenient file cards, such as the more or less standard electronic accounting machine cards, substantially reduced but complete images of an original or master document.

Another object of the invention is to provide a new and improved machine which will automatically handle master or original documents as well as punchcards, and the like, on which small scale images of the original documents are to be reproduced.

A further object of the invention is to provide new and improved apparatus for automatically selectively reproducing as many identical images of a master document as needed on successive storage and retrieval file cards.

Still another object of the invention is to provide a new and improved machine to process at a high rate of speed information storage and retrieval cards with complete, reduced size images of master document data thereon.

Yet another object of the invention is to provide in a machine of the character described, novel correlated mechanisms and control means for sequentially handling master documents, and cards on which an image of the information recorded on the master document is reproduced in the machine.

Further objects of the invention include:

provision of a novel document handling mechanism and controls therefor comprising document feeder;

provision of improved card handling mechanism and controls;

provision of new and improved mechanism and controls for processing the images on the cards;

provision of new and improved means for detecting and taking action in respect to various possible malfunctions that may result from variables, defects, misalignments, and the like, involved in the documents and cards supplied to the machine.

Other objects, features and advantages of the present invention will be readily apparent from the following detailed description of certain preferred embodiments thereof, taken in conjunction with the accompanying drawings, in which.

Figure 2:
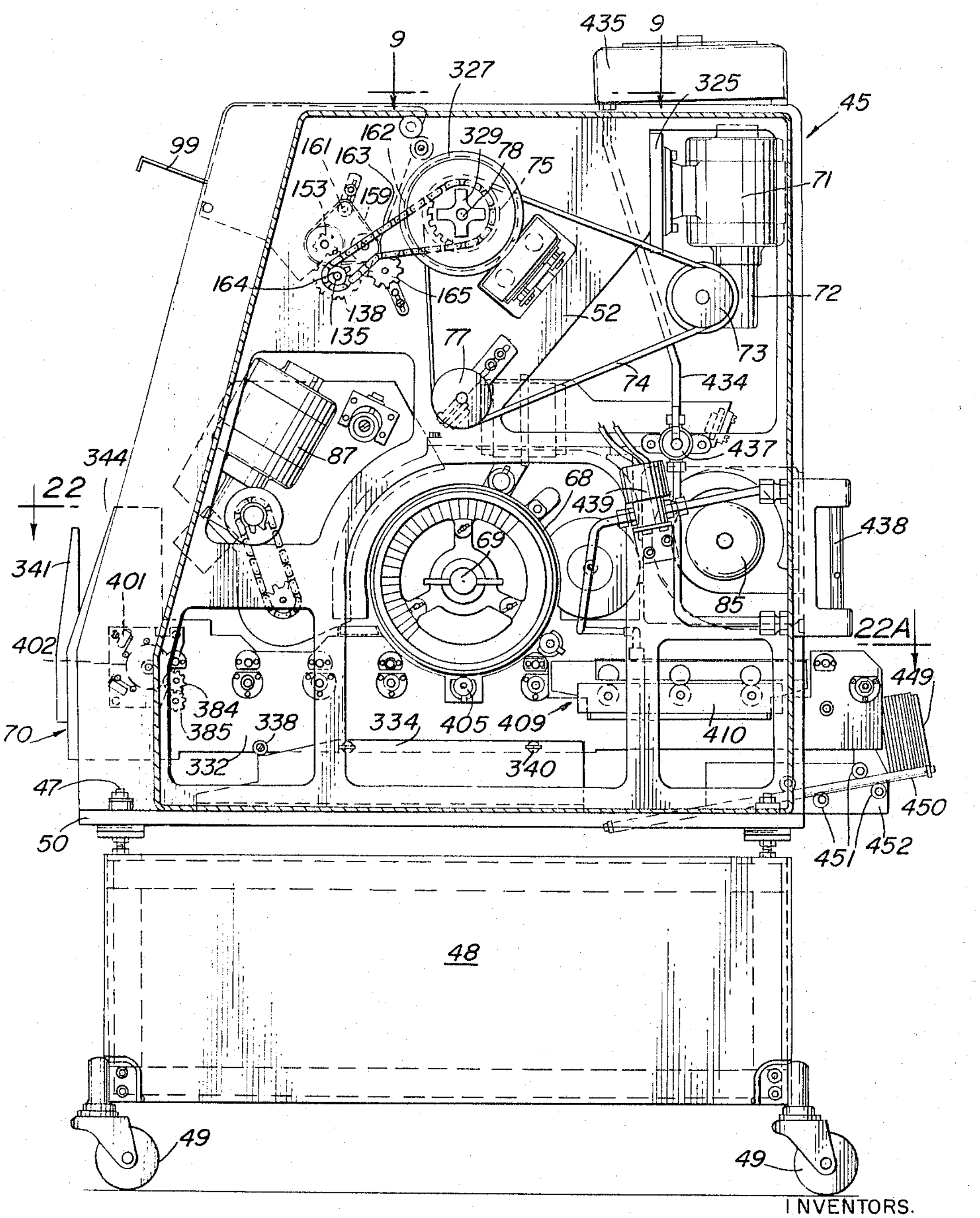
FIGURE 2 is a right side elevational sectional detail view taken substantially on the line 2—2 of FIGURE 1.
Figure 4:
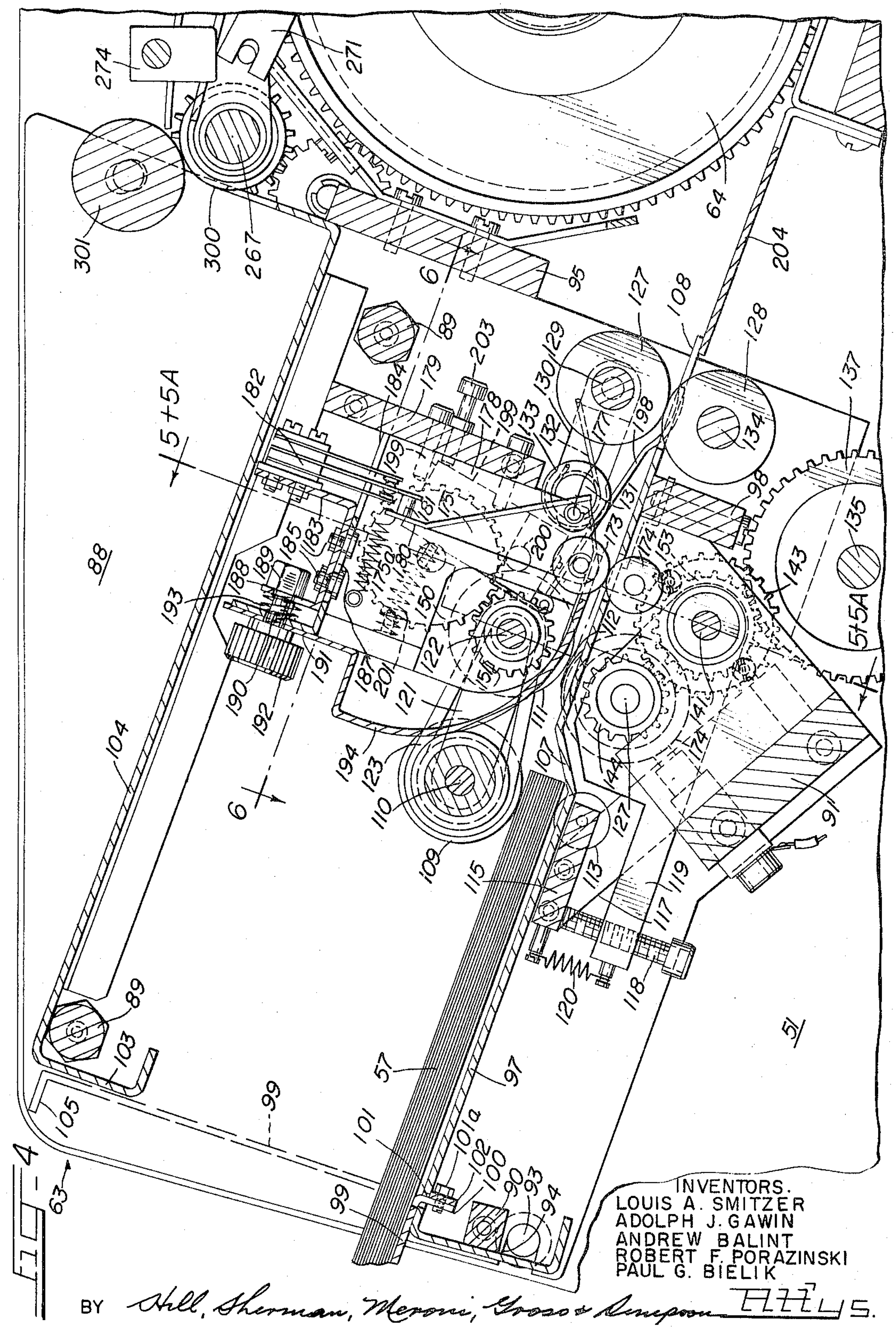
FIGURE 4 is an enlarged fragmentary vertical sectional elevational detail view taken substantially on the line 4—4 of FIGURE 1.
Figure 5:
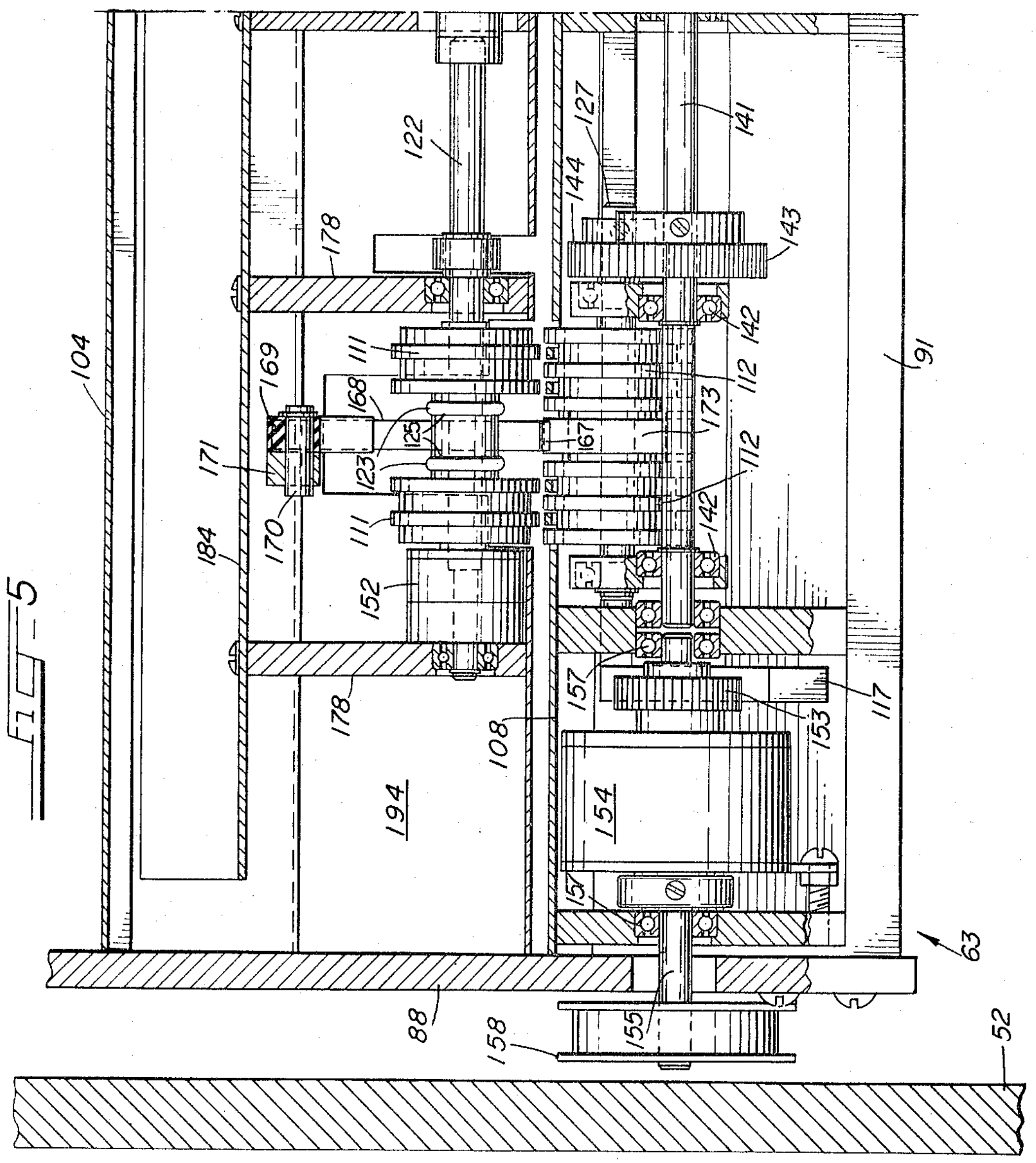
Figure 5A:
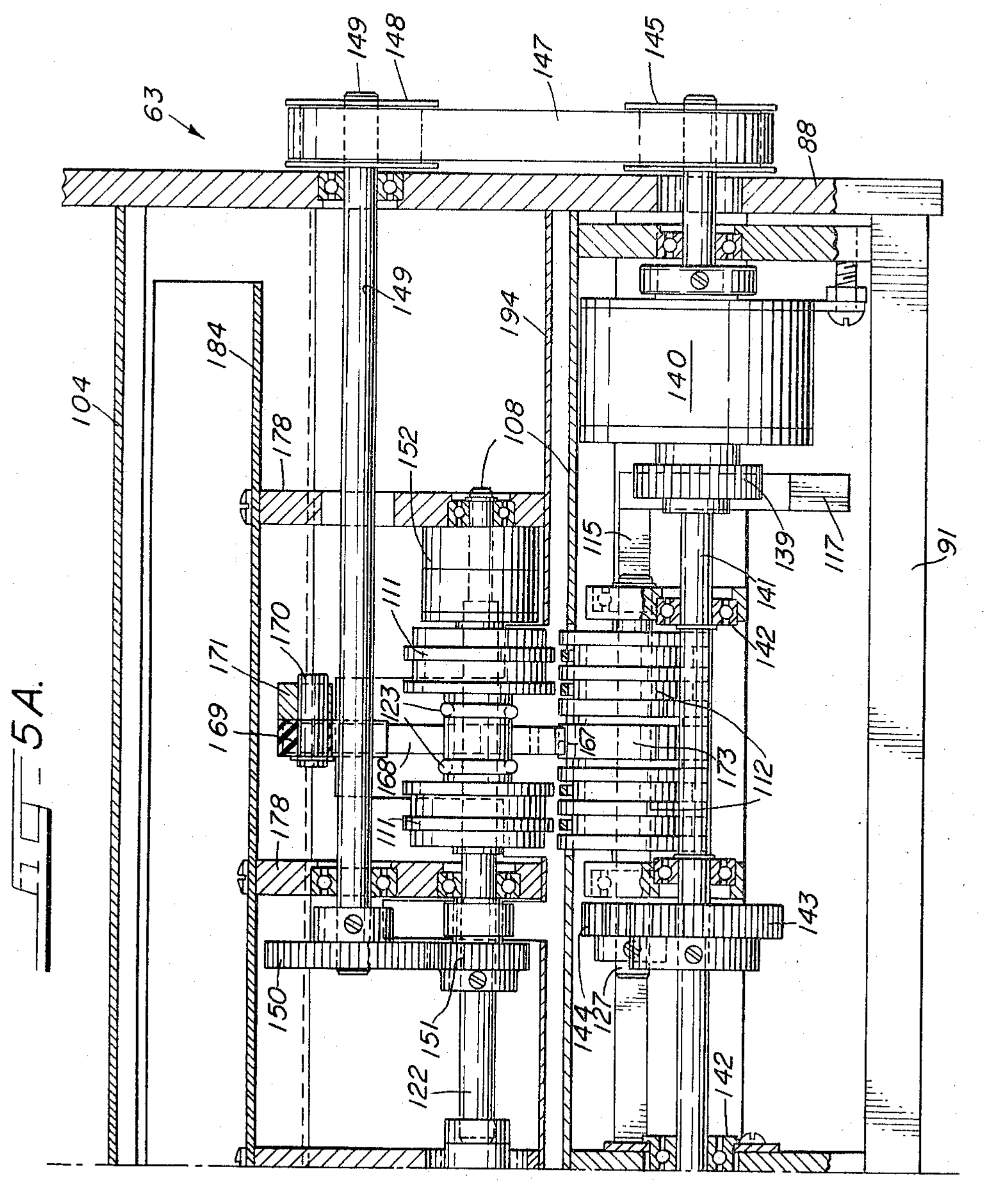
Figure 6:
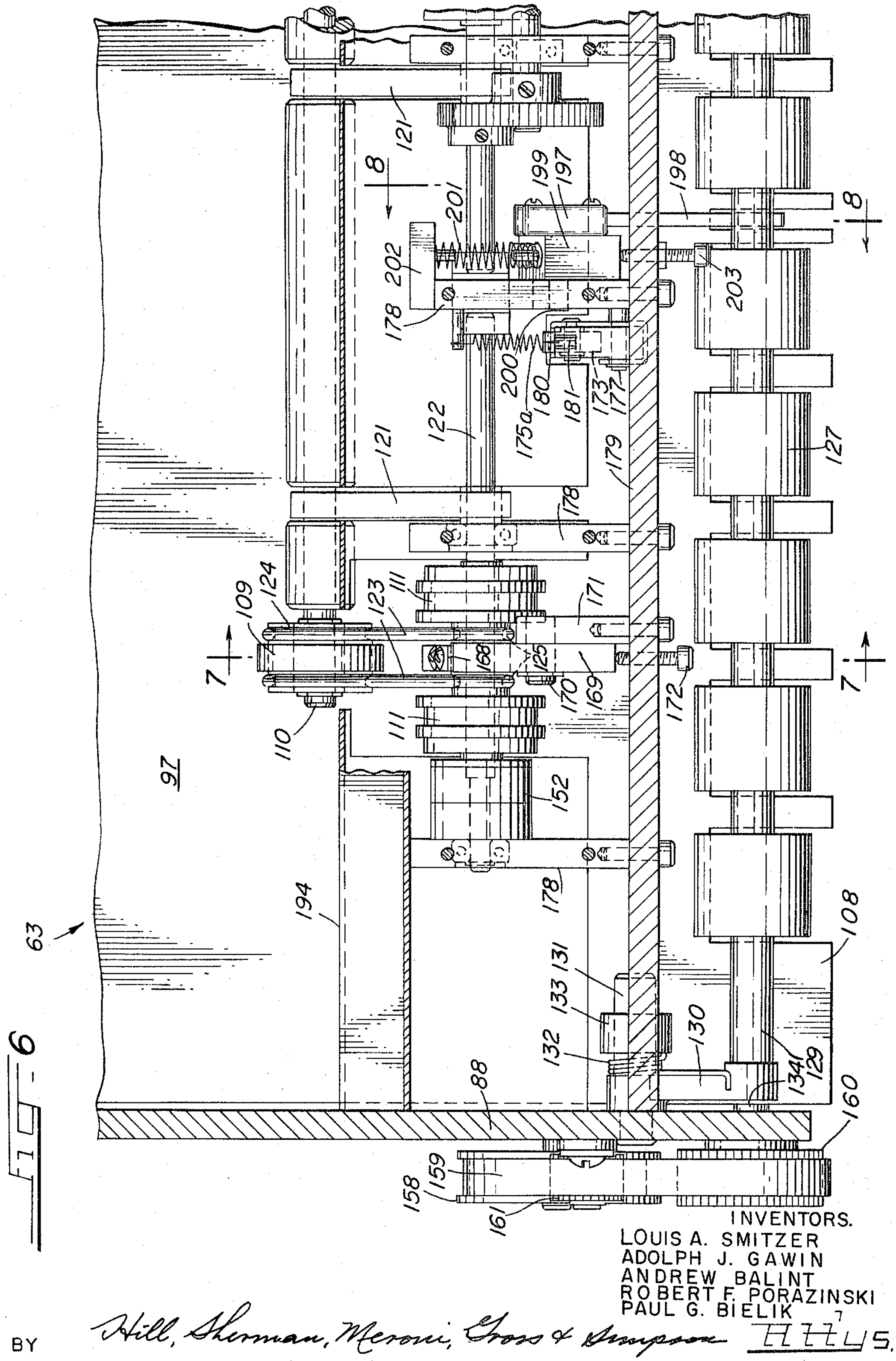
Figures 7, 8:
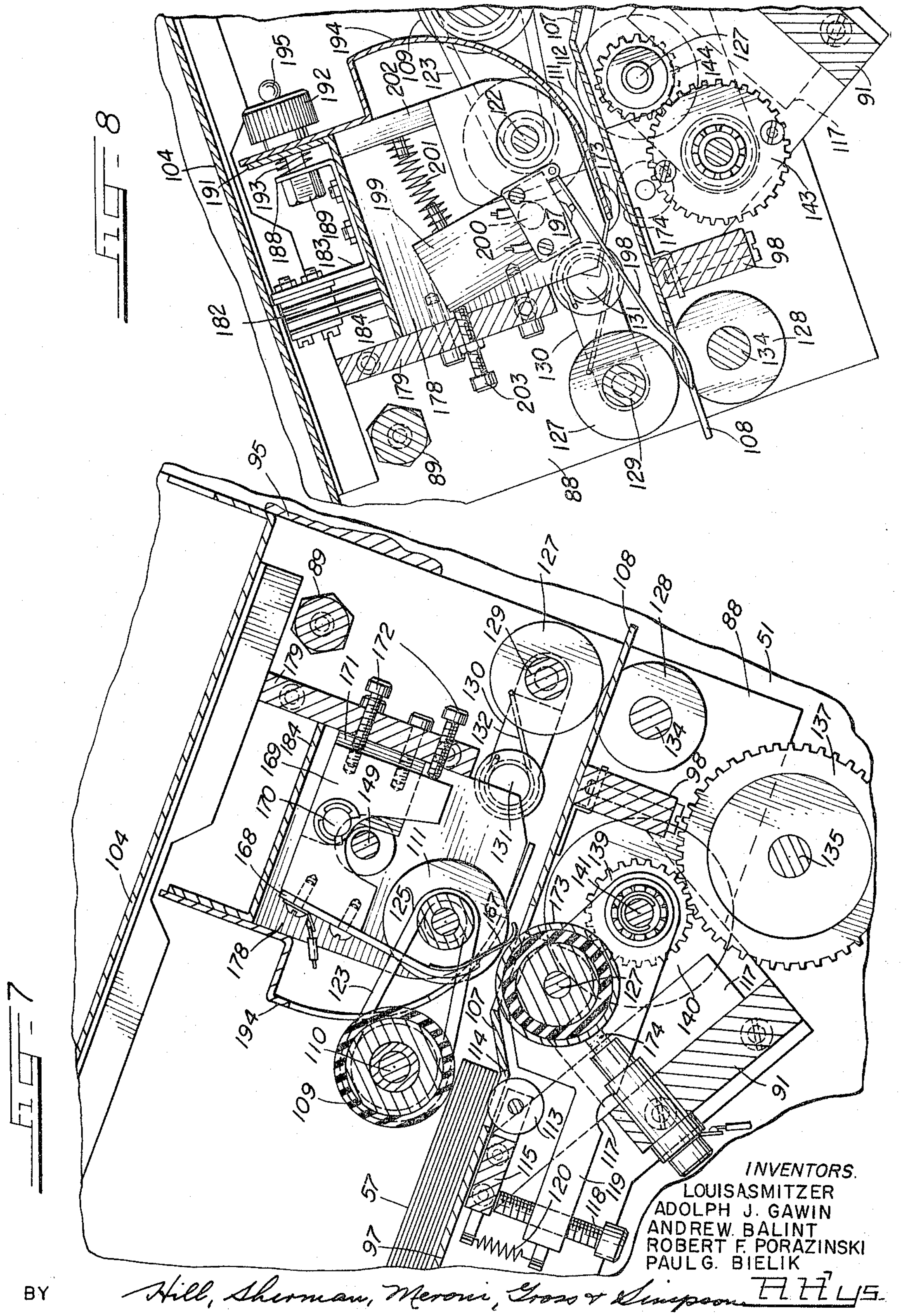
Figure 9:
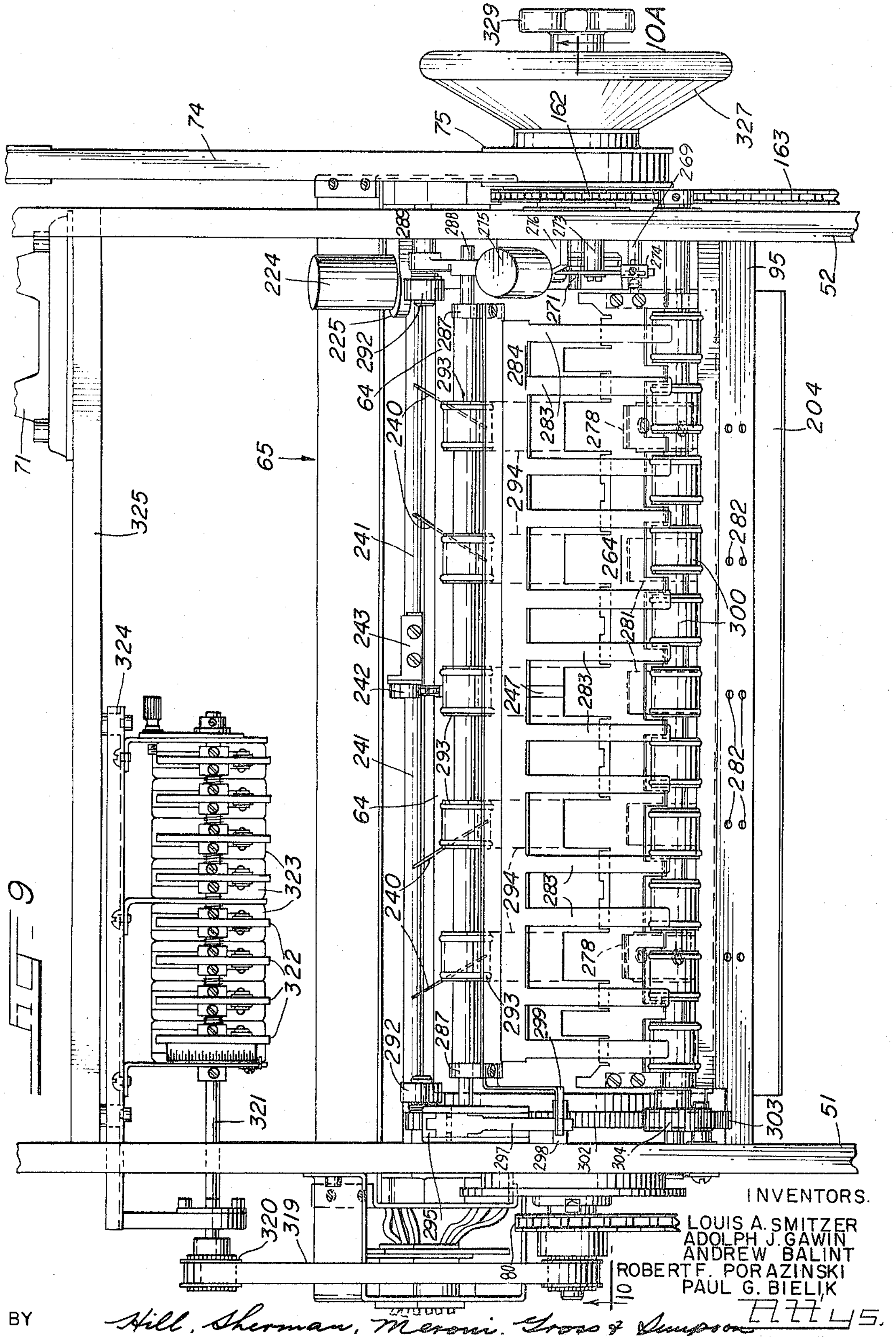
Figure 10:
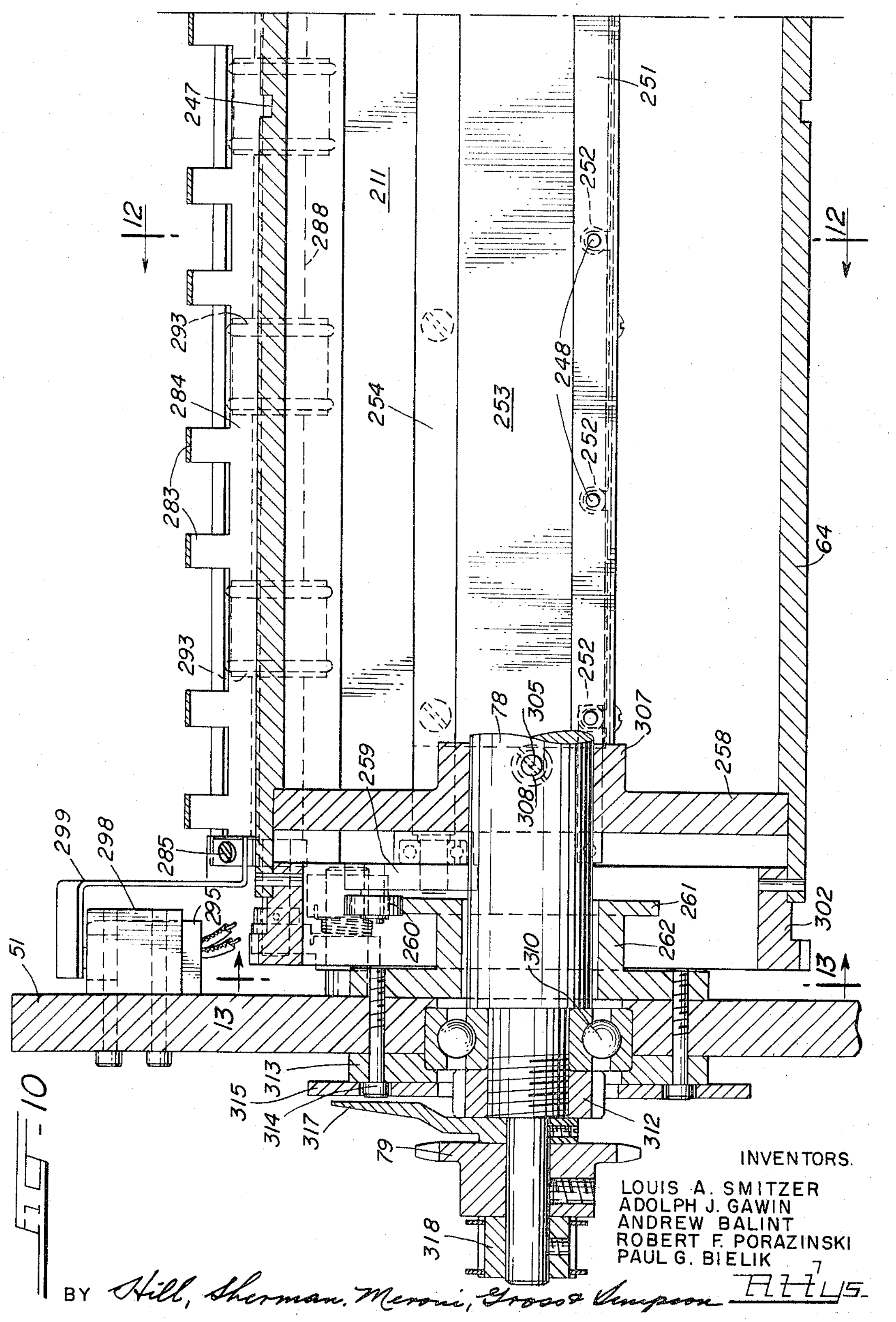
Figure 10A:
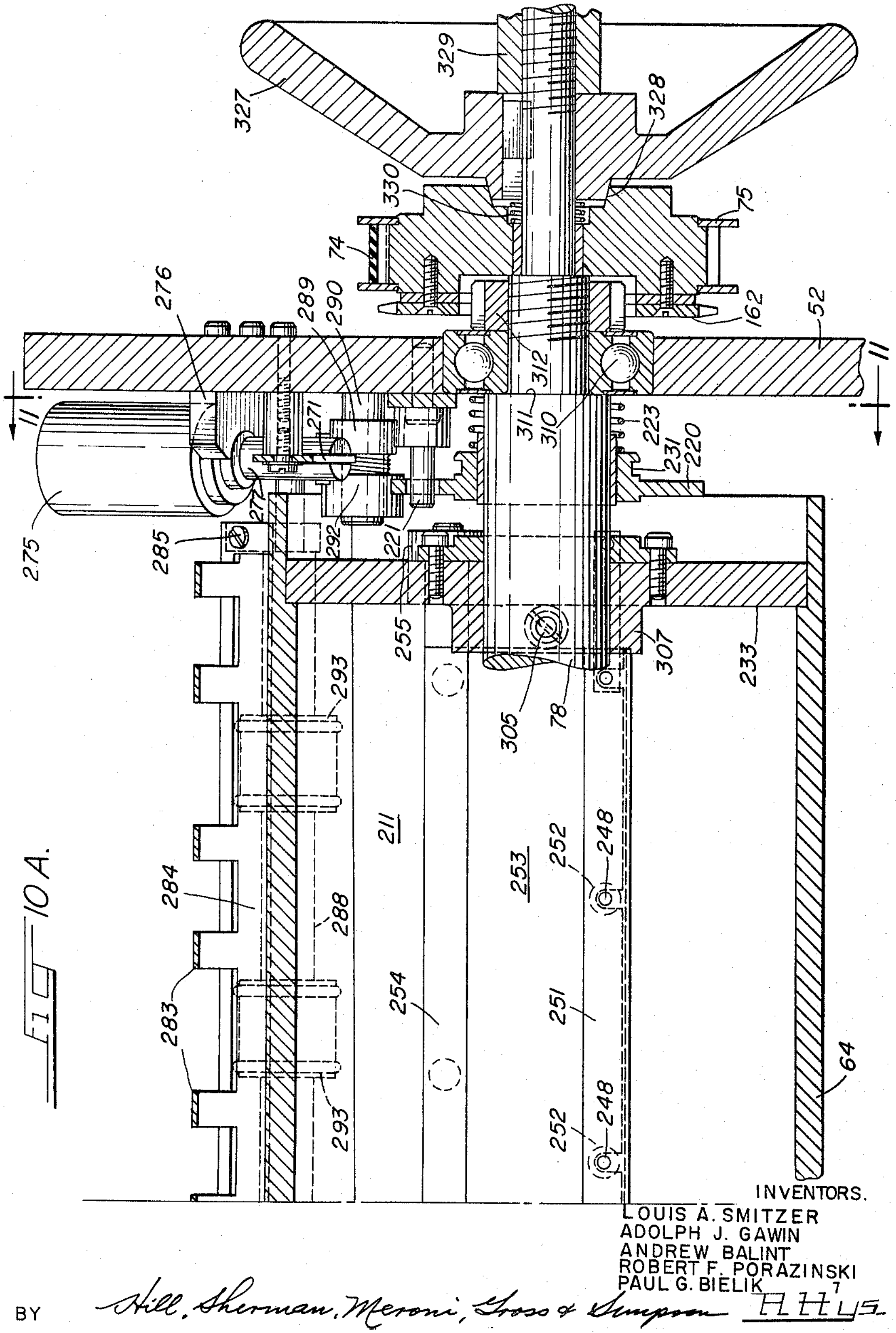
Figure 11:
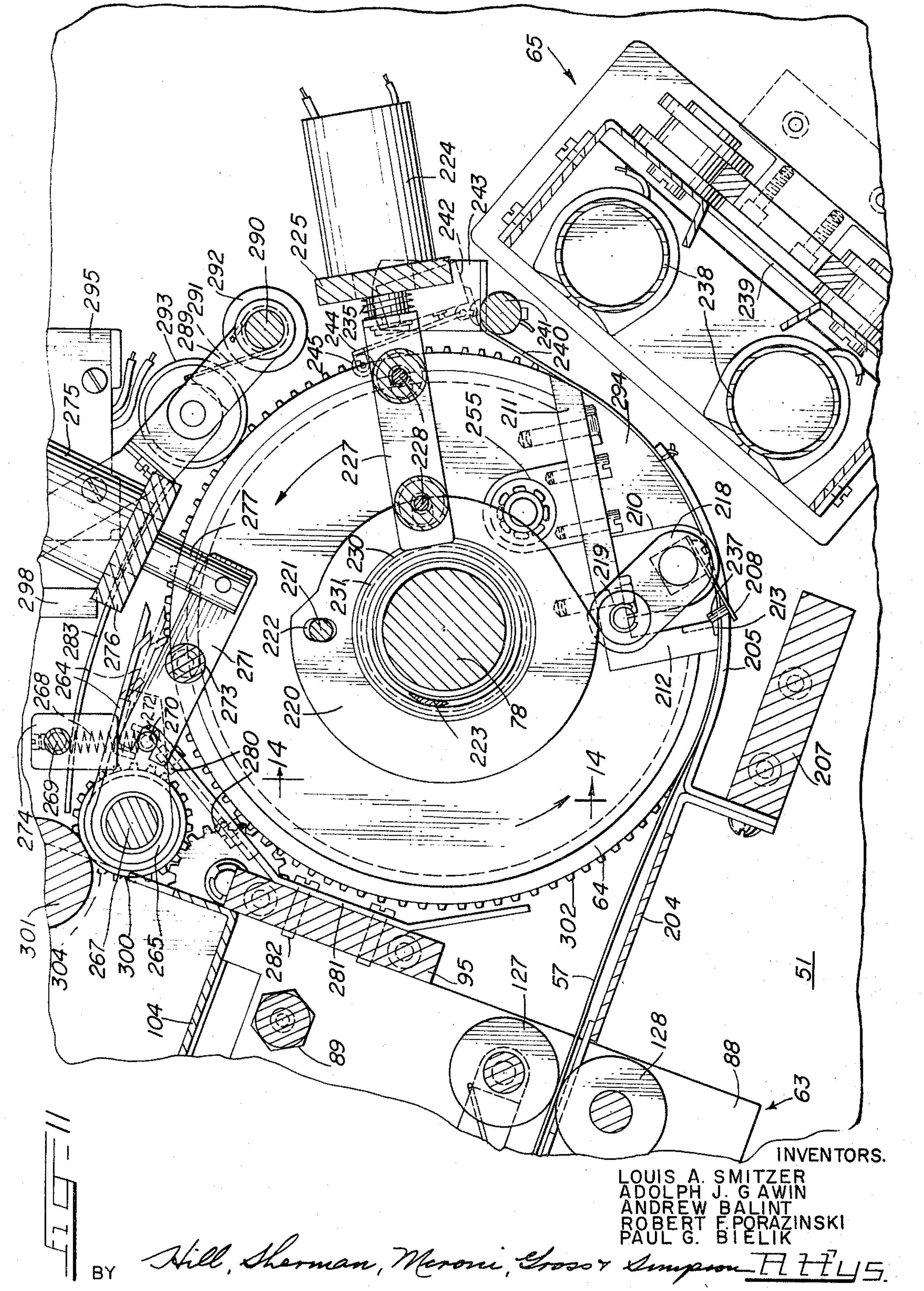
Figures 12, 13:
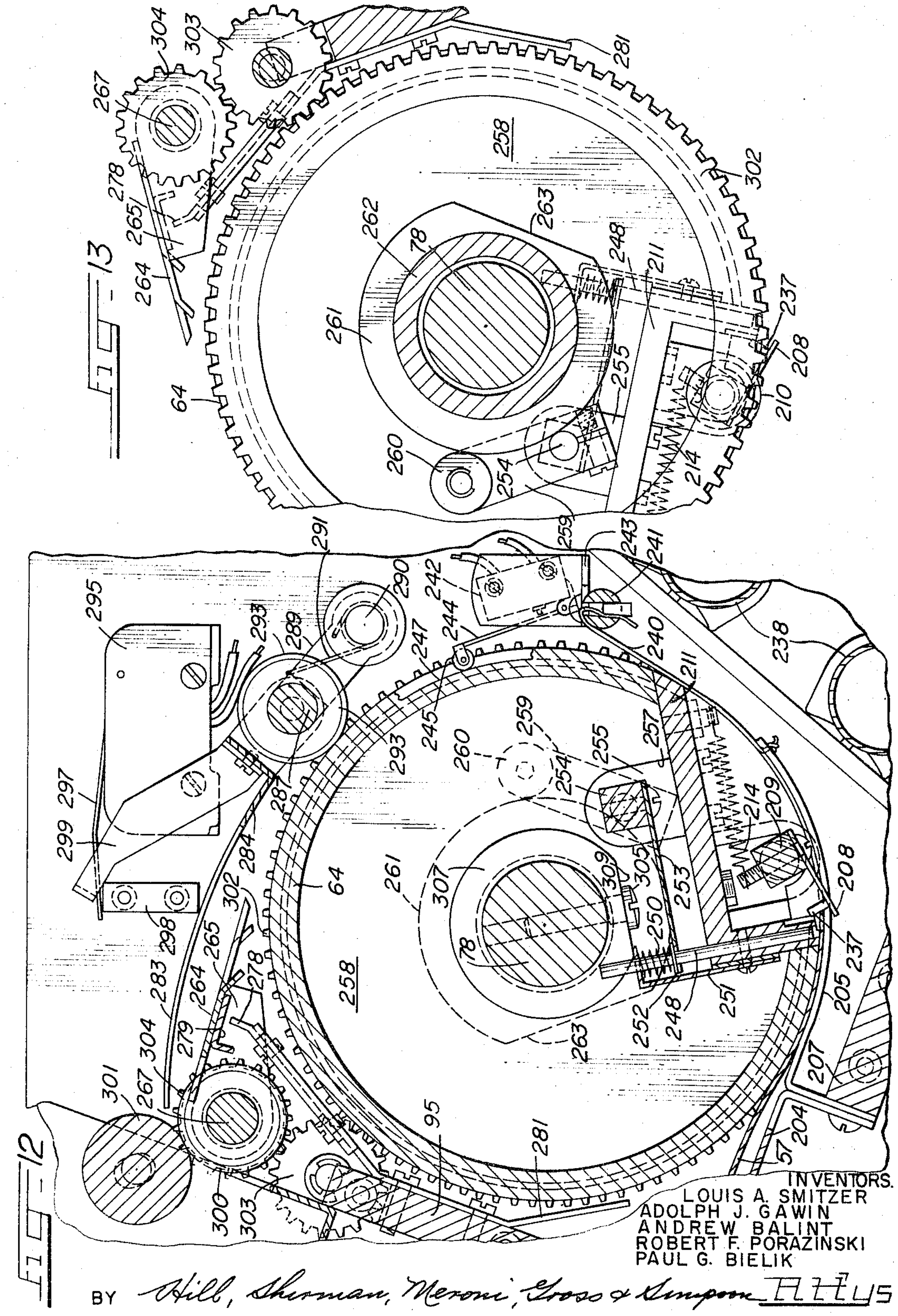
Figure 14:
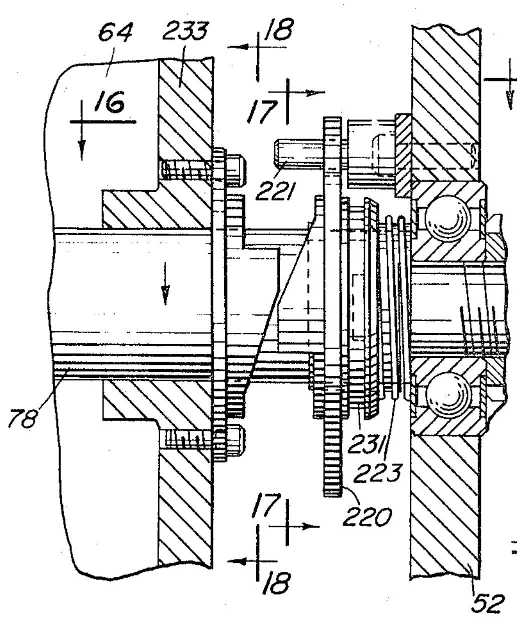
Figure 15:
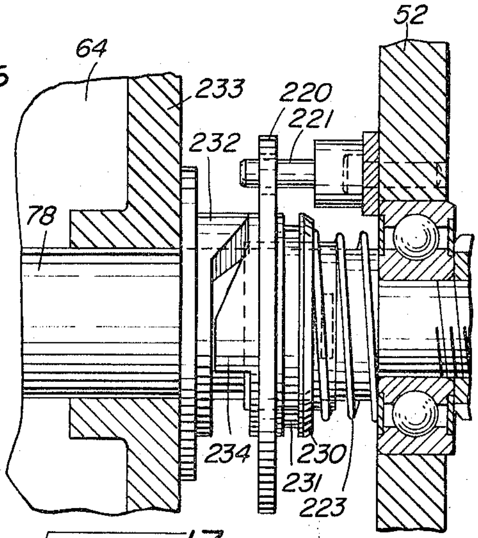
Figure 17:
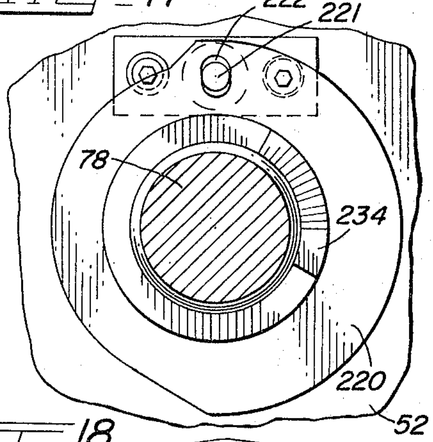
Figure 16:
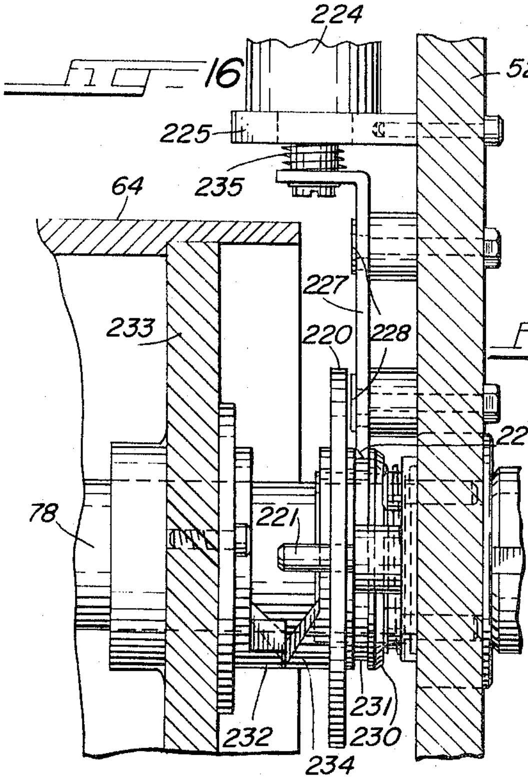
Figure 18:
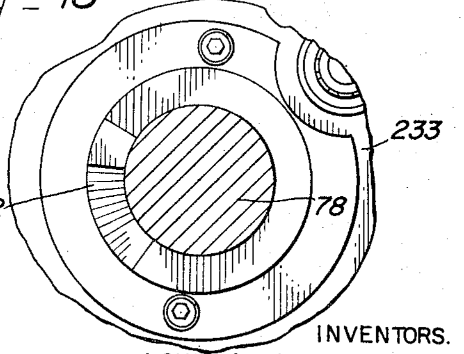
Figures 19, 20:
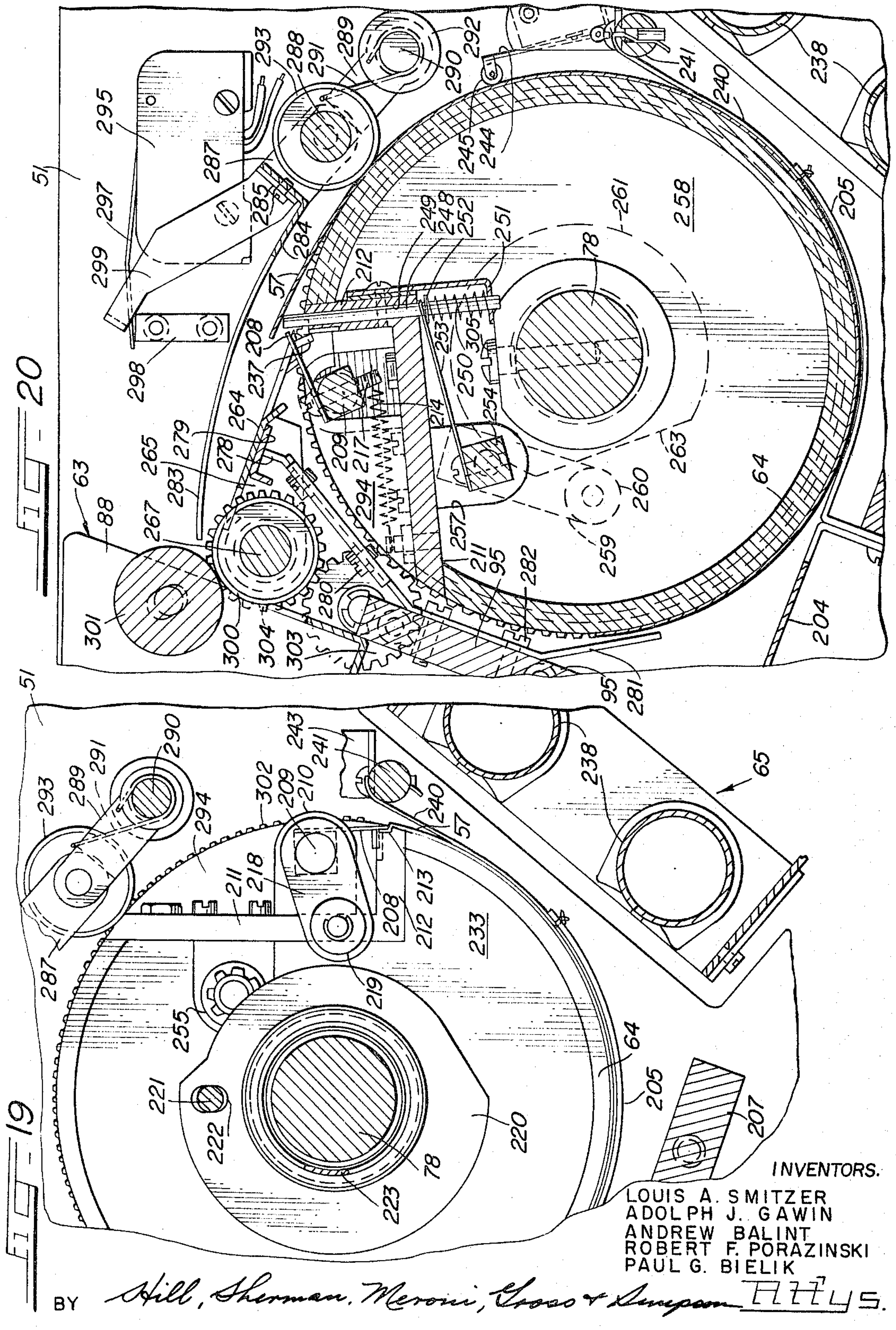
Figure 21:
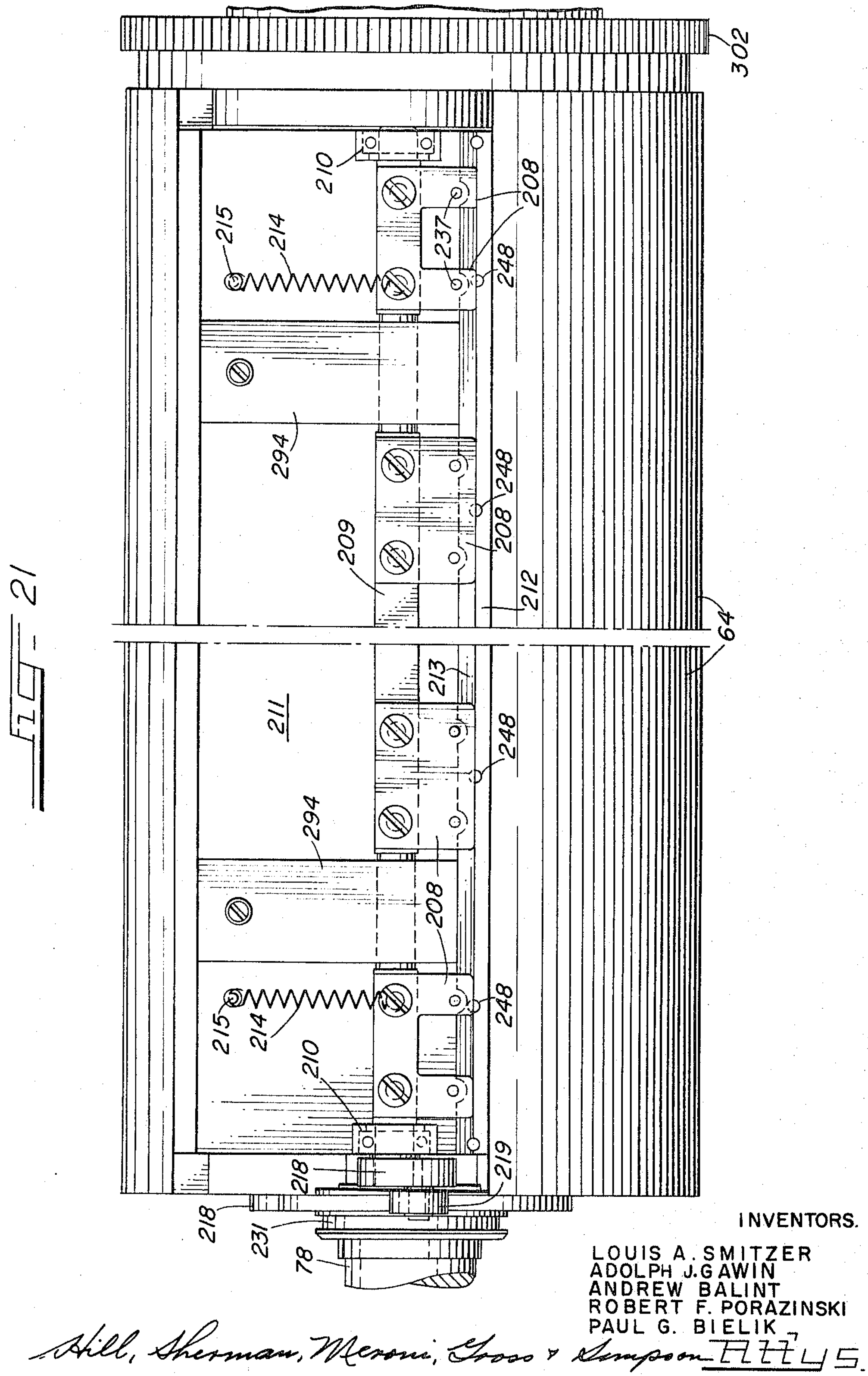
Figure 22:
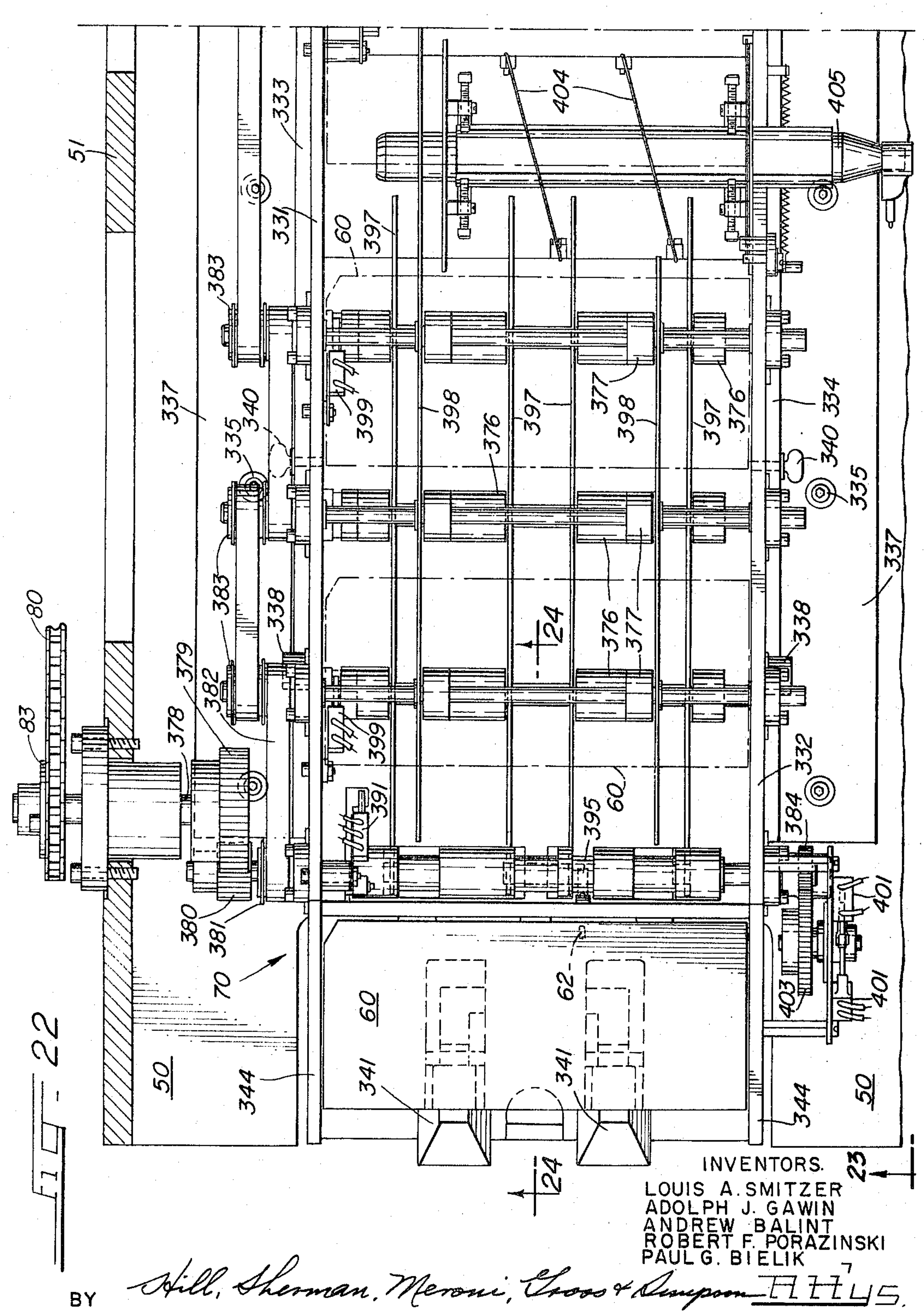
Figure 22A:
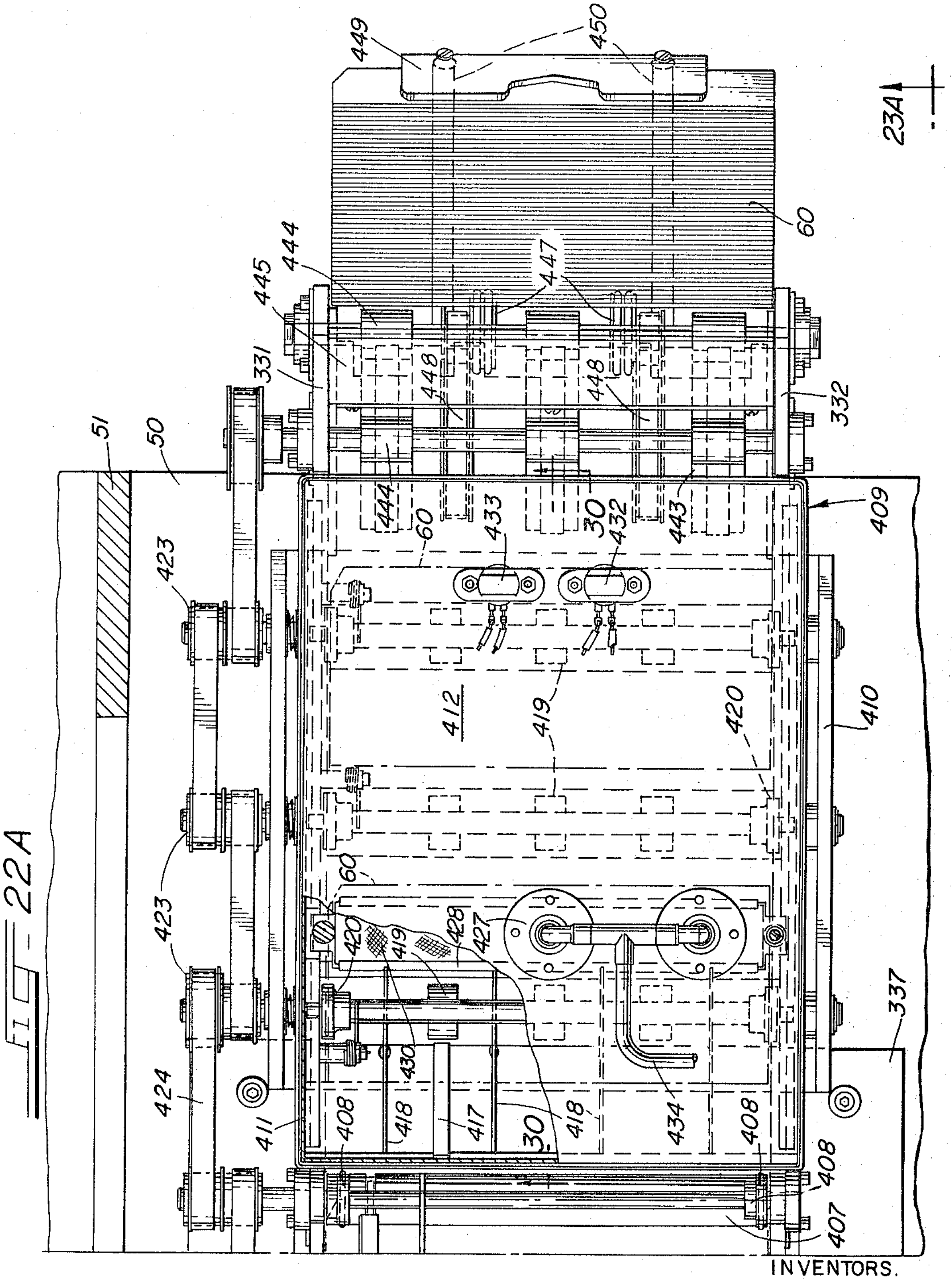
Figure 23:
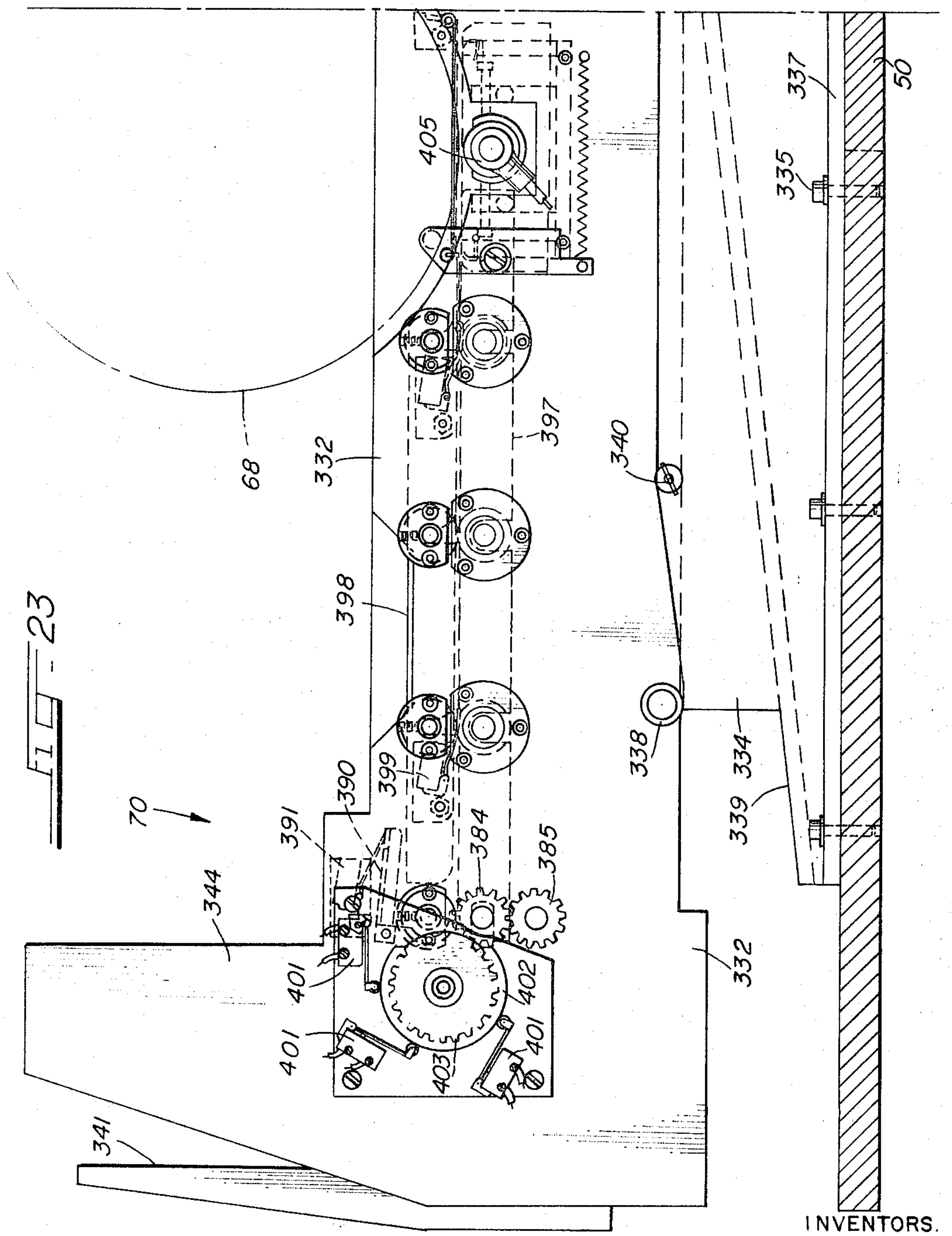
Figure 23A:
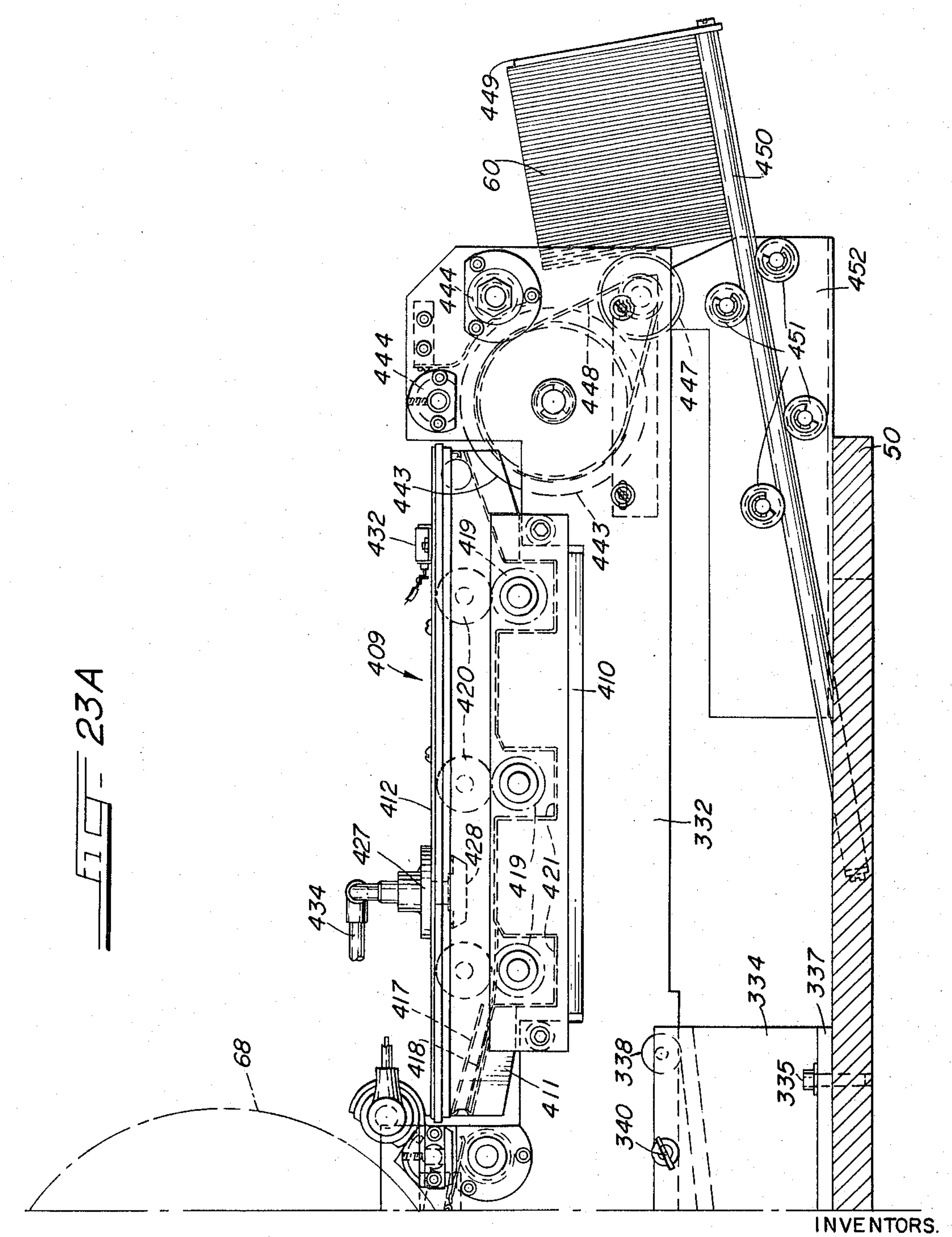
Figure 24:
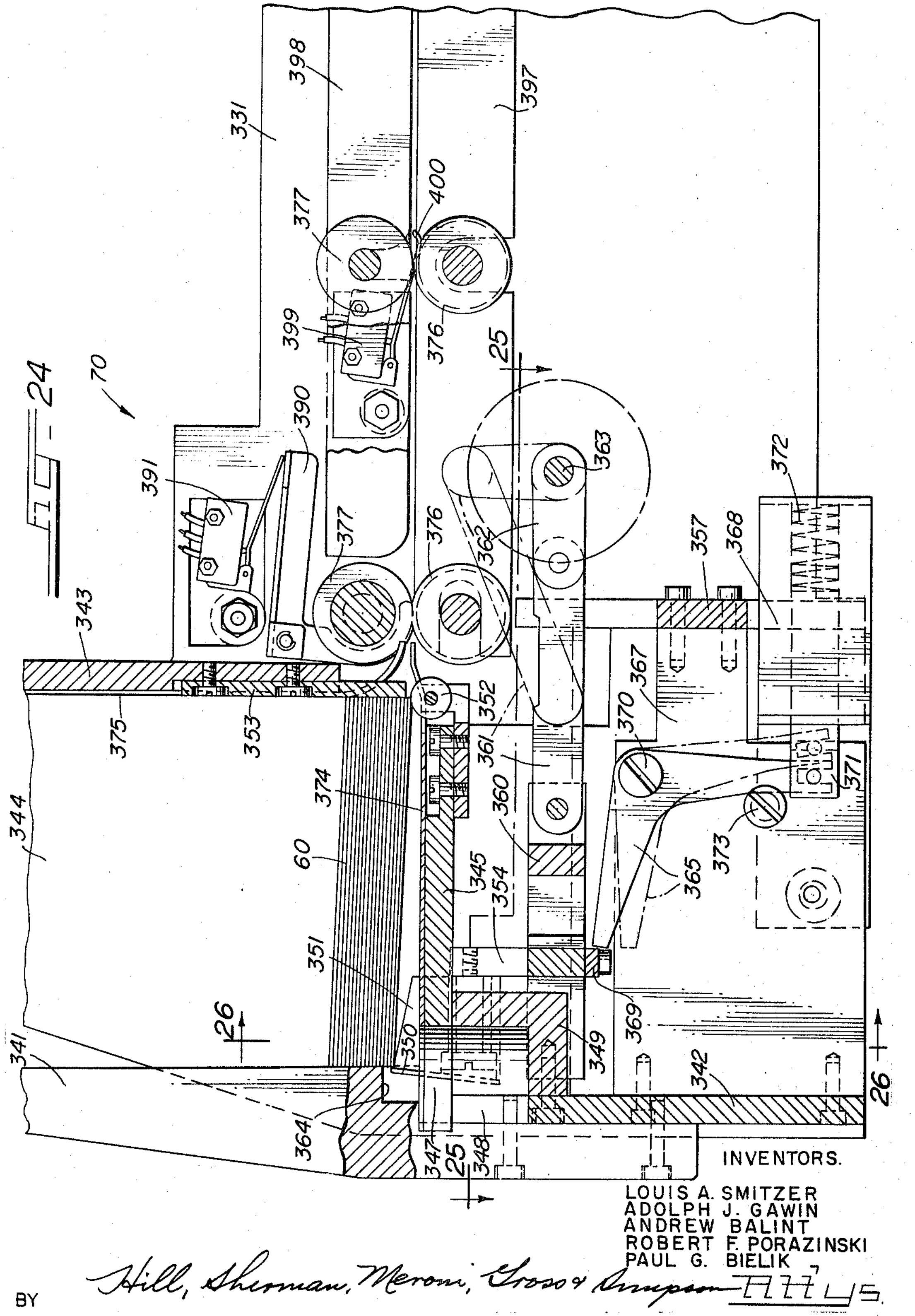
Figure 25:
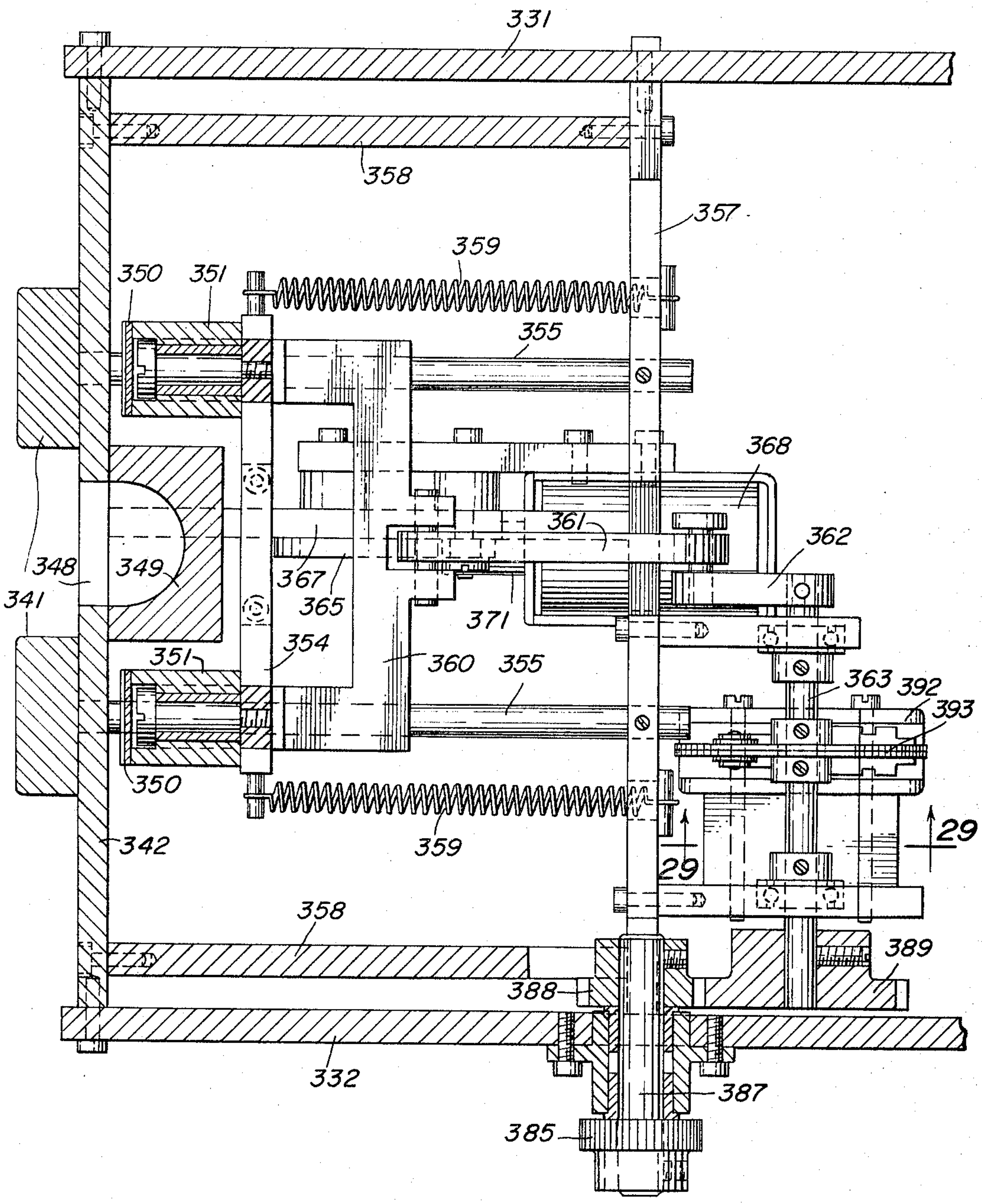
Figure 26:
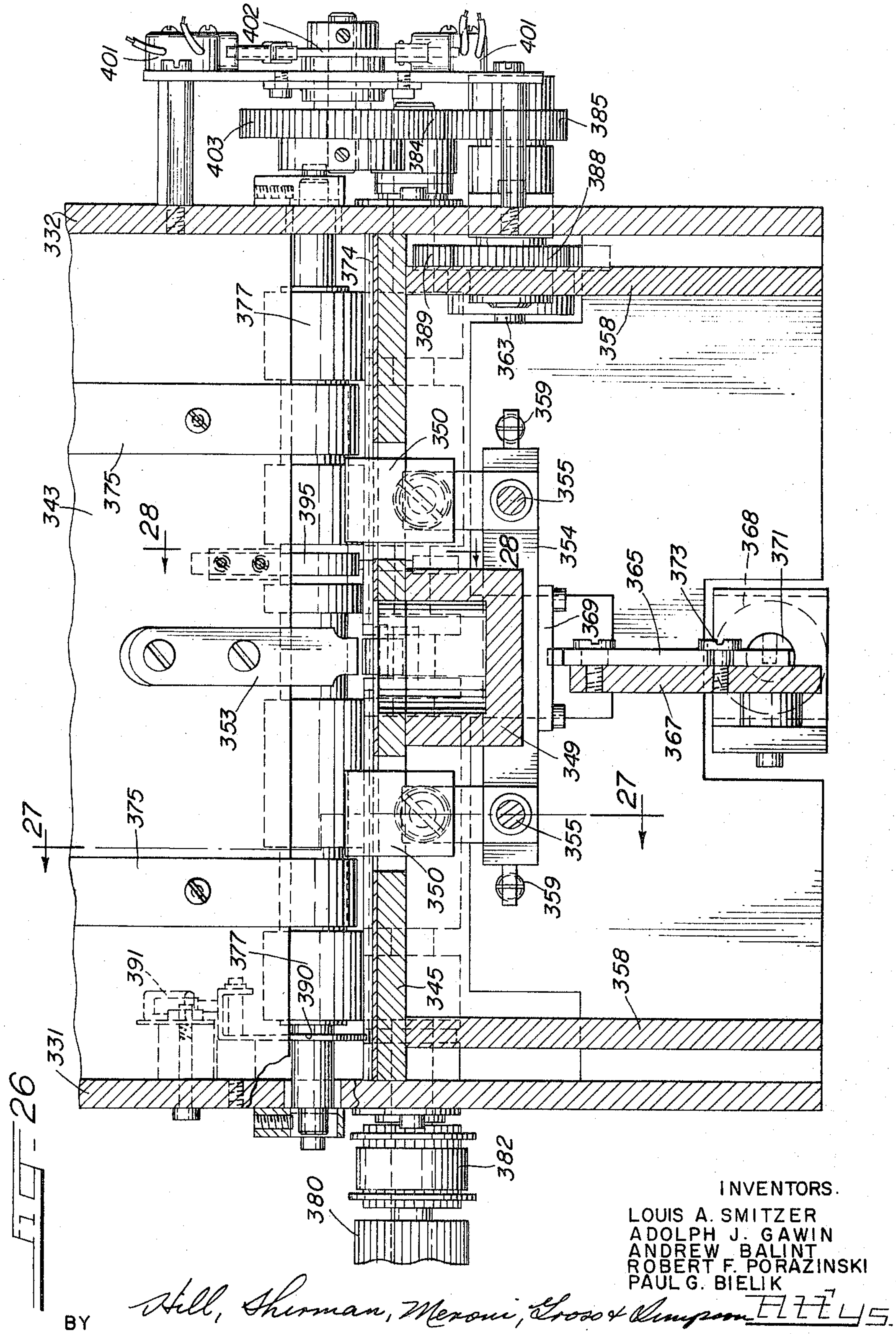
Figure 27:
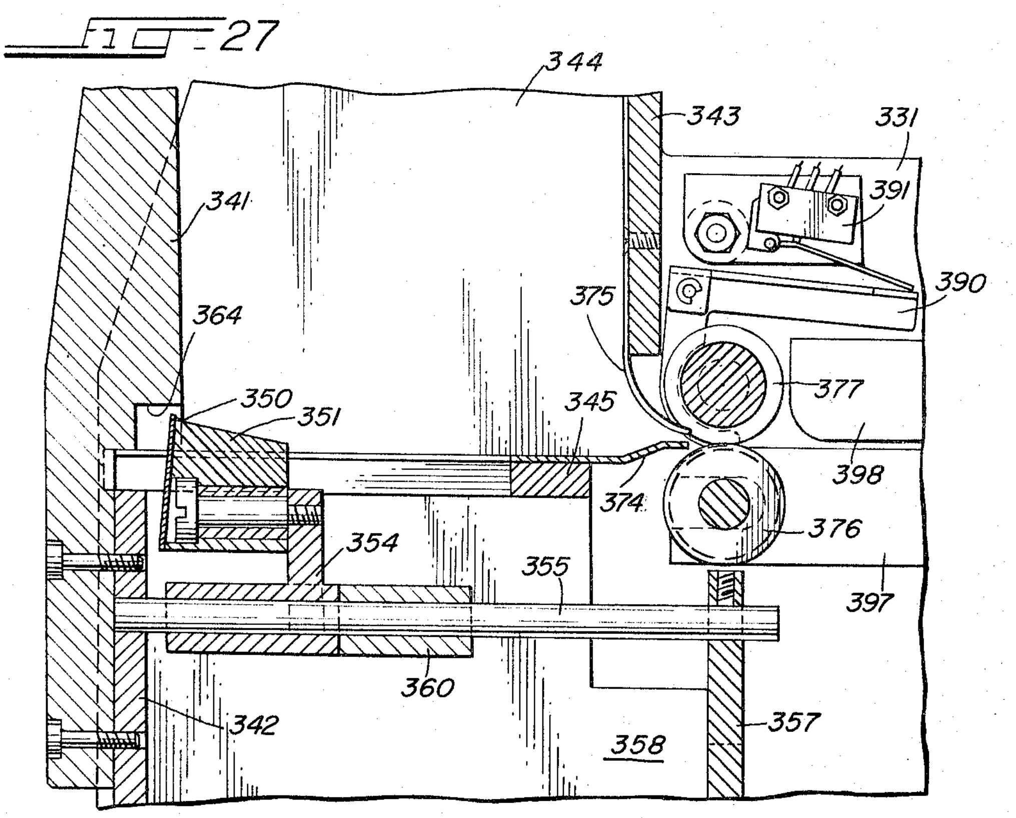
Figure 28:
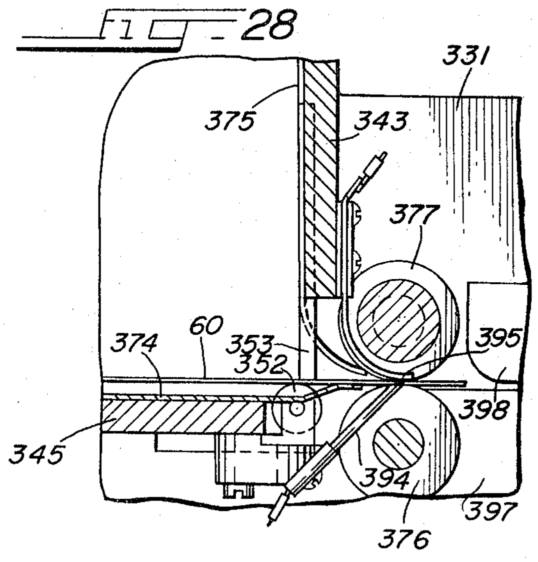
Figure 29:
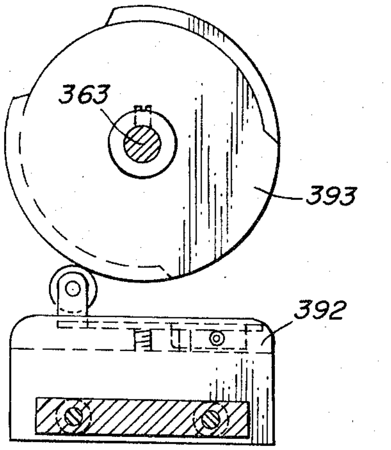
Figure 30:
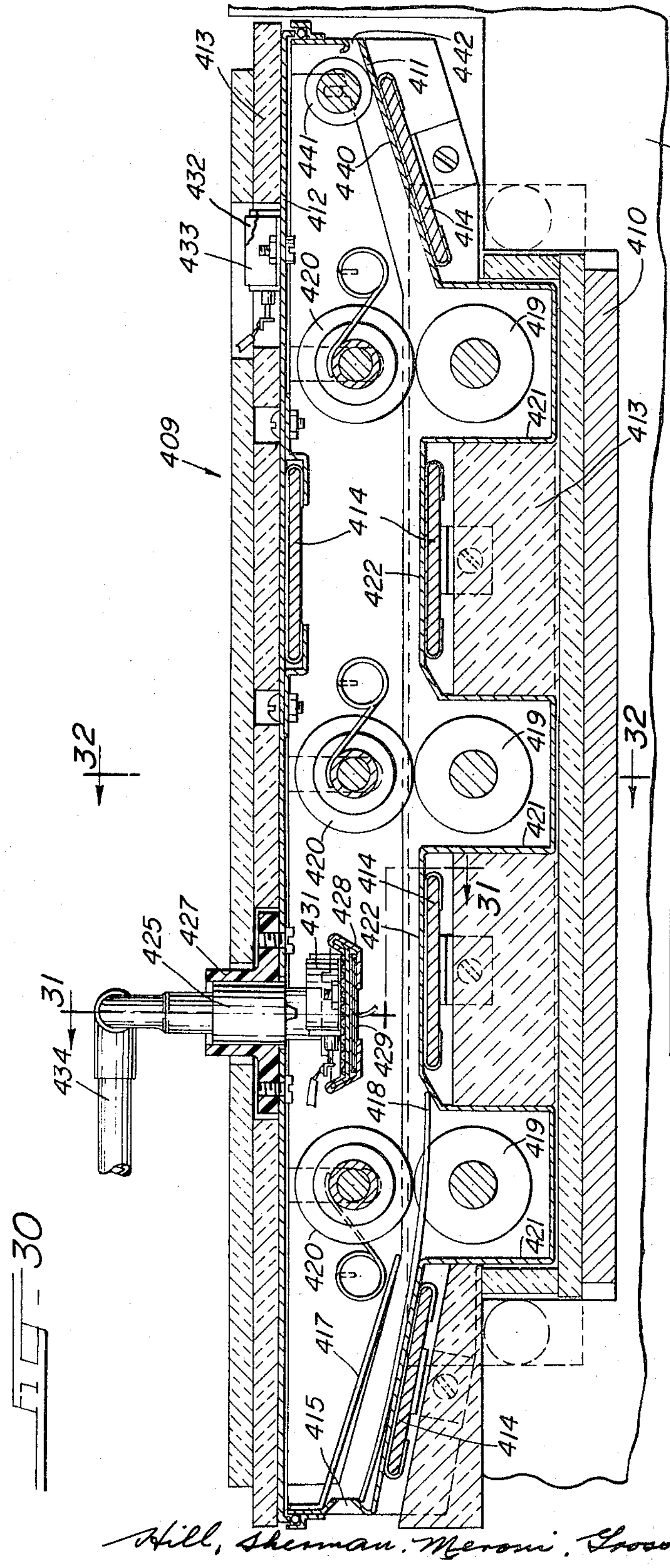
Figure 31:
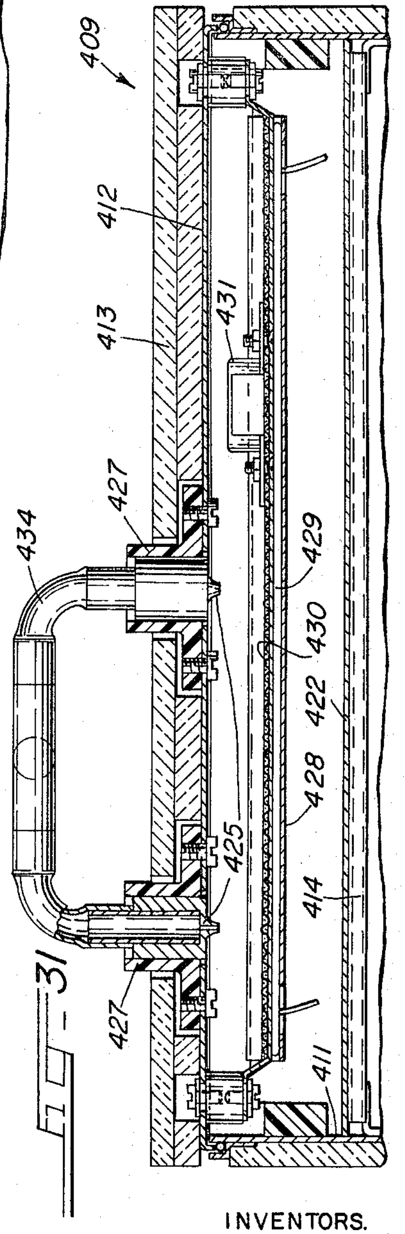
Figure 32:
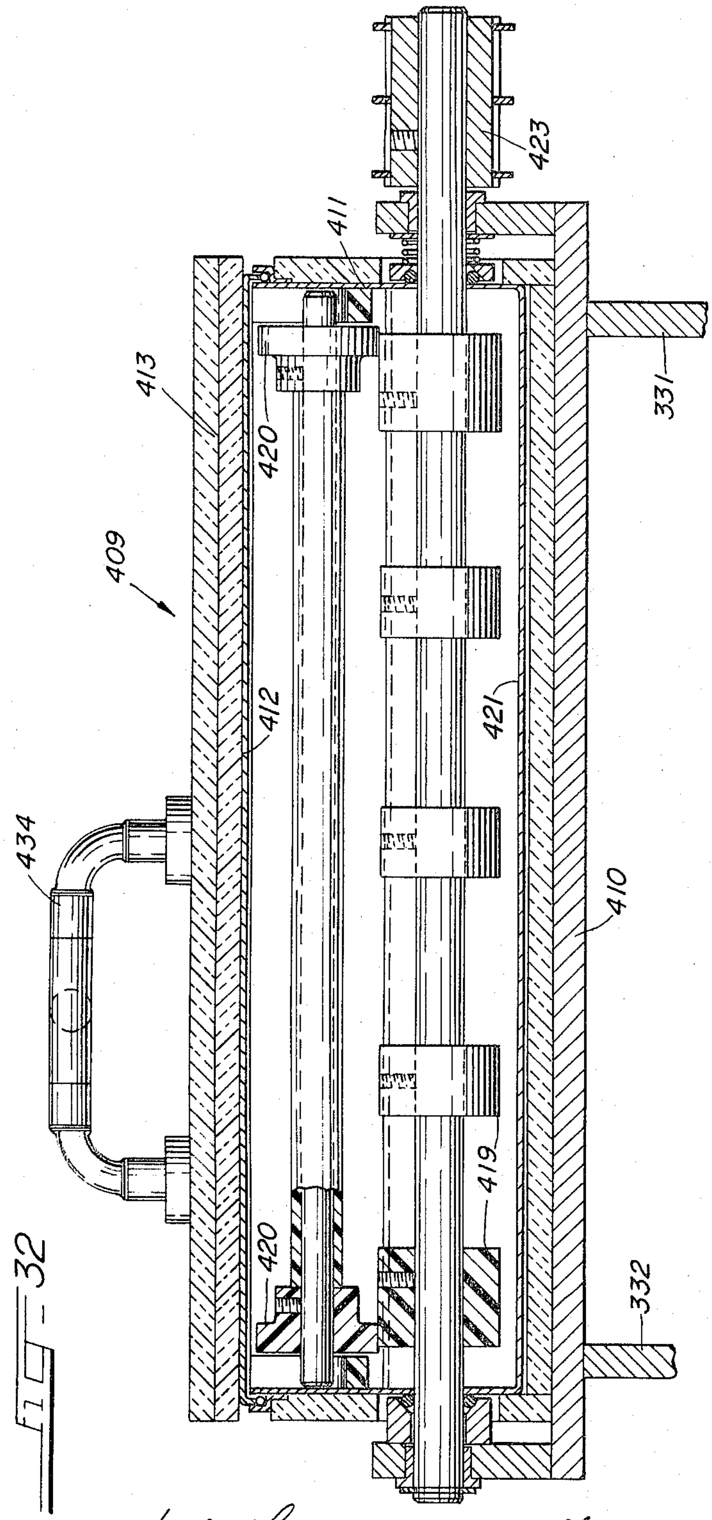
Figure 33:
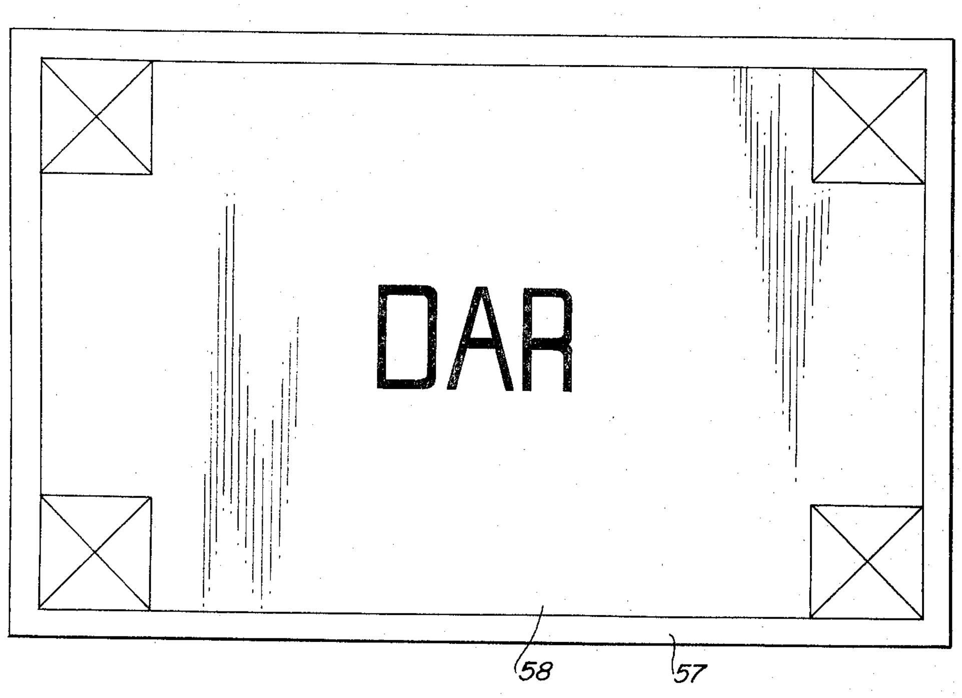
Figure 34:
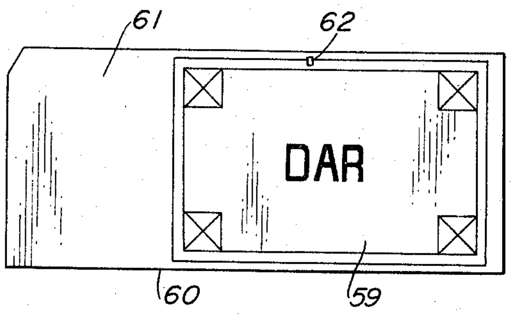
Figures 35, 36:
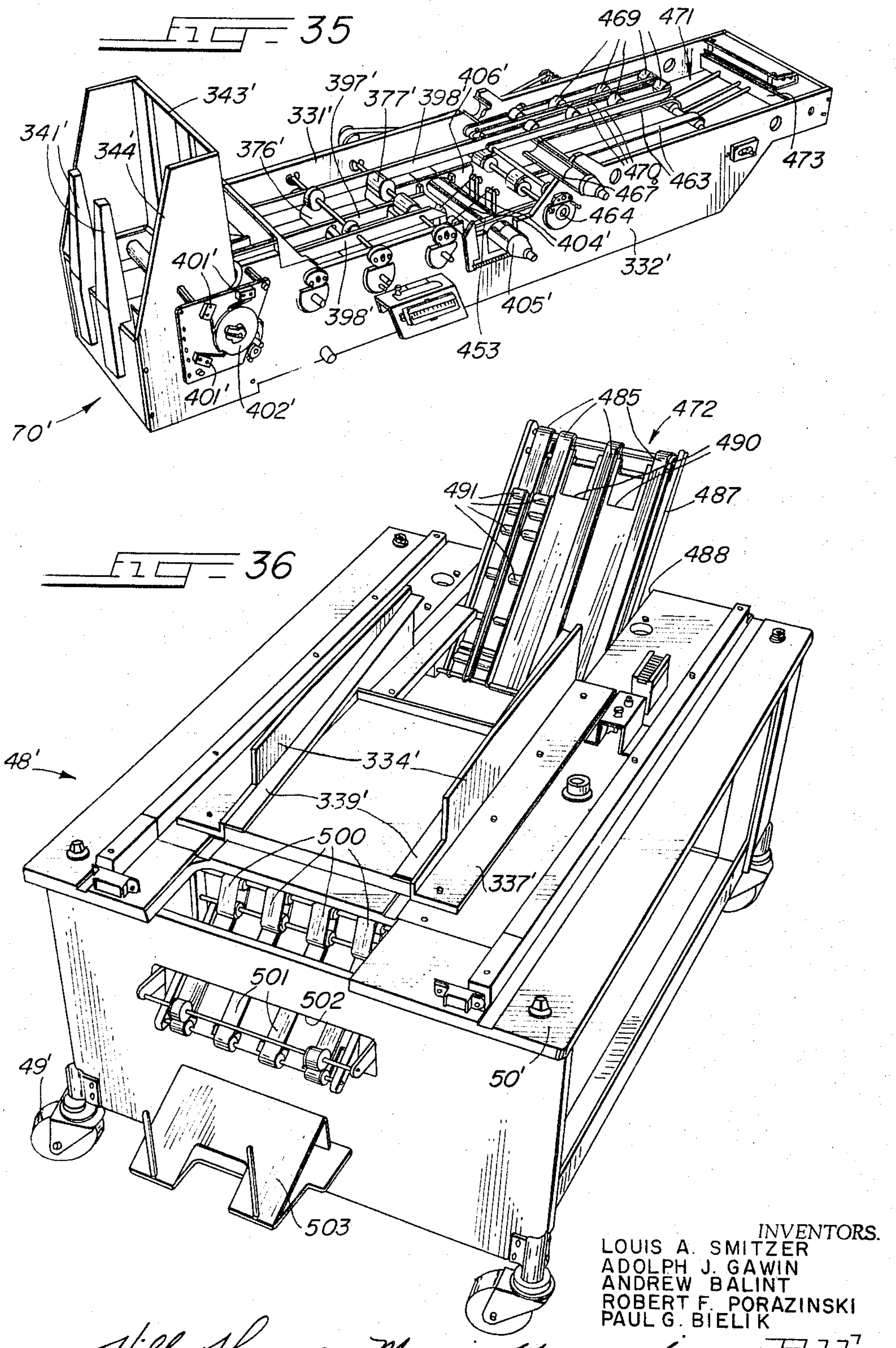
Figure 37:
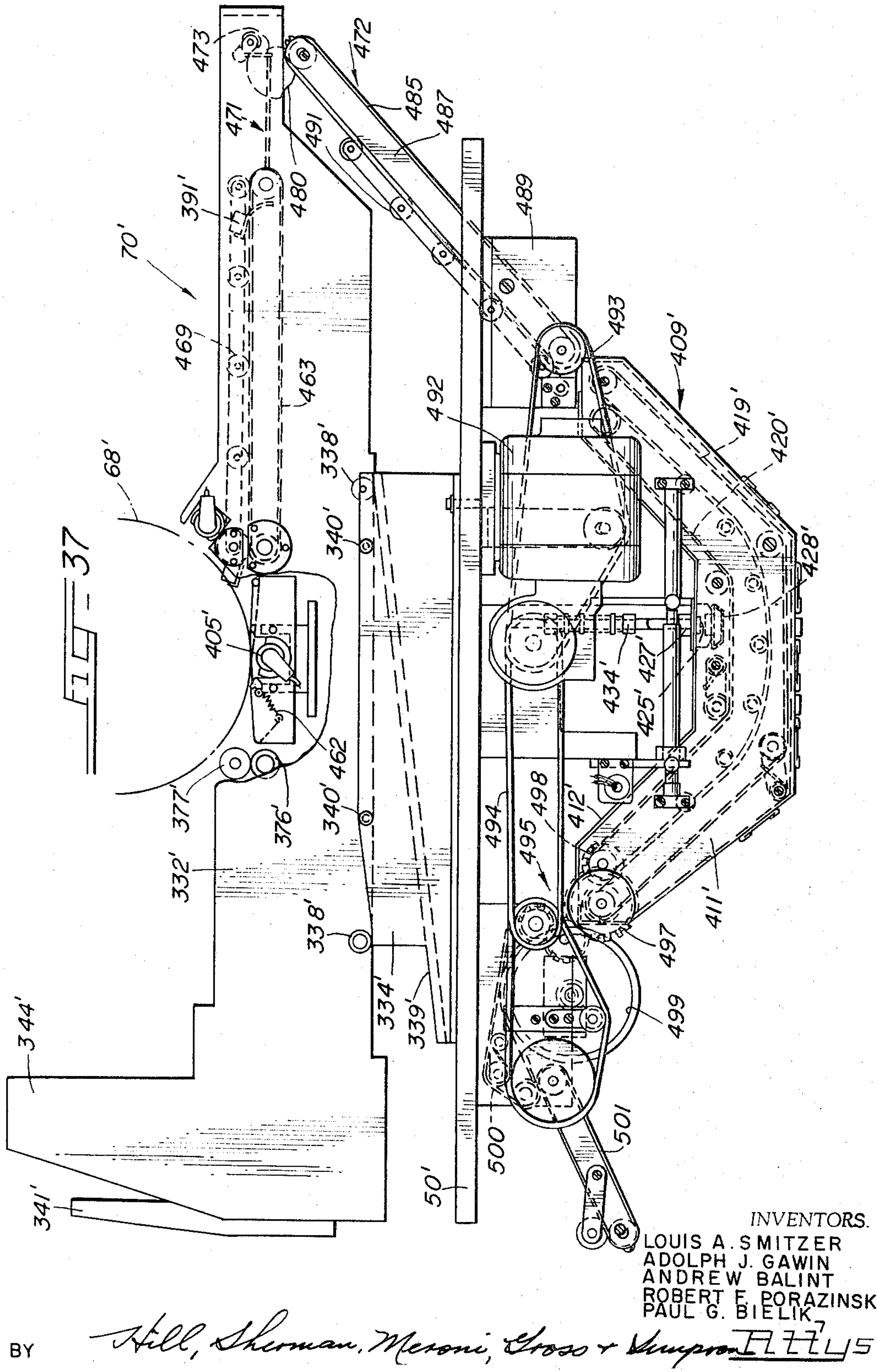
Figure 38:
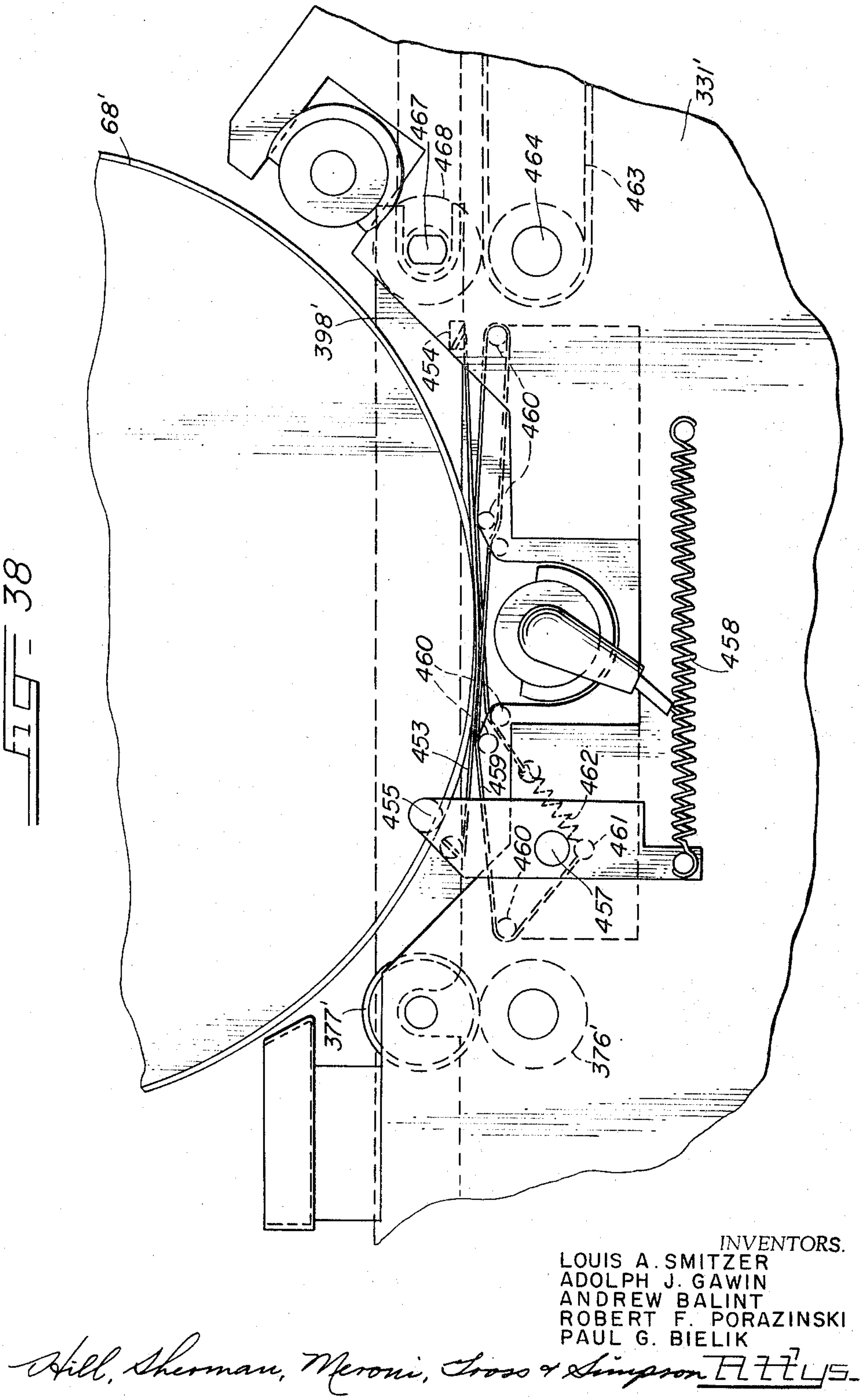
Figures 39, 43:
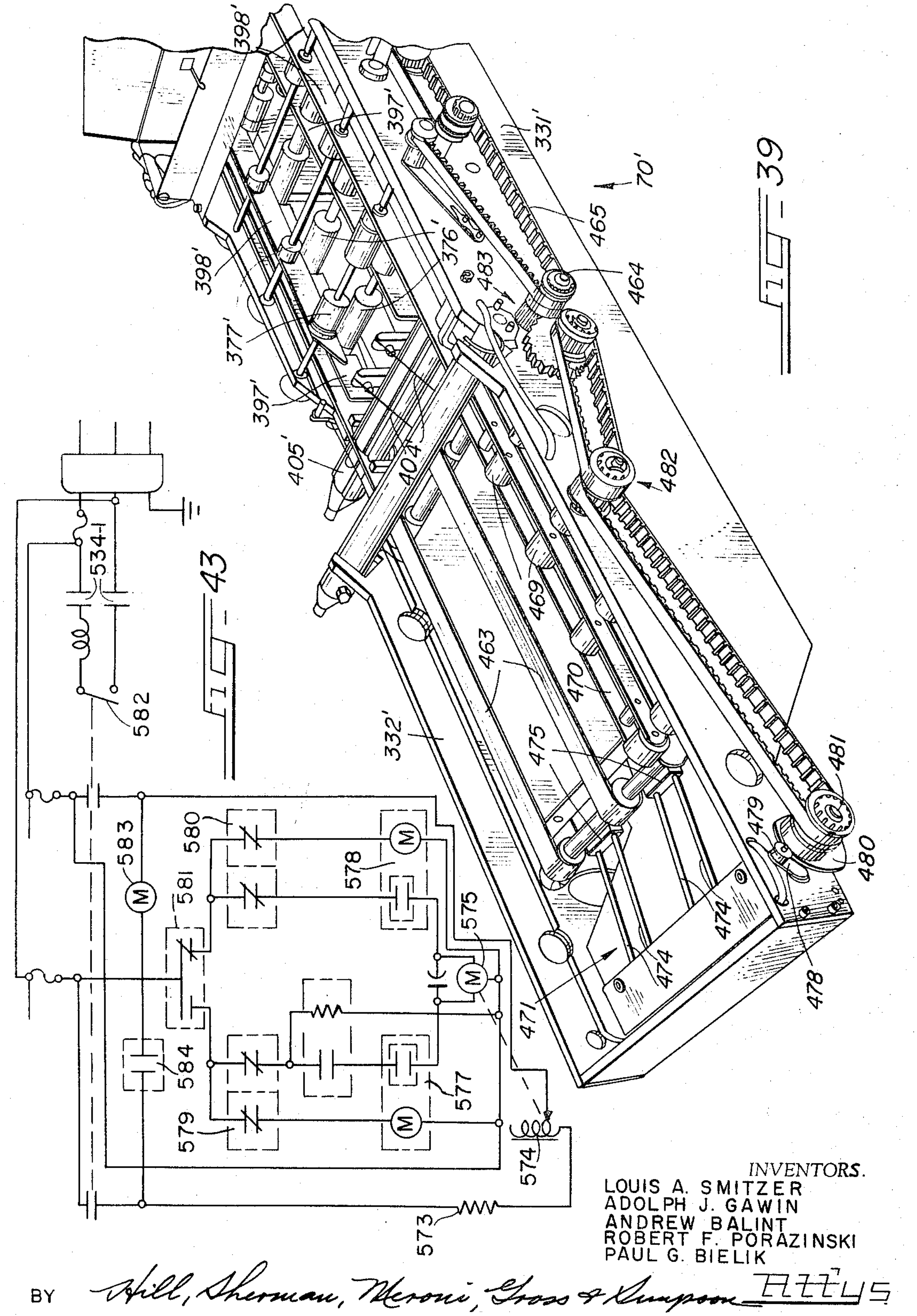
Figure 40:
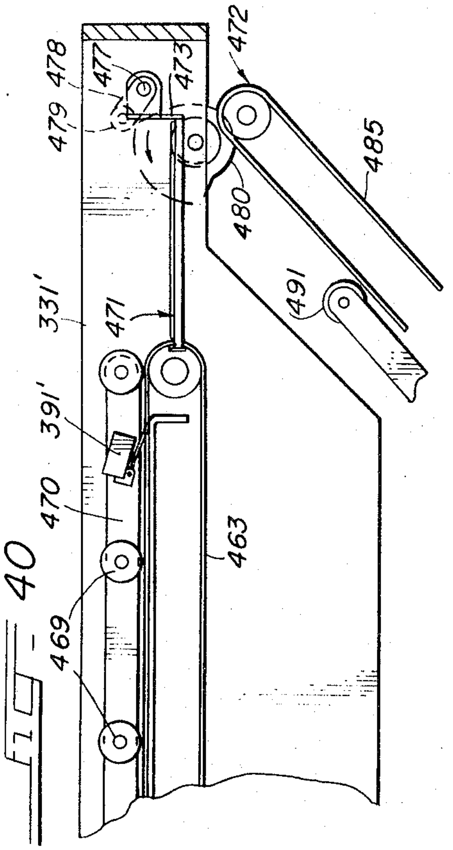
Figure 41:
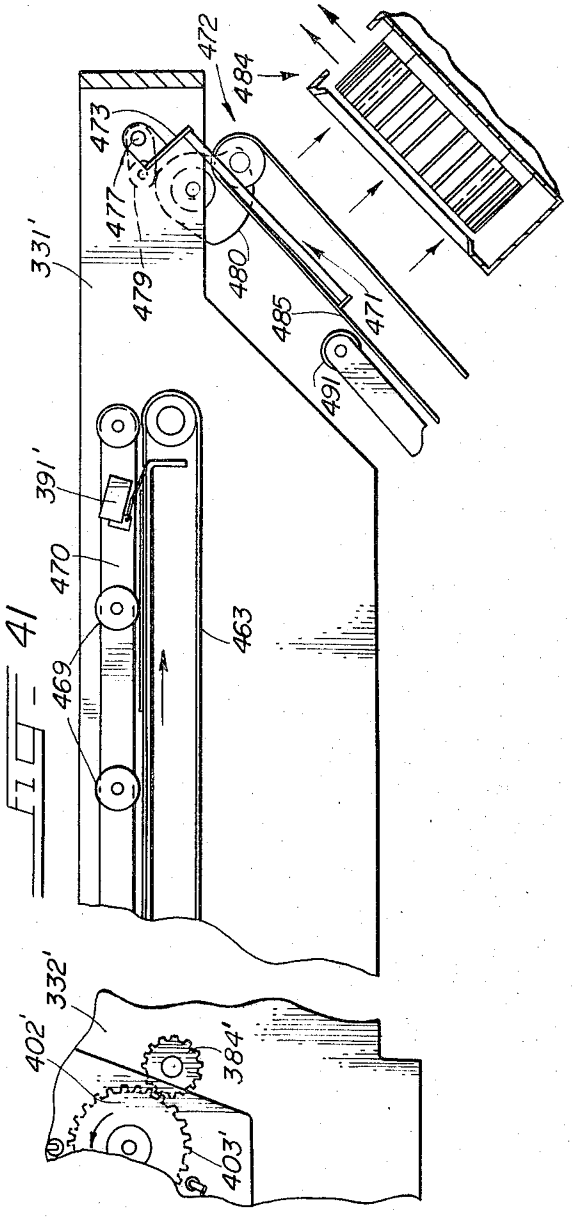
Figure 42:
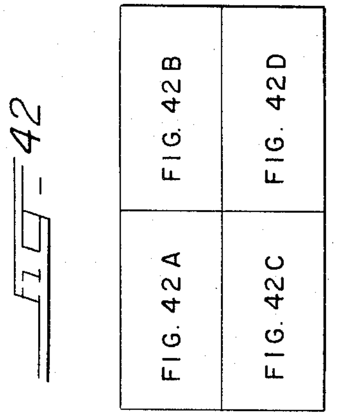

FIGURES 5 and 5A, in composite, provide a transverse sectional elevational detail view taken substantially on the line 5–5A;

FIGURE 6 is a fragmentary sectional plan view taken substantially on the line 6—6 of FIGURE 4;

FIGURE 7 is a fragmentary vertical sectional elevational detail view taken substantially on the line 7—7 of FIGURE 6;

FIGURE 8 is a fragmentary vertical sectional elevational detail view taken substantially on the line 8—8 of FIGURE 6;

FIGURE 9 is an enlarged fragmentary plan view taken substantially along the line 9—9 of FIGURE 2;

FIGURES 10 and 10A comprise a composite fragmentary sectional detail view taken substantially on the line 10–10A of FIGURE 9;

FIGURE 11 is a fragmentary sectional detail view taken substantially on the line 11—11 of FIGURE 10A;

FIGURE 12 is a fragmentary sectional detail view taken substantially on the line 12—12 of FIGURE 10;

FIGURE 13 is a fragmentary sectional detail view taken substantially on the line 13—13 of FIGURE 10;

FIGURE 14 is a fragmentary sectional elevational detail view taken substantially on the line 14—14 of FIGURE 11;

FIGURE 15 is a view similar to FIGURE 14 but showing the cam mechanism in a different operative relation;

FIGURE 16 is a fragmentary sectional elevational detail view taken substantially on the line 16—16 of FIGURE 14;

FIGURE 17 is a fragmentary sectional elevational detail view taken substantially in the plane of line 17—17;

FIGURE 18 is a fragmentary sectional elevational detail view taken substantially in the plane of line 18—18;

FIGURE 19 is a fragmentary sectional elevational detail view similar to FIGURE 11 but showing the document drum in a position advanced from that in FIGURE 11;

FIGURE 20 is a sectional elevational detail view similar to FIGURE 12 but showing the document drum at the discharge position;

FIGURE 21 is a fragmental elevational view of the document drum taken as though looking toward the left in FIGURE 19;

FIGURES 22 and 22A provide a composite sectional plan view taken substantially on the irregular section line 22–22A of FIGURE 2;

FIGURES 23 and 23A afford a composite sectional elevational detail view taken substantially on the line 23–23A of FIGURES 22 and 22A;

FIGURE 24 is a fragmentary vertical sectional elevational detail view taken substantially on the line 24—24 of FIGURE 22;

FIGURE 25 is a fragmentary sectional plan view taken substantially on the line 25—25 of FIGURE 24;

FIGURE 26 is a fragmentary vertical sectional elevational detail view taken substantially on the line 26—26 of FIGURE 24;

FIGURE 27 is a fragmentary vertical sectional elevational detail view taken substantially on the line 27—27 of FIGURE 26;

FIGURE 28 is a fragmentary vertical sectional elevational detail view taken substantially on the line 28—28 of FIGURE 26;

FIGURE 29 is a fragmentary sectional elevational detail view taken substantially on the line 29—29 of FIGURE 25;

FIGURE 30 is a fragmentary vertical sectional elevational detail view taken substantially on the line 30—30 of FIGURE 22A;

FIGURE 31 is a vertical sectional elevational detail view taken substantially on the line 31—31 of FIGURE 30;

FIGURE 32 is a fragmentary vertical sectional elevational detail view taken substantially on the line 32—32 of FIGURE 30;

FIGURE 33 is a schematic plan view representing a document to be reproduced;

FIGURE 34 is a schematic plan view of a document reproduction as adapted to be produced by the apparatus of the present invention;

FIGURE 35 is a perspective view of a modified card track subassembly unit;

FIGURE 36 is a perspective view of a modified card processing arrangement built into the base of the machine;

FIGURE 37 is a fragmentary side elevational view showing how the modified card track and card processing mechanisms of FIGURES 35 and 36 cooperate in use;

FIGURE 38 is an enlarged fragmenatry side elevational view of a portion of the card track assembly showing details of cooperation with a printing drum;

FIGURE 39 is a fragmentary perspective view of the rear portion of the card track taken from the opposite side of the depiction in FIGURE 35;

FIGURE 40 is a fragmental, schematic side elevational view of the card track and a portion of the conveyor of the processing mechanism;

FIGURE 41 is a similar schematic side elevational view showing other details of the mechanism and demonstrating how cards are transferred from the card track to the conveyor in the processing mechanism;

FIGURE 42 is an orientation block diagram with respect to FIGURES 42A to 42D which, in composite, disclose a schematic electrical control diagram for the machine; and FIGURE 43 is a schematic electrical diagram applicable to a modified arrangement.

A representative machine embodying features of the invention (FIGS. 1–3) comprises a machine unit 45 removably secured as by means of mounting screw 47 to a mobile base 48 mounted on casters 49. As shown, the machine unit 45 comprises a sturdy frame including a base plate 50 on which are mounted spaced parallel vertical left and right side plates 51 and 52, respectively. Suitable housing enclosures including front housing structure 53 and respective side housing structures 54 provide a neat exterior appearance. Hinged side doors 55 are desirably provided on the side housings 54 to permit ready access to mechanisms of the machine as viewed in FIGURES 2 and 3.

Within the machine unit 45, documents 57 (FIG. 33) are adapted to be handled for reproduction of data 58, schematically depicted thereon, in reduced size image 59 (FIG. 34) on one or a series of filing cards 60 such as electronic accounting machine type of cards. On such cards, the image 59 is applied to a portion of the selected face area leaving a substantial area 61 to receive various code intelligence which may be of any desirable form such as the well-known punch aperture code system which an electronic accounting machine can "read" when interrogated. For flexibility, the machine is desirably equipped to accept documents within a reasonable range of sizes such as eight inches by eight inches to nine inches by fourteen inches, with the images 59 comprising a reduction up to three to one. In the present machine, by integration, synchronization and automatic document and card responsive operation of various handling and processing assemblies and subassemblies, relatively high speed performance is attained, in a typical instance producing image-bearing cards at a rate up to 2,000 per hour. Once the machine is loaded with necessary supplies, including prearranged documents 57 and cards 60, processing is completely automatic including appropriate action in case of malfunction.

In a preferred arrangement, any desired number of the image-bearing file cards 60 corresponding to any, and variably with respect to a series of, the documents 57 can be produced. To attain automatic correlation of any particular one of the documents 57 to the total number of the cards 60 to bear the image of that document, control means are provided in the machine responsive to signalling means carried by selected ones of the cards 60. Cards corresponding to the desired number of copies of the respective documents are pre-counted and each group or batch of cards is provided with one of the cards 60 which is designated as the "end of batch" card and having machine-controlling signalling means such as a punched aperture 62. Thus, that card of the group of cards to bear the reduced size image of the data contained on the first document of a series is equipped with the "end of batch" signal 62. This "end of batch" card will then appear in order between the cards for the first document and those for the second document. Similarly, end of batch cards are provided between the cards 60 for the second document and those for the third, etc. Fully processed and finished, image-bearing cards are delivered from the machine and the groups or batches of predetermined numbers of cards bearing the images of the respective documents 57 are stacked in the order of the documents.

In order to attain high speed, the machine is a synchronous, flow type, as distinguished from a step-and-repeat type apparatus. A stack of the documents 57 to be reproduced is loaded into a document magazine 63 in the upper front portion of the machine (FIG. 1) and fed from there to a document handling drum 64 (FIG. 3) from which the documents are returned to the magazine 63 after the desired number of images have been reproduced therefrom.

Figure 3:
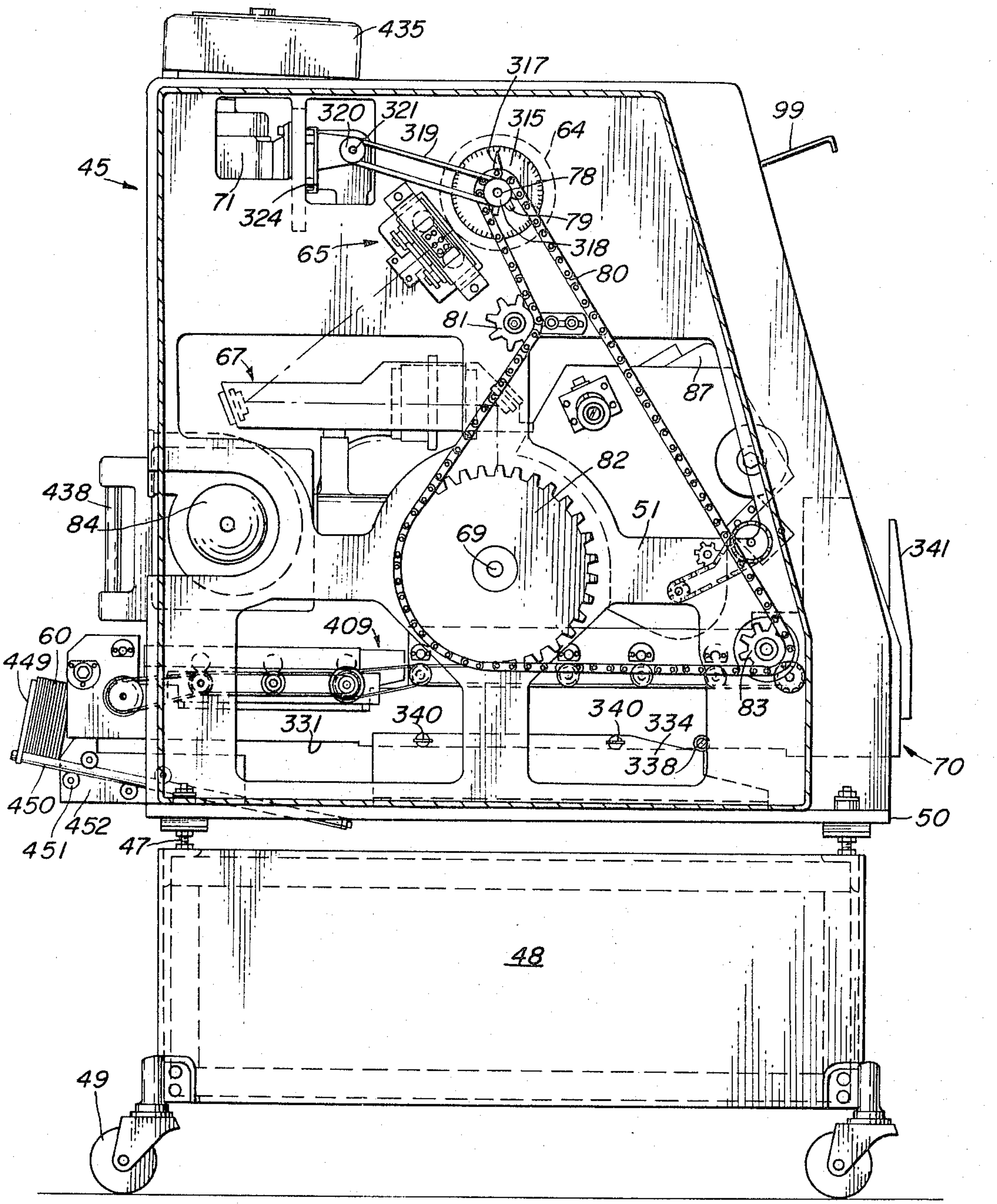
FIGURE 3 is a left side sectional elevational detail view taken substantially on the line 3—3 of FIGURE 1.

For synchronous, flow type operation, as distinguished from step-and-repeat operation, documents carried by the drum 64 are scanned by a scanning slit camera system including an illumination and scanning slit aperture unit 65 and an optical system 67 (FIGS. 2 and 3). The suitably reduced image is transferred to the image-bearing cards 60 in any desirable manner as, for example, by means of an image-transfer drum 68 rotatably mounted on a shaft 69 journalled in the vertical side frame member 51.

In the lower portion of the machine unit 45, and cooperatively related to the transfer drum 68 is a card handling and processing unit 70. Cards are adapted to be supplied into the front end portion of this unit to be fed one at a time into image-transferring relation to the underside of the transfer drum 68 and then therebeyond to be finally processed and delivered from the machine, in this instance at the rear of the machine.

Principal driving power for motivating the machine is derived from a prime mover in the form of an electric motor 71 (FIGS. 2 and 3). Power from the motor 71 through a transmission 72 drives a pulley 73 over which is trained a flexible driving element such as a belt 74 trained over a document drum driving pulley 75 and adapted to be selectively and adjustably tensioned by a take-up idler pulley 77. A shaft 78 journalled through the side frame members 51 and 52 carries the drum-driving pulley 75 on one end portion thereof and on its opposite end portion carries a sprocket 79 over which is trained a sprocket chain 80 running over a take-up idler 81, a transfer drum driving gear 82 carried by the shaft 69, and a card transport conveyor driving sprocket 83. Thereby driving of the document drum 64, the transfer drum 68 and the card handling system is synchronized. Additional smaller and generally lower power motors are provided as needed for various auxiliary purposes, such as left and right-hand blower actuating motors 84 and 85, respectively, a motor 87 for driving accessories associated with the image-transfer drum 68, etc.

*Document magazine and feeder assembly*

According to the present invention, the document magazine 63 is combined with a document feeder and comprises a bench assembly unit for convenient removable mounting in the machine 45. To this end, the unit 63 comprises a pair of spaced parallel coextensive side frame plates 88 (FIGS. 1, 4, 5 and 5A) which are rigidly secured together by suitable frame cross bars including upper bars 89 located adjacent the front and rear of the assembly, a lower front cross bar 90 and a rear lower cross bar 91. Limited spaced relation is afforded between the outer faces of the side frame plates 88 and the adjacent inner faces of the main frame plate members 51 and 52 and spacer and shroud strips 92 are mounted along the top and front margins of the side plates 88.

Mounting of the magazine and feed unit 63 is effected removably by engaging the lower front margins of the frame plates 88 on respective rigid mounting studs 93 projecting inwardly in coaxial alignment from the main frame plates 51 and 52 and received in respective forwardly opening mounting notches 94 recessed as sockets into the lower front marginal portions of the side plates 88. At the rear of the unit 63 it is supported by resting of the rear edges of the frame plates 88 against a supporting frame bar 95 secured rigidly to and between the main frame plates 51 and 52. Through this arrangement the unit 63 can be readily mounted by moving its front end downwardly to engage the mounting studs in the socket notches 94 and then swinging the unit rearwardly until it comes to rest against the bar 95. In this position, it tilts downwardly and rearwardly as best seen in FIGURE 4.

A supply of the documents 57 in a stack face down and with the first document to be image-reproduced on top is supported on a platform 97 mounted at the front of the unit on the front lower cross bar 90, and at the rear of the unit on a cross bar 98. As a forward extension of the platform 97, a combination supporting plate and front closure door 99 is hingedly mounted on the front end portion of the platform plate 97. In a convenient arrangement, the extension plate 99 has along its rear edge a plurality of right angular downwardly extending hinge flanges 100 extending through respective transverse slots 101 in the platform plate 97. Removably attached to the rear faces of the flanges 100, as by means of screws 101*a*, is a retaining and stop bar 102. In the extended position of the plate 99, the bar 102 bears against the underside of the platform plate 97 as a stop and thereby retains the plate 99 in cantilever supported relation on the forward margin of the platform plate 97 and in generally plane alignment therewith to support the documents 57. In periods of non-use of the machine, the plate 99 is adapted to be swung up as indicated in dash outline in FIGURE 4 to serve as a closure, resting against a downwardly extending front flange 103 of an upper document-receiving platform 104 secured between the unit frame plates 88 above the upper frame bars 89 and affording a discharge receptacle or tray for documents that are returned to the magazine after having been handled by the document drum 64. On its front margin the platform extension and closure plate 99 has a downturned reinforcing and handle flange 105.

On the document supply platform 97 the leading edge of the stack of documents 57 is opposed by a feed orientation ramp 107 (FIGS. 4 and 7) extending upwardly and rearwardly to an elevated rearward feeding guide extension portion 108 of the document supply platform plate which is supported on the lower rear bar 98. Adjacent to each opposite side of the document supply tray defined by the platform 97 and the lead-in ramp 107 is a respective pull-in roller 109 carried independently rotatably on a shaft 110 and arranged to be driven in an infeed direction, so that the high friction perimeter of the rollers will propel the topmost document into the nip of opposed upper respective associated sets of feed-in rollers 111 and lower companion sets of double document restraining rollers 112 (FIGS. 5 and 5A).

Opposing the pull-in rollers 109 are respective idler rollers 113 (FIGS. 4 and 7) which project upwardly through respective clearance apertures 114 in the platform 97 and are mounted on a carrier bar 115 mounted on diagonally downward and rearward guide bars 117 slidably engaging the upper face of the frame bar 91 which is mounted in a tilted or oblique plane as shown. Thereby, adjustment screws 118 threaded upwardly through stationary frame arms 118 are adapted to adjust the roller-carrying block or bar 115 vertically to project the upper portion of the perimeter of the rollers 113 to the most efficient height above the supporting platform plate 97. Normally, biasing means such as tension springs 120 draw the roller bar 115 toward the adjustment screws.

Mounting of the draw-in or pull-in feed rollers 109 is such that they self-adjustably follow the diminishing stack of documents 57. For this purpose, the shaft 110 for these rollers is carried by arms 121 (FIGS. 4, 5, 5A and 6) which are freely pivotally mounted on respective coaxially aligned shafts 122 on which the infeed rollers 111 are corotatively mounted. Driving of each of the rollers 109 corotatively with the feed rollers 111 is effected positively by means such as a pair of friction belts 123 trained over respective pulley grooves 124 at each end of the narrow pull-in roller and trained over respective pulley grooves 125 provided by hubs on the feed rollers 111. Through this arrangement, when a stack of documents is loaded into the magazine, the pull-in feed rollers 109 are raised as a unit through their freely pivoted swinging mounting and permitted to rest gravitationally on the top of the leading end portion of the stack. When the last document in the stack is reached, the idler rollers 113 which oppose the driven pull-in rollers 109 assure free pull-in of the last document and avoid possible frictional resistance to prompt feeding response to the pull-in rollers.

While the rollers 111 are driven in the infeed direction, the opposing sets of rollers 112 are driven on their respective shafts 127 in the reverse direction to prevent the next document in sequence from being fed on through and acting to restrain and hold the next document back until the prior document has passed on through the rollers. For this purpose, the surface frictional properties of the upper feed rollers are greater than the frictional characteristics of the lower reversely driven rollers 112. However, the fictional characteristics of the lower rollers 112 are sufficient not only to restrain the next succeeding document but also to pull apart documents that are not too thoroughly stuck or secured together. The forward force applied by the upper feed rollers 111 is stronger than the reversing force of the lower rollers 112 so that when all of the rollers are in rubbing engagement on a single document, it will be driven forwardly.

After leaving the feed rollers 111, the leading edge of the fed-in document 57 is guided by the plate portion 108 to the nips of peripherally contacting upper and lower register rollers 127 and 128, respectively, located to intercept the advancing document at the inner end of the magazine and feeding unit 63 and operative to effect registration of the leading end of the document with the document drum 64. Mounting of the upper register roller 127 as a freely rotatable press down idler is through a shaft 129 (FIGS. 4 and 6–8) which is carried by its opposite ends on respective rocker arms 130 pivotally carried by respective inwardly extending rigid studs 131 mounted on the respective side frame plates 88. Respective biasing means in the form of torsion springs 132 coiled about the studs 131 with one end anchored to an anchor collar 133 fixed on the associated stud and the opposite spring arm end portion thrusting under tension against the top of the rocker arm 130 cause the idler register roller 127 to thrust normally downwardly against the lower register roller 128 to assure firm driving grip on the document to be fed to the document durm 64. Mounting of the lower register roller 128 is on a shaft 134 journalled in the side frame plates 88 and adapted to be positively driven for document feeding.

Driving of the infeeding rollers 111 and the reversing rollers 112 as well as the positively driven register roller 128 is effected by means of a drive shaft 135 journalled in the main machine frame side plates 51 and 52 in a position adjacent to the lower rear or inner end portion of the magazine and document feed assembly unit 63 in mounted relation. Keyed to the drive shaft 135 is a spaced pair of driving gears 137 and 138 (FIGS. 2, 4 and 7). These driving gears are located for meshing therewith of respective power transmission pinions carried by the feeding assembly, automatically as an incident to mounting the unit 63 in place in the machine.

Power input from the driving gear 137 is through a pinion 139 operatively associated with a magnetic clutch 140 (FIGS. 4, 5A and 7) which is operative through a shaft 141 to control operation of the upper feed rollers 111 and the reversing rollers 112. Suitable bearings 142 along the length of the shaft 141 journal the same on suitable frame structure carried by the lower frame bar 91. Means for driving the reversing rollers 112 comprise respective spur gears 143 keyed to the shaft 141 and meshing with respective pinions 144 keyed to the shafts 127 of the reversing rollers (FIGS. 4, 5 and 5A).

Means for driving the forwardly feeding rollers 111 comprise a pulley secured corotatively on an end portion of the shaft 141 extending through the side frame plate 88 nearest the clutch 140 and having trained thereover a flexible driving member such as a driving belt 147 running over a driven pulley 148 carried by the end portion of a shaft 149 journalled in the unit frame in parallel spaced relation to the feed rollers 111 and carrying a spur gear 150 on its inner end portion meshing with a pinion 151 on the coupled shafts 122 on which the rollers 111 are mounted. While the feed rollers 111 are mounted for free rotation on the shafts 122, respective electromagnetic clutches 152 operatively associated with the feed rollers are constructed and arranged to couple the feed rollers to the shafts. Through this arrangement, operation of the electromagnetic clutch 140 controls running and stopping of the in-feeding rollers 111 and the reversing rollers 112, but the clutches 152 control only operation of their respective feed rollers 111.

For driving of the register roller 128, the driving spur gear 138 on the shaft 135 meshes with a pinion 153 (FIGS. 2 and 5) operatively associated with an electromagnetic clutch 154 in control of a rotary shaft 155 suitably journalled in bearings 157 conveniently in coaxial alignment with the feed roller power transmission shaft 141. Under control of the clutch 154, the shaft 155 drives a wheel such as a pulley 158 keyed to its outer end portion which projects through the adjacent frame side plate 88. This pulley has trained thereover an endless flexible driving element, namely, a belt 159 (FIGS. 2 and 6) engaged over a driven pulley 160 keyed to the outer end portion of the shaft 134 of the driven register roller 128. A suitable adjustable take-up pulley 161 is engaged with the belt 159.

Power for the drive shaft 135 is derived from the drive motor 71 through a power transmission coupled with the document drum driving pulley 75 which has a coaxial driving sprocket 162 rigid therewith (FIGS. 2, 9 and 10A). A sprocket chain 163 is trained over the driving sprocket 162 and over a smaller driven sprocket 164 which is keyed to an end portion of the shaft 135 extending outwardly through the main machine side frame plate 52. A take-up idler 165 adjustably tensions the drive chain 163.

In order to insure that the document fed by the feed rollers 111 will reach the register rollers 127 and 128 square on, means are provided for detecting any skewing or misalignment of the document and effect correction. To this end, a respective leaf spring switch finger 167 is associated with each of the sets of feed rolls 111 to be engaged by the advancing edge of the fed document immediately after the nips of the rolls 111 and 112 (FIGS. 5, 5A and 7). Tension adjustment of the spring fingers 167 is enabled by mounting of the same through a rigid conductor arm 168 attached to an insulator mounting block 169 pivotally attached by means of a pin 170 to a supporting frame part 171 and adjustably locked by means of adjustment screws 172. Each of the leaf spring switch fingers 167 extends across the path of movement of the fed document and electrically normally contacts a metal slip ring 173 mounted to rotate with the respective reversing rollers 112 and through which an electrical circuit is completed by means of a carbon composition brush 174 suitably mounted on the frame bar 91.

If the leading edge of the advancing document cuts the squaring line formed by the two squaring switches to engage and deflect the squaring switch fingers 167 simultaneously and thus open the switches, all of the electromagnetic clutches 140, 152 and 154 are deenergized and the document stops at the squaring line until the clutches are again energized in the operation of the machine to forward the document until the leading edge reaches the registering rollers 127 and 128. However, in the event the leading edge of the advancing document approaches the squaring line askew, that side of the leading edge of the document which opens one of the squaring switches by deflecting the spring finger 167 thereof first will be halted. This is accomplished by deenergizing of the electromagnetic clutch 152 of the associated upper feed roller 111. This stops forward drive on the side portion of the document which has skewed forward, while the forward drive on the opposite side portion is uninterrupted. Therefore, the skew is corrected or at least the angle of skew is diminished. Inherent inertia and delays in the system may cause the document to enter into squaring oscillation briefly but an orientation is quickly reached such that both squaring switches will be open simultaneously and when the document is properly squared the oscillation stops and the clutches are deenergized during the pause so that the magnetic fields in the clutches can collapse to zero, to secure a more symmetrical, uniform drive for the document from the squaring line to the register rollers 127 and 128.

Should two of the documents 57 or one of the documents 57 with another paper attached thereto be fed on by the feed rollers 111, a double document detector functions to deenergize the feed roller clutches 152 whereby to stop the forward motion of the document while the reversing rollers 112 continue to rotate and attempt to separate the muliple feed. For this purpose, a detector member in the form of a roller 173 (FIGS. 4 and 6) is located in the path of the advancing document between the feed rollers 111 and the register rollers 127, 128. For anti-friction reasons, the detector roller 173 bears against an idler roller 174 suitably mounted with its perimeter projecting upwardly through the platform extension 108. When any document passes between the detector rollers 173 and 174, the detector roller 173 is raised by the thickness of the document. For this purpose the detector roller 173 is carried freely rotatably on a rocker member 175 which is pivotally attached to a stud 177 carried by one of the series of mounting frame plates 178 secured at spaced intervals, together with the supporting frame member 171, to a frame bar 179 which is attached at its opposite ends to the side frame plates 88 of the unit 63. When a double document enters between the detector rollers 173 and 174, and the rocket 175 is caused to rock a greater distance than predetermined for the thickness of the individual documents being processed, an upwardly projecting arm 180 on the rocker 175 causes a thrusting stud 181 thereon to break contact between leaf contact fingers of a double detector switch 182. Normal thickness of a document will not cause sufficient rocking or overthrow of the rocker 175 against stabilizing biasing means comprising a tension spring 175a to break the switch contacts.

Mounting of the double detector switch 182 is such that it is adapted to be accurately adjusted for various predetermined thicknesses of document. Accordingly, the switch 182 is mounted on a reciprocably adjustable bracket 183 slidably carried on a supporting panel 184 attached to the top edges of the frame plates 178. Guide studs 185 extending through a front-to-rear guide slot 187 guide the bracket 183 adjustably. For effecting adjustment of the bracket 183, it has an upwardly extending front flange 188 carrying rigidly thereon a nut 189 into which is threaded an adjusting screw 190 which projects forwardly through an upstanding front flange 191 on the supporting panel 184 and has an adjustment knob 192 secured thereto whereby reciprocal front-to-rear adjustments of the bracket 183 and thereby of the switch 182 are effected. Biasing means in the form of a compression spring 193 is interposed between the flanges 188 and 191 to maintain a rearward bias of the bracket 183. It will be observed that the double detector switch adjusting knob 192 is readily accessible through the front of the magazine hopper space defined between the document supply tray platform 97 and the upper returned document supporting platform 104.

Conveniently, a downward and inward deflector throat plate 194 is mounted on the flange 191 to extend downwardly and rearwardly over the front of the feed roll and associated mechanism cooperatively above the guide plate portion 108 adjacent to the feed rolls. While the lower inwardly directed deflector portion of the plate 194 extends under the lower edges of certain of the frame plate members 178 which support various mechanisms including the shafts 122 and 149, suitable cut outs, notches and slots are provided as desirable for clearance of rollers, switches and other parts of the apparatus which must extend therethrough.

In the event a double document activates the double document detector to open the switch 182, it breaks a circuit, such as the common ground return of both of the upper feed roller clutches 152, stopping forward motion of the document. However, the lower reversing rollers 112 continue to rotate, attempting to separate the multiple feed, continuing until either successful or shut-down of the machine occurs. While this is normal operation of the double detector assembly, it can be defeated if a known double document or excessively thick document must be processed, and for this purpose a conveniently accessible defeat switch is mounted adjacent to the adjustment knob 192 and is provided with a suitable switch actuator 195 (FIG. 8).

In order to stop the feeding rollers 111 and the reversing rollers 112 when the leading edge of the document reaches the register rollers 127 and 128 in readiness to be delivered to the document drum 64, a sensing switch 197 (FIGS. 4, 6 and 8) is provided, desirably in the form of a microswitch having a pivoted actuating leaf arm 198 projecting into the path of the document adjacent to the register rollers 127 and 128. Through this arrangement, as the leading end of the squared document actuates the switch arm 198 a normally closed circuit for controlling the feed roller clutch 140 is broken by opening of the switch 197. Thereupon the leading edge of the document engages in the pull-in side of the nips of the register rollers 127 and 128 and buckles a small amount since the register rollers are stationary until the document is called for in the document drum cycle. The slight buckling is desirable to assure positive grip of the leading end of the document instantaneously upon demand and feeding rotation of the driven register roller 128.

In order to accommodate the desirable fine adjustment setting and small microswitch actuation movement and yet permit the slight buckling of the document, the sensing switch 197 is mounted on a rockable carrying member 199 attached by a pivot 200 to the opposite side of the same frame plate 178 to which the double detector rocker 175 is mounted. Biasing means comprising a light compression spring 201 thrusting between the pivoted carrying block 199 and an abutment 202 normally thrusts the carrier 199 rearwardly toward an adjustment screw 203 whereby optimum operative adjustment of the sensing switch is effected, but during buckling of the document and thus shouldering upwardly against the switch actuator arm 198, movement of the arm beyond that necessary for opening the switch 197 causes the switch unit to rock in opposition to the biasing spring 201. Buckling of the document is limited to an extent which the switch actuator arm 198 may swing upwardly as stopped by engagement of its free end portion with the upper register roller shaft 129 which it underlies, as best seen in FIGURES 4 and 8. In this regard, also, the inner end portion of the deflector plate 194 serves as buckle-limiting guard.

From the foregoing it will be apparent that the document magazine and feeder unit 63 not only serves to provide a magazine for a supply of documents and a receptacle for documents returned after processing, but also separates the top document from the magazine supply stack, assures that only a single document is selected, squares the selected document so that its leading edge is parallel with the axis of the document drum 64, prevents double documents from being fed unless by intent, and prepares the selected document for prompt delivery to the document drum 64 on command.

*Document drum*

Correlation of the document feeder assembly 63 with the document drum 64 is such that each of the documents 57 which has been readied at the register rollers 127 and 128 is delivered to the document drum while it remains in continuous cyclical rotation, with suitable timing and controlling means which will cause the register rollers to retain the readied document until the previously processed document, if any, has been cleared and ejected from the drum. Details of the document drum and associated mechanisms are depicted in FIGURES 9 to 21, inclusive.

When the document drum 64 is ready to receive the document 57 in the register roller position, the register rollers 128 and the feed roller system are motivated for feeding the document forwardly along a receiving guide plate 204 (FIGS. 9, 11 and 12) which is disposed substantially tangentially to the lower perimeter portion of the drum and is aligned with a series of transverse guide fingers 205 curved complementary to the drum perimeter and following it a limited distance to guide the leading end portion of the document onto the drum perimeter. Both the plate 204 and the fingers 205 are mounted on a cross bar 207 underlying the drum and extending between and supported by the side frame plates 51 and 52 of the machine.

Delivery feed of the document is coordinated with rotation of the drum 64 to coincide with movement into position of document gripper means carried by the drum comprising a transverse, spaced series of gripper fingers 208 (FIGS. 11, 12 and 21) fixedly mounted on a bar 209 journalled at its opposite ends in bearings 210 mounted on the opposite end portions of a generally L-shaped supporting member 211 set into a complementary longitudinally extending peripheral recess in the drum 64 and provided with a flange portion 212 having its free edge on the perimeter of the drum opposite the free margins of the document gripper fingers 208 and providing an outwardly opening clinching rabbet groove 213 into which the fingers are adapted to press the leading margin of the document (FIG. 19). Normally the gripper bar 209 is urged by biasing means such as a plurality of tension springs 214 into the document-clamping position. At one end these springs are anchored to respective studs 215 on the mounting member 211 and at their other ends are anchored to respective depending studs 217 on the gripper bar.

For opening the document gripper by pivoting the bar 209 in opposition to the biasing springs 214, selectively operable means are carried rigidly by one end portion of the bar, comprising a crank-like lever arm 218 extending inwardly along the adjacent end of the supporting member 211 and carrying a cam follower roller 219 which is engageable with a gripper unlocking or opening cam 220 (FIGS. 11, 14–16, 19 and 20). This cam is a lobed disk peripherally contoured to effect opening and closing of the document gripper in each rotary cycle of the document drum 64, but is mounted to be disabled if the document is to remain on the drum for repeated cycling. For this purpose, the cam 220 is slidably mounted on the drum shaft 78 but is held non-rotative thereon by means such as a pin 221 mounted on and projecting inwardly from the main machine frame plate 52 through an anchoring aperture 222 in the cam disk. Normally the cam disk 220 is biased as by means of a coiled compression spring 223 thrusting toward its outer side to move the cam into position wherein its gripper actuating lobe portion will be in position to be engaged by the follower 219.

Disabling of the gripper control cam 220 for multiple cycling of the document with the drum is effected through a solenoid 224 suitably mounted on a bracket 225 carried by the frame member 52 and having its armature attached to a disabling finger bar 227 reciprocably mounted on guide pins 228 supported by the frame plate 52. On its free end the disabling bar 227 has a chamfer 229 opposing an annular chamfer 230 on the hub of the cam 220 and adapted to ease the finger into a latching groove 231 opening peripherally from the hub. In each revolution of the drum 64, the gripper control cam 220 is shifted outwardly in opposition to the biasing spring 223 by means of a barrel cam 232 carried by an end disk 233 of the document drum and coacting with a complementary barrel cam 234 on the hub of the cam disk. Such outward shifting of the gripper control cam 220 occurs in timed relation to avoid opening of the gripper if a repeat cycle is in order as controlled by the solenoid 224 which maintains the disabling finger bar 227 out of engagement with the latching hub of the control disk when the document gripper is to be opened and closed in any drum cycle, but causes the disabling finger to project into cam disabling latching relation to the latching hub during periods when repeat cycling of the same document is in order. In the latter instance, the chamfered tip 229 of the disabling finger bar 227 snaps into the latching groove 231 when the cam disk 220 is displaced outwardly by interaction of the cams 232 and 234 from the gripper actuating position shown in FIGURE 15 to the inactive position shown in FIGURE 16 and in which the disabling finger bar 227 will retain the cam as shown in FIGURE 14. To accommodate the snap latching action of the finger bar 227, yieldable biasing means in the form of a compression spring 235 about the armature of the solenoid and between the bracket 225 and the adjacent attached end portion of the bar affords a resilient take-up device.

When the document drum 64 is to receive a document, the gripper control cam 220 is released from the cam latch arm 227 so that the gripper bar actuating arm follower 219 rides the lobe of the cam wherein the gripper fingers 208 are held open (FIGS. 11 and 12). As the gripper fingers 208 approach the guide plate 204, the register roller 128 is activated, together with the feed rollers 111 and 112, and the ready document 57 is started in its final delivery feed timed to enter the leading edge of the document between the clamping tips of the gripper fingers 208 and the gripper base afforded by the flange 212 as the gripper fingers reach the position aligned with the guide plate 204. Registry of the leading edge in gripping position is assured by stop lugs 237 carried by the gripper fingers. After the leading margin of the document 57 has entered a distance between the guide fingers 205 so as to be firmly conformed to the perimeter of the document drum and more particularly against the gripper base 212, the follower 219 leaves the gripper-opening lobe of the cam 220 and the gripper is closed by action of the springs 214. This causes the gripper fingers to clamp the leading edge of the document in the gripper base groove 213.

As the document is carried with the drum beyond the tips of the conforming guide fingers 205, the document passes the illumination and scanning slit aperture unit 65 which includes illuminating lamps 238 at opposite sides of an optical path and the document image is continuously progressively reflected through an aperture slit 239. While thus passing the scanning unit, the document is held by means comprising flexible tensioned strands 240 (FIGS. 9, 11 and 12) in smooth firm engagement with the perimeter of the drum to assure sharply focused image reproduction. Each of the strands 240 is anchored at one end to one of the document-conforming fingers 205 and at its opposite end to a bar 241 which is secured at its opposite ends to the machine side frame plates 51 and 52. It will be observed from FIGURE 9, that the document smoothing strands 240 are angled substantially from the direction of rotation so that every bit of the data carried by the document even though momentarily behind one of the strands 240 will nevertheless be fully exposed to the scanner 65 in view of the flow type operation.

If the document feeder has fed out a document but for some reason it does not become attached to the drum, a miss detector functions. Conveniently, such detector comprises a microswitch 242 mounted on a bracket 243 carried by the bar 241 and including a switch arm 244 provided with an antifriction roller 245 riding in an annular peripheral groove 247 (FIG. 12) of the document drum 64 when there is no document on the drum. When at proper time in the cycle of operation a document is on the drum, the switch arm 244 is displaced by engagement of the switch arm roller 245 with the document. If no document is present when it should be in the cycle of drum operation, failure of the missed document switch to be operated will cause eventual shut down of the machine.

After the required number of images to be reproduced have been derived from the document 57 on the drum 64, such document is ejected by opening of the document gripper at the proper time and stripping of the dicument from the drum. This is accomplished a suitable interval beyond the document-scanning zone. Opening of the gripper is accomplished by running of the gripper actuator follower 219 onto the gripper-opening lobe portion of the cam 220. Substantially coincident with such opening of the gripper, a series of ejector pins 248 (FIGS. 12, 20 and 21), of which preferably at least one is associated with each of the gripper finger plates 208, act to life the leading marginal portion of the document from the drum. Each of the ejector pins 248 is reciprocably mounted in a respective guide bore 249 in the gripper supporting member flange 212 and with the ejection tip of the pin at least partially intersecting the gripping area of the drum-perimeter edge of the flange 212 so as to be held against ejection action by the associated gripper fingers 208 while the latter are still in document gripping position. Means for actuating the ejector pins 248 in document-ejecting thrusting direction outwardly relative to the perimeter of the document drum 64 comprise respective biasing coiled compression springs 250 encircling inner end portions which project inwardly from the body of the supporting member 211. At their inner ends, the springs 250 thrust against a thrust flange 251 while at their opposite ends the springs thrust against a thrust collar 252 on the associated ejector pin.

Except during substantially the interval while the document gripper is open, the ejector pins 248 are held in retracted position by a retractor flange 253 which has one margin in engagement with the thrust collars 252 on the opposite side from the biasing spring 250 and its opposite margin fixedly attached to a rocker bar 254. At its opposite end portions, the rocker bar is pivotally mounted on respective bearing members 255 (FIGS. 11 and 13) projecting inwardly from the opposite end portions of the supporting member 211. Suitable clearance notches 257 in respectively the end member 233 of the document drum and a similar opposite end member 258 afford clearance for the rocker bar 254 and enable mounting of the gripper and ejector assembly as a unit on the document drum.

During all but a short interval while the ejector pins 248 must function to eject the document, the ejector controlling rocker bar 254 is maintained in the position wherein the pin retracting flange 253 holds the pins retracted. This is accomplished by means of a crank lever arm 259 (FIG. 13) attached to the end portion of the rocker bar which projects outwardly beyond the drum end 258. A follower roller 260 carried by the arm 259 rides a control disk cam flange 261 on a hub 262 freely concentrically encircling the drum shaft 78 and fixedly secured to the inner face of the machine side plate 51 (FIG. 10). During the brief interval in which the ejector pins 248 must be operative to eject the document, the follower 260 is cleared by a chordal cut out 263 in the cam disk (FIGS. 13 and 20).

For positive stripping of the document 57 after its leading margin has been lifted from the drum by the ejector pins 248, a stripper rake 264 functions to lead the document toward the returned document tray area of the magazine-feeder unit 63. In a desirable construction, the stripper rake 264 comprises a suitably notched out plate strip extending the full length of the drum 64 and having its end portions suitably attached to bracket arms 265 which are pivotally supported by a shaft 267 (FIGS. 9, 11 and 20) journalled at its opposite end portions in the frame side plates 51 and 52 above the forward portion of the document drum 64.

Normally the rake 264 is maintained spaced from the perimeter of the document drum 64 by biasing means such as a biasing spring 268 anchored at one end to a stud 269 projecting from the inner side of the side frame plate 52 (FIGS. 9 and 11) and its opposite end anchored to a stud 270 extending outwardly from the adjacent rake bracket 265.

Lowering of the rake 264 into document stripping position relative to the drum 64 is effected in opposition to the biasing spring 268 by means of a lever 271 having a notch 272 opening from one end thereof in which the stud 270 is engaged. Intermediately the lever 271 is pivotally attached to a stud 273 projecting inwardly from the side frame plate 52. Rocking of the lever 271 about the pivotal axis on the stud 273 is effected as required by means comprising a solenoid 275 mounted on a bracket 276 projecting inwardly from the side frame plate 52 and having its armature 277 pivotally attached to the end of the lever 271 opposite the notched actuating end (FIGS. 9 and 11). Operation of the rake solenoid 275 is effected in timed relation the gripper assembly to shift the rake 264 into document-stripping position when the gripper fingers 208 are opened for ejecting a document that has been processed (FIG. 20).

For gauging the approach of the free end of the document stripping rake 264 to the drum, stop means comprising a pair of adjustable stops 278 (FIGS. 12 and 20) are mounted adjacent to the opposite sides of and in position under the rake to be engaged by a reinforcing flange 279 carried by the lower face of the rake plate. Means such as screws 280 adjustably attach the stops 278 to respective ones of a series of transversely spaced guide or retaining finger plates 281 opposing the drum 64 in spaced relation between the document eject and load positions and serving in multiple cycle transportation of any document on the drum to prevent whipping out of the trailing unattached end portion of the document. Means such as screws 282 secure the guiding fingers 281 to the frame bar 95.

Means are provided cooperating with the stripper rake 264 for guiding the leading end of the document 57 being stripped from the drum 64. Herein such means comprise also a document jam detector should the document become crumpled in the ejector and stripper rake area while moving off of the drum. To this end, a transversely spaced series of document guiding and jam detector fingers 283 overlies the rake and document ejection area in suitably spaced relation (FIG. 20). These fingers extend from a supporting flange 284 of a width to overlie the major length of the document drum 64 which is suitably secured as by means of respective screws 285 at its opposite end portions to mounting bracket members 287 (FIG. 9) carried fixedly on a shaft 288 supported at its opposite ends on rocker brackets 289 journalled on respective pintles 290 mounted to project inwardly in axial alignment from the respective side frame plates 51 and 52. Biasing means comprising respective torsion springs 291 engaged about the pintles 290 have one of their ends anchored to a respective retaining collar 292 and their opposite biasing lever arm portions bearing against the brackets 289 and thrusting the same normally toward the drum 64. This maintains a series of spaced freely rotatable holddown idle rollers 293 carried by the shaft 288 normally in riding engagement with the document drum 64 and any document thereon at a position suitably spaced behind the document eject position and also provides means for maintaining the normal spaced overlying document-guiding position of the fingers 283, these rollers also serve as means for advancing the document with the drum for ejection after the leading end portion of the document has been released by the gripper fingers 208. It will be observed that to complete the perimeter of the drum 64 ridden by the rollers 293, the gripper support 211 is provided with suitable filler blocks 294 (FIGS. 9, 19 and 21).

Should there be a jamming of the document being stripped from the drum 64, upward pressure exerted by the jammed document will raise the guide and detector fingers 283 so that the entire associated assembly lifts on the order of a hinged gate about the axis provided by the pintles 290 and the machine is signalled of the malfunction and in due sequence shut down until the condition can be corrected. This is effected herein by closing of the contacts of a normally open jam detector switch 295 (FIGS. 9, 10, 12, 20 and 42D) suitably mounted on the inner side of the side frame plate 51 and having a leaf spring actuating finger 297 normally maintained depressed against a stop block 298 by a lever arm 299 attached to the adjacent end portion of the flange member 284. Thus, when the jam-responsive fingers 283 are raised in opposition to the biasing springs 291, the arm 299 is raised and the switch actuating arm or finger 297 snaps upwardly to close the jam detector switch 295.

Under normal ejection and stripping conditions, the released document 57 feeds onwardly with the drum 64 into the guide throat defined between the rake 264 and the guide fingers 283 which direct the leading end of the document into the nips of driven take-off rollers 300 and an opposing idler pressure roller 301. The driven rollers 300 are corotatively mounted on the shaft 267. Mounting of the pressure idler roller 301 is in freely rotatably and self-adjustably journalled relation between and on the side frame plates 88 of the magazine and feeder unit 63 in such a manner as to be automatically operatively engaged with the take-out rollers 300 as an incident to mounting of the magazine unit. These rollers 301 direct the stripped document engaged thereby into the receiving tray 104.

Power for driving the take-off roller shaft 267 is derived from the document drum 64 through a ring gear 302 (FIGS. 9, 10 and 13) attached to the end portion of the drum nearest the side frame plate 51 and meshing with an intermediate transmission gear 303 which drivingly meshes with a pinion 304 secured fixedly to the take-off roller shaft 267.

Attachment of the document drum 64 rigidly to the drum shaft 78 is effected by means of screws 305 (FIGS. 10, 10A and 12) which fasten respective hubs 307 on the inner sides of the end disk members 233 and 258 to the shaft by threading of the screws into suitable tapped transverse bores 308 extending diametrically through the shaft for this purpose. Respective flats 309 on the perimeters of the hubs 307, and affording respective bases against which the heads of the screws 305 bottom, are oriented for access through the peripheral opening in the drum 64 before the document gripper assembly carried by the supporting member 211 is mounted. This facilitates mounting of the document drum 64 since the shaft 78 must be manipulated through the journal apertures therefor in the frame side plates 51 and 52 and within which are supported the respective races of anti-friction bearings 310 secured to respective shoulders 311 on the adjacent end portions of the shaft by means of respective nuts 312 threaded onto such end portions. For maintaining the shaft against axial displacement, the outer race of the bearing 310 carried by the frame plate 51 is secured to such frame plate as by means of a retaining flange 313 attached as by means of screws 314 which also secure the cam hub flange 262. Mounted on the outer face of the flange 313 is an indexing dial 315 (FIGS. 3 and 10), and an indexing pointer 317 fixed on the shaft between the nut 312 and the gear 79 affords visual indication on the dial as to the position of the document drum 64 at every point in its rotary cycle.

Mounted on the extremity of the shaft 78 contiguous the driving sprocket 79 is a drive pulley 318 over which is trained a drive belt 319 drivingly engaging over a pulley 320 on a shaft 321 on which is mounted a set of timing cams 322 each of which is operatively associated with a respective control switch 323 connected into the control circuitry of the machine and to which further reference will be had hereinafter. Support for the timing cam shaft 321 and the switches 323 is afforded by a mounting bracket structure 324 mounted on a cross bar 325 secured to and between the side frame plates 51 and 52 and also serving as a mount for the base of the drive motor 71.

In order to enable accurate manual rotary adjustment of the document drum 64, a hand wheel 327 (FIGS. 2 and 10A) is mounted on the end portion of the drum shaft 78 adjacent to the outer side of the frame plate 52. This hand wheel is axially slidably keyed to the shaft and has a cone clutch driving engagement 328 with the hub of the driving pulley 75 which is otherwise freely rotatably mounted on the shaft. Through this arrangement, accurate adjustment of the document drum by turning the shaft 78 through the medium of the hand wheel 327 can be effected before the cone clutch structure 328 is locked in engagement by tightening a manually operable star nut 329 on the shaft against the hub of the hand wheel 327. To facilitate readjustments, back-off biasing means in the form of a compression spring 330 is interposed between the bearing for the pulley 75 and the hub of the hand wheel 327 which will assure positive disengagement of the cone clutch 328 when the star nut 329 is backed off.

*Card handling and processing*

Construction and arrangement of the card handling and processing unit 70 is such that it is adapted to be mounted in or removed from the machine 45 conveniently from the front, and in the assembled relation in the machine is fully coordinated and synchronized in operation with the document feeder 63, the document drum 64 and the image transfer drum 68. To this end, as best seen in FIGURES 22 to 23A, the unit 70 includes an elongated frame narrow enough to fit into the housing of the machine between the side frame plates 51 and 52 over the base plate 50 and cooperatively under the image transfer drum 68. As the main components of the card handling unit frame, respective spaced parallel coextensive elongated left and right side frame plates 331 and 332 extend substantially throughout the length of the unit with suitable cross bars securing the side plates structurally in vertical planes.

For mounting the unit 70 in the machine, respective left and right side tracks 333 and 334 are mounted on the base plate 50 as by means of screws 335 extending through respective base attachment flanges 337. Anti-friction rollers 338 on the side plates 331 and 332 are arranged to ride the tracks 333 and 334 in a front-to-rear direction, with the rear rollers 338 adapted to ride up an inclined track portion 339. Retention of the unit in fully assembled relation is effected by means such as thumb screws 340 secured through the upper margins of the tracks 333 and 334 into the side plates 331 and 332. As will be observed in FIGURES 2 and 3, these retaining thumb screws are readily accessible through suitable access openings provided in the side frame plates 51 and 52 of the machine frame.

On the front end portion of the unit 70 is provided means defining a supply magazine hopper for a supply of the cards 60 to be processed. This comprises at the front, a pair of upwardly extending laterally spaced retaining arms 341 secured to a transverse front end frame bar 342 (FIGS. 24 and 25). At its rear, the card hopper is defined by a vertical transverse frame plate 343 secured between upwardly projecting hopper extension portions 344 on the side plates 331 and 332. A bottom for the hopper is afforded by a horizontal plate 345 having in the forward portion thereof between the guiding and retaining fingers 341, a card manipulation clearance recess registering with a similar recess 348 in the upper portion of the front plate 342. Protection against digital injury, during removing cards from moving feeding mechanism under the hopper is afforded by a guard flange 349 secured inwardly adjacent to the manipulation recesses.

Each of the cards 60 is fed successively from the bottom of the stack in the hopper by means of a pair of feeding blades 350 (FIGS. 24, 25 and 27) aligned with the lower portions of the guide arms 341 and mounted on respective pusher blocks 351 to project upwardly from the front ends of the block just slightly less than the thickness of one of the cards 60 to engage the trailing edge of the lowermost card and propel it through a single card gate under the lower edge of the rear hopper plate 342. Conveniently such gate is provided by a lower anti-friction roller 352 suitably mounted on the rear portion of the bottom plate 345 and under the lower gauging tip of a gate finger 353 (FIGS. 24 and 26) secured to the hopper plate 343.

For card feeding actuation of the feeder blocks 351, they are mounted on a frame 354 slidably supported for front-to-rear reciprocal movement on a pair of guide rods 355. These rods are supported at their front ends on the frame bar 342 and at their rear end portions on a lower transverse frame bar 357 secured at its ends to the side frame plates 331 and 332, with reinforcing and support plates parallel to the side plates 331 and 332 secured between the end portions of the frame bar plate 357 and the front plate 342 and also supportingly engaging the bottom plate 345. Biasing means in the form of a pair of tension springs 359 anchored at their rear ends to the frame bar 357 and at their forward ends to the feeder frame 354 normally urge the feeder frame in card feeding direction.

Retraction of the card feeder frame 354 is effected by a pusher 360 reciprocably mounted on the guide rods 355 and separably engaging against the feeder frame 354. Means for reciprocably driving the pusher 360 comprise a connecting link or rod 361 pivotally attached at one end to the pusher and at its opposite end to a crank arm 362 fixedly secured to an inner end portion of a crank shaft 363. As the crank arm 362 is driven through each cycle of revolution as depicted in the dot dash circle in FIGURE 24, the pusher 360 retreats from the feeder frame 354 which under the influence of the biasing spring 359 follows the retreating pusher in a card feeding stroke. In the return portion of the crank cycle, the pusher 360 thrusts the feeder frame 354 retractionally to the starting point wherein the feeder blades 350 assume a position in front of the edge of the next suceeding card 60 to be fed from the stack. In this starting position, the blades 350 are accommodated within clearance recesses 364 in the lower portions of the hopper arms 341.

In order to control operations of the card feeder for synchronization with the remainder of the machine, and more particularly with the image transfer drum 68, means comprising a latch member 365 (FIGS. 24, 25 and 26) in the form of a bell-crank is mounted on a supporting frame plate 367 in position to oppose card feeding movement of the feeder frame 354 unless a solenoid 368 is energized. To this end, a free end of the latch lever 365 is mounted to project upwardly and forwardly into the path of a keeper bar 369 on the bottom of the feeder frame 354 and is rockable about a pivot 370 to swing the latch arm downwardly out of the path of the keeper bar 369 by action of an armature 371 of the solenoid 368 connected to the end portion of the opposite end downwardly extending arm of the latch lever. Normally the armature 371 is urged forwardly by biasing means comprising a spring 372 whereby to rock the latch lever clockwise as viewed in FIGURE 24 into the full line position wherein the upper forwardly projecting keeper arm opposes the keeper 369, the lower downwardly projecting arm of the latch lever being thrust against a stop 373. Energizing of the solenoid 368 in timed relation to related functions of the machine retracts the armature 371 and swings the latch lever into clearance position as shown in dot dash outline and permits the feeder to function cyclically in a card feeding stroke.

As the fed card 60 passes through and beyond the gate 352, 353, its leading edge passes into a delivery throat defined between a bottom facing plate 374 and the lower rearwarldy turned end portions of a pair of transversely spaced vertically extending spacer strips 375 carried by the inner face of the rear hopper plate 343. From this throat the fed card issues into a card track comprising a series of lower driven rollers 376 and upper weighted idler rollers 377, with their respective shafts journalled in suitable manner in the side frame plates 331 and 332. While the shafts of the driven rollers 376 are journalled in suitable bearings, the shafts of the idler rollers 377 are permitted limited range of free vertical movement for gravitational thrust toward and against the driven rollers.

Driving of the rollers 376 is effected by the driven sprocket 83 (FIGS. 3 and 22) through a shaft 378 journalled through the side frame plate 51 and carrying a driving gear 379 which meshes with a spur gear 380 fixed on the adjacent end portion of the shaft of the first of the driven rollers 376 which also carries a pulley 381 over which is trained a drive belt 382 engaging a double pulley 383 on the shaft of the next driving roller in the series. Each of the driven rollers in turn is coupled drivingly in similar fashion with the next driving roller in the series so that all of the driven rollers operate in synchronism along the card track.

Means are provided for driving the feeder crankshaft 363 from the shaft of the first of the driven rollers 376 in the series. For this purpose, the end of the shaft of such driven roller opposite to the input driven end carries a driving gear 384 (FIGS. 23 and 26) which meshes with a spur gear 385 on a shaft 387 (FIG. 25) journalled through the frame plate 332 and forming part of a gear train comprising a driven gear 388 on the inner end portion of the shaft meshing with a driven gear 389 fixed on the crankshaft 363.

As the fed card enters the nips of the initial driven end idler rollers 376, 377, it trips a pivoted switch actuating bellcrank lever member 390 (FIGS. 24, 26 and 27), and actuates the arm of a snap action switch 391 serving as a card detector in which the contacts are normally open. Also in the card detector circuit with the switch 391 is a snap switch 392 (FIGS. 25 and 29) which is actuated by an accurately adjustable cam 393 carried fixedly on and driven by the crankshaft 363. This switch 392 actuated in timed relation to the card feeder is normally open and is closed to "sample" or pulse the card actuated switch 391 just as the latter switch should be actuated by a card emerging from the card hopper. If no card has actuated the detector switch 391 when the switch 392 is closed the machine is stopped.

Further, on closing of the switch 392 an "end of batch" detector switch circuit is pulsed. If the card 60 being fed has the end of batch hole 62 (FIGS. 22 and 34) an end of batch detector in the form of a wire bristle brush 394 (FIGS. 26 and 28) adjacent to the first of the driven rollers 376 contacts through the end of batch hole a fixed curved switch blade 395 mounted on the hopper wall plate 343 adjacent to the first of the idler rollers 377. Since the end of batch detector is pulsed only when a card intervenes between the brush 394 and the switch blade 395, gaps between cards do not effect the end of batch detector circuit. When the end of batch detector circuit is completed, it signals the document drum circuitry to release the document from which an image has been provided for transfer to the preceding cards associated with the end of batch cards and for the end of batch card. The document feeder is also alerted to deliver the succeeding document to the document drum.

Between the spaced sets of driven and idler rollers 376, 377, transversely spaced and longitudinally extending lower and upper guide bars 397 and 398 associated with respectively the drive rollers 376 and the idler rollers 377 provide a track in which the cards are maintained flat and rapidly transfer from one set of rollers to the other as the cards progress onward in the track.

Feeding and delivery of the cards along the card track should, for purposes of proper synchronization be at uniform narrow intervals. Should any card be out of proper position, or should cards pile up or jam in the track, this will be detected by card-position detector snap switches 399 (FIGS. 22 and 24) of which there may be a suitable plurality mounted on the side plate 331 and located at desired intervals along the track with respective switch actuating arms 400 extending into the path of movement of the cards. These detector switches operate on the principle of sensing the gap between the cards, in effect, the absence of a card at a particular place and instant. Each of the detector switches 399 is sampled once per document drum revolution by a respective cam switch 401 (FIGS. 23 and 26) mounted in association with a timing disk cam 402 which is driven through a gear 403 meshing with the driving gear 384. At the moment of closing of the contacts of the cam switch 401 associated with any particular one of the track switches 399, the contacts of the switch 399 should be open, indicating that no card is under its actuator arm 400. If a card gets shifted from its correct position for any reason, at least one of the detector switches 399 will have closed contacts when sampled by its cam operated switch 401, to stop the machine. The absence of a card will not, of course, be detected by the card track switches 399.

Approximately midway along the card track, the cards 60 run under the image transfer drum 68 which applies to the selected area on the cards respective reduced images of the data derived from the selected documents. Any preferred or suitable method of reduced image transfer may be employed. Means in the present instance comprising diagonally oriented strands 404 (FIG. 22) holds the cards as sheets in smooth image transferring relation to the perimeter of the transfer drum while permitting uniform heating or illumination from one or more members 405 mounted below the drum. One of the upper guide bars 398 extends past an end of the drum 68 as a card stripper.

Beyond the transfer drum, the successive cards 60 carrying respective images of the desired data are engaged on a driven conveyor roller 407 while the opposite end portions are held down thereagainst by weighted idler rollers 408 (FIG. 22A). These rollers drive the cards into means defining a treating or image-setting chamber within a housing 409 (FIGS. 22A, 23A, 30–32) mounted on a carriage 410 supported by the side frame plates 331 and 332.

Within the chamber 409, the cards are subjected to a vapor treatment involving heating. Accordingly, the housing 409 comprises an as nearly as practicable vapor-tight casing comprising a lower generally pan-shaped metal body casing member 411 and a removable cover 412, both of which are adapted to be made from suitable sheet metal. Suitable heat insulation 413 is applied to the casing. Heating means comprising a suitable member of electrical heating elements 414 are suitably attached to the casing members 411 and 412.

Image-bearing cards are delivered into the treating chamber through an entrance slot 415 (FIG. 30) in the front wall of the treatment chamber casing member 411 and are guided by an overhead guide flange 417 and a transversely spaced lower series of guide wires 418 to the first set of a series of lower driven and upper downwardly biased idler rollers 419 and 420 providing a conveyor system through the treating chamber. Each of the idler rollers is mounted in a well 421 receptive of any condensate and the nips of the conveyor rollers are substantially aligned with a plane across supporting and guide lands 422 as provided by the casing member 411 and intervening between the sets of conveyor rollers. As observed in FIGURE 32, the lower rollers 419 afford full support for the cards as they are moved along the conveyor system, but the upper press down idler rollers 420 are constructed to engage only the end margins of the cards, so as to avoid damage to the images on the cards undergoing process in the chamber. Driving of the lower rollers 419 is through the same drive means as for the conveyor rollers in the fore part of the card track by way of pulleys 423 and drive belts 424 (FIG. 22A).

Image processing material in the form of a vaporizable liquid is introduced into the processing chamber through the cover 412 by means of nozzles 425 carried by insulating mounts 427. These nozzles discharge into an evaporator tray 428 supported thereunder from the cover 412 (FIGS. 30 and 31). This tray carries an evaporating heater 429 having thereon a heat diffusing element in the form of a screen 430. A control thermostat 431 is mounted on the diffuser 430. Additional control thermostats 432 and 433 are mounted on the cover 412 spaced from the evaporator assembly.

Means for supplying the nozzles 425 with liquid treating material comprise a conduit system 434 (FIGS. 2, 22A and 30). This conduit system leads from a supply tank 435 conveniently mounted on top of the machine 45 and contains therein successively from the tank to the evaporator a shut off valve 437, a sight gauge 438 and a solenoid valve 439 connected in a pulsing circuit operable to control delivery of liquid to be vaporized to the nozzles 425 in proper quantities as required.

After travelling through the vapor treatment zone in the processing chamber, the cards 60 with the respective images thereon now set are propelled by the last set of conveyor rollers 419, 420 up a ramp 440 (FIG. 30) and under a holddown idler roller 441 by which the leading edge of the treated card in each instance is directed to an exit slit 442 in the rear wall of the lower casing member 411.

As the cards emerge from the processing chamber, they are gripped between a driven take-off roller 443 of substantial diameter and a series of successive press-down idler rollers 444 between which is a guiding deflector plate 445 and directed downwardly toward a stacker roller 447 driven by belts 448 from the take-off roller 443. By the stacker rollers 447, the cards are driven onto a self-enlarging stacker comprising a stacker back plate 449 attached to the rear ends of a pair of coextensive stacker rods 450 riding in an upwardly and rearward direction on rollers 451 carried by a stacker bracket 452 mounted on the machine base plate 50 under the rear card unloading end portion of the card track assembly. As the processed cards 60 are stacked successively in the stacker 449, 450 the stacker rods 450 ride up the roller tracks provided by the rollers 451 against the force of gravity normally tending to return the stacker to starting position.

*Modification with card processing and return track in base*

In FIGURES 35–41 are depicted modifications in the machine wherein the card track unit 70' is essentially the same as the described card track unit 70 in the card magazine and controlled feed portions as well as the card conveying structure up to the image transfer drum, identified as 68' in these figures. It will be understood that to the extent that elements are identified by primed reference numerals in these figures their construction and function is identical or substantially the same as already described in relation to the same elements under unprimed reference numerals. The following description will therefore be directed primarily to modifications and additions.

Similarly as in the foregoing description, one of the upper track bars 398' (FIGS. 35 and 38) is extended past the left-hand end of the image transfer drum 68' to serve as a stripper for the cards which pass under the drum. Supporting strands 404' and a supporting bar 406' support the cards as they pass in image receiving relation under the transfer drum. At the right end of the drum adjacent to the image receiving area on the cards, a stripper strand 453 which may be in the form of a guide wire connected at one end to a fixed stud 454 and at its opposite end to a tensioning lever 455 engages the adjacent upper face of the end margin of each of the cards passing the drum. For yieldable tensioning pull of the lever 455 on the strand 453, the lever is intermediately pivotally mounted as at 457 and has biasing means in the form of a tension spring 458 normally urging the lever in strand tensioning direction. Coactive with the stripper strand 453 is a guide strand such as a wire 459 which engages under the cards to support them in image-receiving relation to the transfer drum 68' while in transit. This card supporting and guiding wire 459 is desirably laced over a suitable set of supporting and guide studs 460 in over and under fashion as best viewed in FIGURE 38, with one end anchored to a stud 461 to which is also secured the end of tensioning means in the form of a spring 362 having its opposite end attached to the remaining end of the guide strand 459 and thereby maintaining it under suitable yieldable tension. If preferred, a set of the strands 459 may be provided to replace the supporting strands 404'.

Beyond the image transfer drum 68', the stripped image bearing cards are engaged upon endless conveyor belts 463 (FIGS. 35, 39 and 29) comprising a continuation of the card track conveyor system driven through a drive shaft 464 which is powered by a drive belt 465 from the end of the train of drive belts and pulleys actuating the conveyor rollers 376'. Above and parallel to the shaft 464 is mounted a shaft 467 on which is a presser roller 468 which engages the stripped card leaving the transfer drum in each instance adjacent to its non-image end and presses it against the underlying conveyor belt 463. This assures onward movement of the respective cards to and under a succession of weighted idler rollers 469 carried by longitudinally extending guide bars 470 in overlying relation to those conveyor belts 463 which underlie the non-image bearing portion of the cards. Convenient anchorage of the roller and guide bars 470, enabling upward swinging manipulation thereof for clearing any card jam, is on the shaft 467 as best seen in FIGURE 35.

From the belt conveyor, the image-bearing cards are delivered to a transfer flipper gate 471 (FIGS. 35, 37 and 39) by which the cards are successively and in the continuous operation of the machine placed upon a reversely running conveyor 472 forming part of a card track and image setting system mounted in the base 48' of the machine (FIG. 36).

In a desirable form, the transfer gate 471 comprises a rocker bar 473 providing a back stop toward which the cards are delivered from the conveyor belts 463. Projecting forwardly from the back stop bar 473 are two spaced pairs of spaced parallel rigid support bars 474 lying in a common plane and with each pair connected by a card retaining flange bar 475. As best seen in FIGURE 39, each of the flange bars 475 is of a length to clear between an adjacent pair of the conveyor belts 463 and in the raised position of the transfer gate located at a lower elevation than the upper card-carrying flights of the conveyor belts. The card support provided by the transfer gate 471 is sufficiently longer than the width of one of the cards to enable full reception of the successive cards at relatively high speed to drop thereonto from the conveyor belts 463 and if there is any rebound of the card on striking the back stop bar 473 come to rest with its previously trailing edge opposing the retainer flange bars 475.

Means are provided for rocking the gate bar 473 in timer relation to delivery of the successive cards thereto for swinging the transfer gate downwardly to deliver the gated card to the reversing conveyor 472 and return for the next successive card as it is delivered from the conveyor belts 463. For this purpose, the rocker-stop bar 473 is mounted on a rock shaft 477 (FIGS. 37, 39, 40 and 41) at one end carrying a rigid lever 478 provided with a follower 479 riding a timing disk cam 480 mounted on a shaft 481 driven by means such as a pulley and driving belt assembly 482 motivated at the proper speed through a gear train 483 from the conveyor belt driving shaft 464. In each complete revolution of the timing cam 480, the transfer gate 471 is oscillated from the card receiving position as shown in FIGURES 39 and 40 into the card delivery or discharge position relative to the reversing conveyor 472 as shown in FIGURE 41, and then return to the card receiving position. Means are provided for assuring retention of the successive cards on the transfer gate 471, herein comprising mild air pressure conveniently in the form of a suction down through the transfer gate effected by a suitable fan 484 mounted in the machine below the gate and adjacently below the cooperating portion of the reversing conveyor 472.

Construction and operation of the reversing conveyor 472 is such that as it receives the respective cards from the transfer gate 471, the cards are transported rapidly out of the way of the gate. To this end, the reversing conveyor 472 is mounted at a relatively steep angle downwardly and forwardly and comprises a plurality of spaced parallel coextensive endless conveyor belts 485 supported by a conveyor frame 487 having its upper end adjacent to the lower edge of the rocker-stop bar 473 of the gate and extending downwardly through an opening 488 in the rear portion of the base plate 50' of the base 48'. Frame structure 489 (FIG. 37) mounts the conveyor frame 487 to the base plate 50'. Clearances 490 in the upper portion of the conveyor frame 487 accommodate the two frame portions 474, 475 of the transfer gate 471 so that in the last portion of the downward transferring swing of the gate it clears between the adjacent conveying runs of the belts 485 and the transferred card clinging to the downwardly running conveyor belts not only gravitationally but also due to the suction of the fan 484 is carried away from the gate and under weighted hold-down rollers 491 thrusting toward the belts 485 engaging the non-image bearing portion of the card.

Power for driving the conveyor belts 485 at preferably a higher rate of speed than the upper horizontal card track conveyor system including the belts 463 is derived from a motor 492 mounted on the underside of the base plate 50' and delivering conveyor driving power through means such as a flexible driving belt 493.

From the lower end of the reversing conveyor 472, the cards are delivered into a treating chamber assembly 409' which, for increased capacity and to accommodate the higher speed of the reversing conveyor provides a longer path of travel within the treating chamber than afforded by the treating chamber assembly 409. Further, in order to accommodate the in-base mounting of the treating chamber 409' it is of generally flaring U-shape as afforded by suitable construction of the lower casing 411' and the cover 412'. Further, the card transport conveyor system comprises lower endless driven conveyor belts 419' and upper hold-down follower belts between which the image-free portions of the cards being processed are engaged. For driving the conveyor belts 419' and 420', a drive belt 494 driven by the motor 492 actuates a pulley gear train assembly 495 including a gear 497 which drives the lower belt 419' and through meshing gears 498 drives the upper holding endless belt 420' in synchronism therewith. Within the treating chamber 409', the images are set on the cards in the same manner as previously herein described.

From the treating chamber 409', the finished image-bearing cards are delivered to a take-off drum 499 over which runs a transversely spaced set of take-off belts 500 leading to a lead-out downwardly and forwardly directed endless conveyor 501 emerging through an opening 502 in the front of the base 48' to discharge the cards into a receiving hopper 503 mounted on the front of the base. Through this arrangement, not only are the cards supplied and fed into the card track assembly 70' at the front of the machine but the cards after having the images applied thereto and processed are delivered at the front of the machine into the hopper 503 below the supply magazine.

*Operation—electrical controls*

Figure 42A:
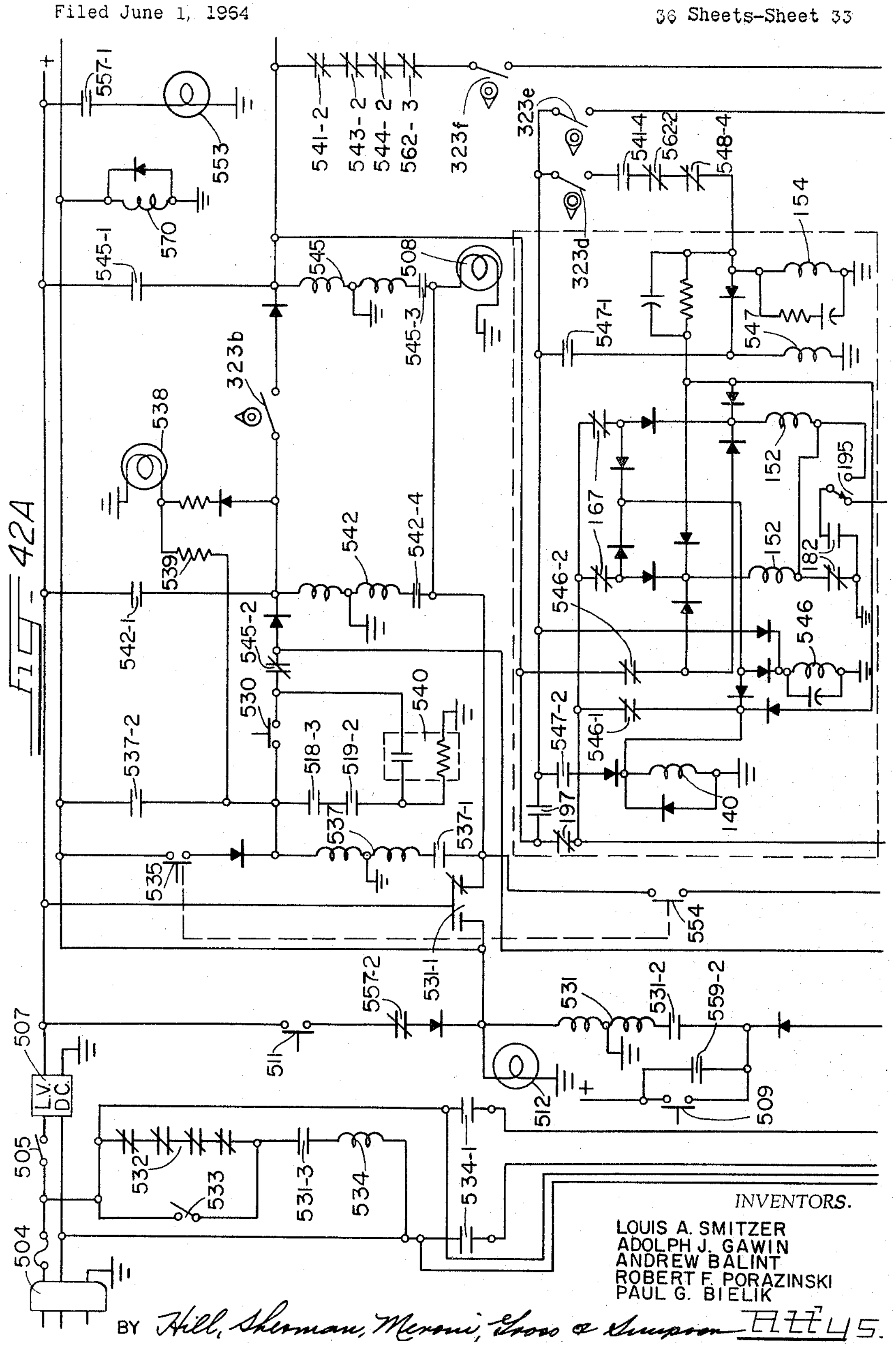
Figure 42B:
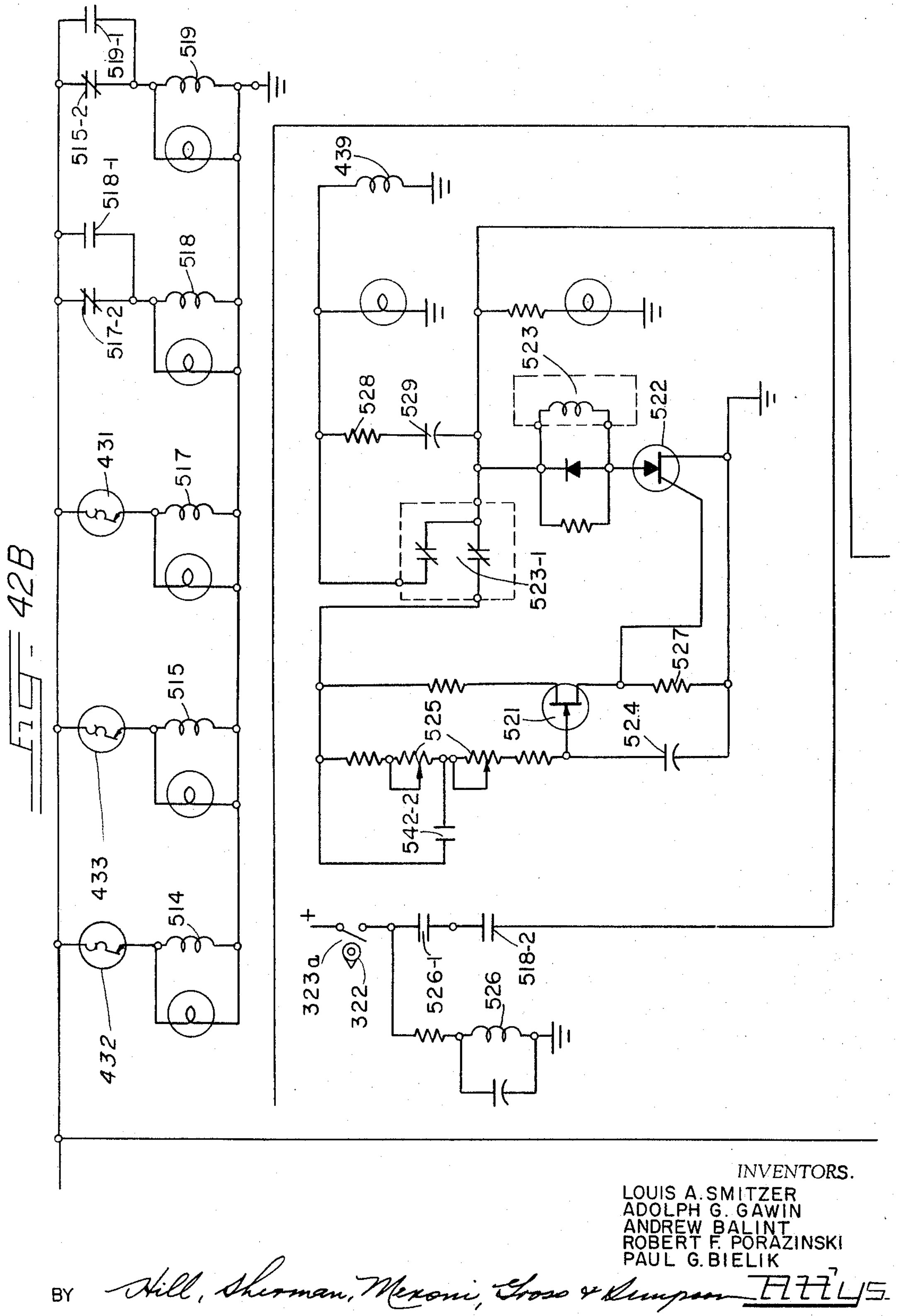
Figure 42D:
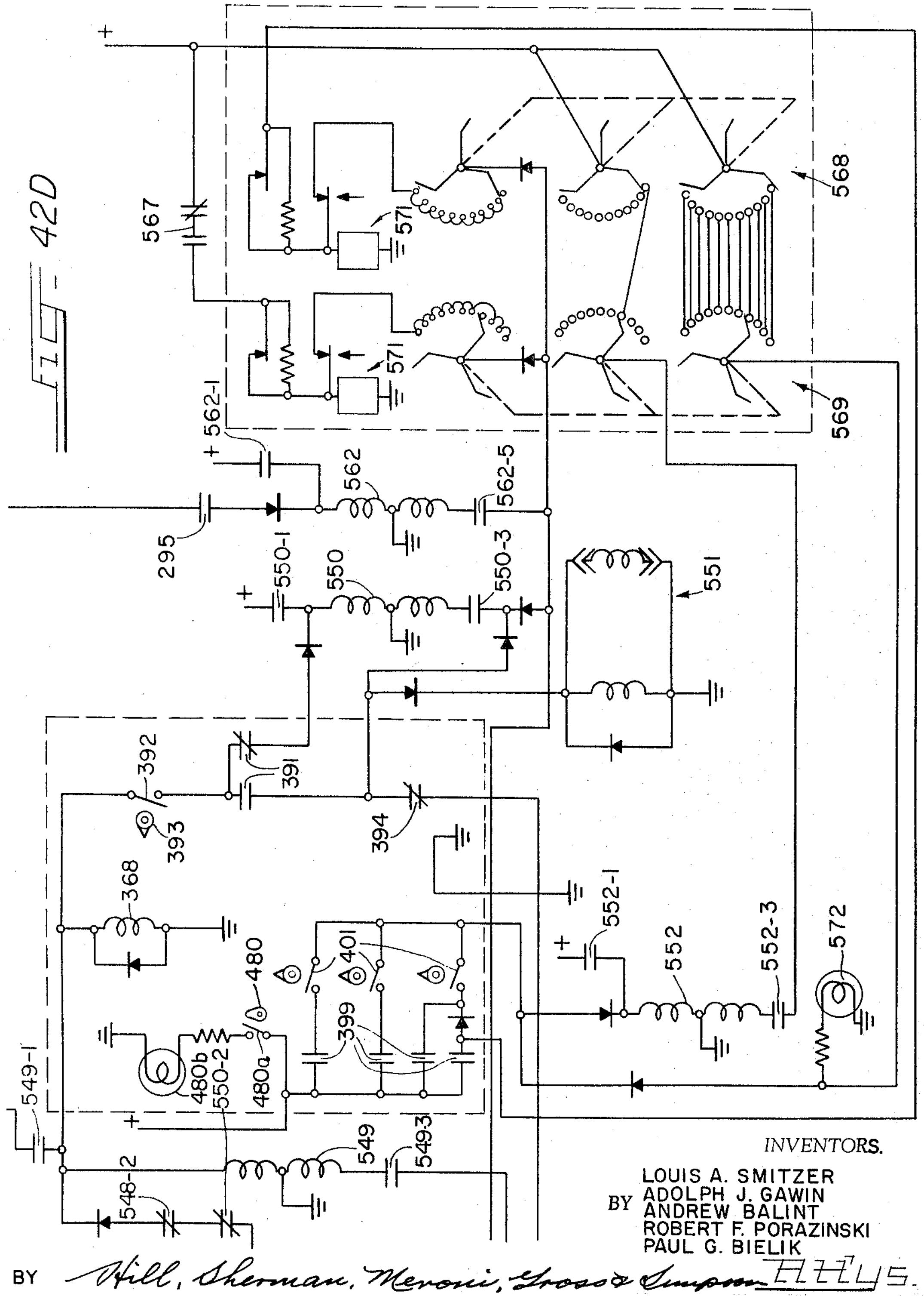

Having reference to FIGURES 42 through 42D, a summary of the sequence of events during operation of the machine is related to the electrical schematic showing the various individual and interrelated controls, detectors, safety devices, etc. In the circuit, all elements are shown as in the inactive, OFF condition of the machine with the document drum at 0°, with the document and card magazines loaded but no document and no card in process in the machine.

After a plug 504 (FIG. 42A) has been connected into a suitable outlet in a power supply such as a 110 volt AC current source, a switch 505 located at any convenient place on the machine is closed to connect into the circuit a low voltage DC power source 507. This causes a signal lamp 508 of an OFF switch 509 conveniently located on an operator panel 510 (FIG. 1) on the front of the machine to light up. Pushing an ON switch 511 lights its associated lamp 512 and initiates a warm-up or preparation step which places the card vapor treating chamber in an operating state. The heaters 414 and 429 (FIG. 42C) are turned on and gradually switched off as the temperature rises. At a certain temperature the vapor forming material is delivered to the evaporator nozzles in the card treating chamber, as metered by pulsing of the solenoid operated valve 439 (FIGS. 2 and 42B). This pulsing control causes the treating liquid to enter the chamber at a high rate at machine start-up and then changes to a flow rate which is adjusted to replace evaporable material as used in continuing operation.

During the warm-up time, the blowers 84 and 85 and the card transfer blower 484 start; the lamps 238 and the conditioning lamp or heater 405 are turned on or energized through respective ballasts; the motor 87 is energized; and the drive motor 71 started, although it may be subsequently energized under the control of a switch 513 if desired.

From a cold start, fast acting relays 514, 515 and 517 (FIG. 42B) are energized before slow acting relays 518 and 519 can actuate. The relay 518 is energized and locks through contacts 518–1 when the relay 517 is deenergized, and the relay 519 is energized and locks through contacts 519–1 when the relay 515 is deenergized. As soon as the predetermined operating temperature of the evaporator thermostat 431 is attained, it causes the relay 517 to deenergize and the relay 518 to energize. As soon as relay contacts 518–2 close metering of the card treating fluid can start.

One of the main timing switches 323 (FIG. 9), and identified in FIGURE 42B as **323*a*, is set to provide a predetermined pulse to the pulsing circuit for the solenoid valve 439 for each revolution of the document drum 64**. This pulsing circuit is an adjustable electronic time delay circuit which takes the pulse input and provides a predetermined pulse which opens the fluid controlling valve to pass the predetermined amount of liquid during normal operation. During warm-up, a preferably longer pulse is generated to permit a larger quantity of liquid to pass during each pulse.

Initially the treating chamber heaters 414 are connected directly to line voltage through closing of relay circuits 514–1 and 515–1 (FIG. 42C) to shorten warm-up time. After a predetermined temperature has been reached, relay 514 is deenergized by its thermostat 432, thereby opening contacts 514–1. The heater voltage is now reduced to operating value by an adjustable control 520. When full operating temperature is reached, the relay 515 is deenergized by its thermostat 433 and the contact 515–1 opens, turning off the heater power until decreasing temperature again cycles the thermostat 433 associated with the relay 515. As the relay 515 is deenergized, slow acting relay 519 is energized and locks, closing contact 519–2 (FIG. 42A). Since contact 518–3 is already closed, closure of contact 519–2 starts a time delay if document feed has been signaled before the solvent pulser is switched to its short pulse mode and document feed cycle is initiated. This delay is for the purpose of providing sufficient time to purge the card treating chamber in case the machine is restarted quickly after a stoppage caused by any malfunction. Under such circumstances, both the card treating chamber and the evaporator might already be near operating temperature. Document feed could therefore start almost simultaneously with treating liquid flow and the few seconds before the first card enters the treating chamber would be insufficient to establish a saturated vapor atmosphere.

In the typical solenoid valve pulser circuit shown in FIGURE 42B, the unijunction transistor 521 in a timing circuit is used to trigger a silicon controlled rectifier 522 which controls a relay 523 controlling the pulsing valve solenoid 439 through contacts 523–1. A capacitor 524 begins to charge up through its series resistor network 525 and the contacts 523–1 at the same time. Turning on of the transistor 521 discharges capacitor 524 after a period of time which is directly proportional to the amount of resistance in series with the capacitor 524. Full, adjusted resistance is used during warm-up in order to generate longer pulses and a higher rate of liquid flow. Solenoid pulse duration is shortened for normal operation by shorting out part of the series resistance in the capacitor charging circuit. Closing of the circuit through the timing cam switch **323*a* energizes a mercury wetted bounce eliminator relay 526 to close contacts 526–1. The pulse produced across a resistance 527 when the transistor 521 turns on triggers the rectifier 522 into conduction, thereby energizing the relay 523. This causes the contacts 523–1 to open, closing the liquid supply valve and disabling the timing circuit. Contact protection for 523–1 is provided by a resistance 428 and capacitor 529. The relay 523 is kept energized by the silicon controlled rectifier 522** until the end of the input pulse, whereupon the removal of voltage from the circuit resets everything for the next cycle.

Should it be desired to eliminate the card processing chamber warm-up cycle during servicing, a delay override switch 530 is adapted to be closed.

In addition to energizing of the card processing chamber control relays, closing of the ON switch 511 energizes a relay 531 which locks up through contacts 531–1 and closes contacts 531–2. This effects lighting of the ON lamp 512, and the OFF lamp 508 is turned off. At the same time, if all of a set of normally closed interlock switches 532 are closed or a normally open defeat switch 533 is closed, the main drive motor 71, the blowers 84 and 85, the motor 87, the fan motor 484, the lamps 238 and the conditioning element 405 are energized by closing of contacts 531–3 and energizing of a relay 534 to close contacts 534–1.

Figure 1:
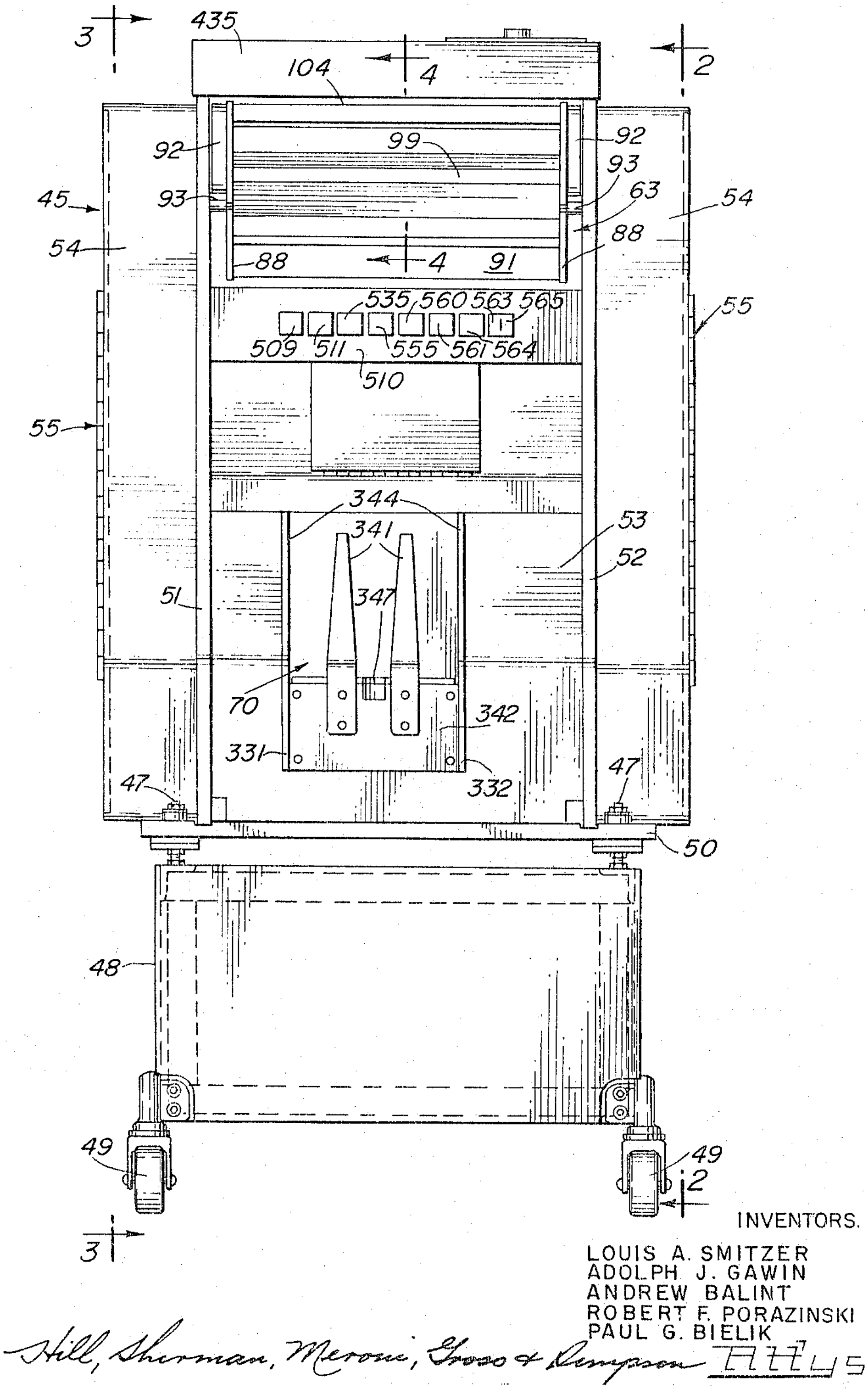
FIGURE 1 is a front elevational view of a machine embodying features of the invention.

At any time during the warm-up cycle or after, a feed switch 535 may be closed by pushing a button on the operator control panel 510 (FIG. 1). This energizes a relay 537 which closes a contact 537–1 and locks through its contact 537–2. A feed button illuminating lamp 538 lights dimly through a connection afforded through a resistance 539 in a circuit closed through contact 537–2.

After the contacts of a thermal delay relay 540 close, the feed button lamp 538 assumes full brightness. At the same time, a relay 541 (FIG. 42C) is energized and locks through a contact 541–1. Also, a relay 542 (FIG. 42A) is energized and locks through a contact 542–1. The pulse length of the treating fluid valve pulser is reduced by closing of contact 542–2 (FIG. 42B) and the flow rate of the liquid is reduced. Closing of a contact 542–3 (FIG. 42C) completes operating circuit through the motor 87 and motor 492. Further, a circuit from the DC power supply to a cam switch **323*b* is completed by closing of the contact 542–1**.

With the relay 541 energized, the rake solenoid 275 and the gripper solenoid 224 are energized by closing of contact 541–1. At the same time, the card feed and detection circuits are disabled through opening of contacts 541–2 (FIG. 42A). Closing of contacts 541–3 closes a circuit including cam switch **323*c* (FIG. 42C) and a no-document relay 543 as well as a double document relay 544. Closing of a contact 541–4 (FIG. 42A) connects the register roller clutch 154 to a timing cam switch 323*d***.

Within two initial revolutions of the document drum 64, the following events take place and are related to positions of the main timing switch as synchronized with the document drum. At 20° to 27° of drum rotation, a start relay 545 (FIG. 42A) is energized by closing of timing cam switch **323*b*, and locks through closing of contacts 545–1, also closing contacts 545–3**. The feed button 535 on the operator panel at the front of the machine is disconnected from a portion of the circuit by opening of contacts 545–2. Closing of the contacts 545–1 also connects the document feeder circuit to the DC supply as well as the clutch 140 and the feed clutches 152 and a slow acting relay 546 which opens contacts 546–1 and 546–2 causing the document to pause when it reaches the squaring line of the switches 167. The document then advances to the register rollers.

On reaching the 233° position of the drum, and with one of the documents in position at the register rollers, the register roller clutch 154 is energized as is also a feeder relay 547 which closes contacts 547–1 and 547–2, energizing the lower reversing roller clutch 140 while the upper feed roller clutches 152 are pulsed. If the document edge sensing switch 197 has not been actuated by a document, the feeder keeps trying to position a document until it is successful or until timing cam switch 323*c* is actuated.

At the 25° position of the drum, with a document being fed to the grippers 208, normally closed contacts of the edge sensing switch 197 are open so that no voltage is connected to the timing switch 323*c* and the cycle continues uninterruptedly. However, should the sensing switch 197 not be actuated by a document, a circuit is completed through normally closed contacts of this switch, through the cam switch 323*c*, and the no-document relay 543 is energized locking through contacts 543–1 and closing contacts 543–4. If the feeding shut-down is due to a double document, the double document relay 544 is energized locking through a contact 544–1 and closing contact 544–5. Contacts 543–2 and 544–2 are opened, the card feed is prevented from starting, and a machine shut-down cycle is initiated.

At the 344° position of the document drum, and a document being fed onto the drum, the gripper relay 541 is released by operation of timing cam switch 323*e*, the gripper and rake solenoids 225 and 275 are deenergized and the gripper holds the document on the drum. At this time, the circuit from the timing cam switch 323*d* to the register roller clutch 154 is opened by opening of the contacts 541–4, and a circuit from the DC supply is completed to timing cam switch 323*f*. Also, the circuit from the cam switch 323*c* to the no-document relay 543 and the double document relay 544 is opened by opening of the contact 541–3.

In the second document drum revolution of the eject-feed cycle, from the 0 to the 100° segment of revolution and assuming a document is on the drum, the feeder begins positioning another document in the register rollers. If, during this time, there is no document on the drum as timing cam switch 323*f* (FIG. 42A) closes, the normally closed contacts of the missed document detector switch 242 (FIG. 42C) remain closed, thereby energizing a relay 548 which locks through contacts 548–1 and also closes contacts 548–5. Normally closed contacts 548–2 (FIG. 42D) and 548–4 (FIG. 42A) open, preventing card and document feed and a machine shut-down cycle is started.

Where a document is properly on the drum in the 0 to 100° portion of the rotary cycle, the normally open contacts of the card detector switch are closed and a circuit is completed to energize a card feed relay 549 (FIG. 42D) which locks through contacts 549–1 and also closes contacts 549–3 and the card feeder solenoid 368 is energized, permitting cards to feed into the card track. Also, DC voltage is connected to the card cam switch 392.

Timing of the card feeder is such that the card pusher 354 is almost fully retracted as the document drum 64 reaches the 70° position. A card should therefore be pushed onto the card track just as soon as the card feeder solenoid 368 is energized. Critical adjustment of the card cam switch 392 causes it to close just as the end of batch brush detector switch 394 is separated from its contact plate finger 395 by the leading edge of the fed card, in order for the end of batch detection circuit to be energized should an end of batch hole be in the card. At approximately the 140° point of document drum revolution, the contacts of the card cam switch 392 are closed by the cam 393. With the card cam switch contacts closed, three possible actions may occur. First, if no card is fed and the card detector switch 391 is not actuated, a relay 550 is energized, locking through a contact 550–1, and a normally closed contact 550–2 is opened breaking the circuit from timing switch 323*f* to relay 549 which, however, remains locked into the energizing circuit therefor. Contact 550–3 is closed and a machine shut-down cycle is started. As a second condition, when the card detector switch 391 is actuated for normal feed, a card counter 551 advances one count. If the end of batch detector switch 394 is closed by detecting an end of batch aperture in the card, the card feed relay 549 is deenergized and card feeding stops, the document on the drum is ejected at about the 90° point of the next drum revolution, and document and card feed cycles resume, beginning at the 233° position of the document drum.

Checking for card position occurs while the machine is running, that is, the cards are checked for position as soon as they are pushed from the card magazine onto the card track, and periodically thereafter until they are transferred to the conveyor beyond the transfer drum. The cards are counted into and out of the treating chamber to make sure that they do not pile up therein. A card out of position at any of the check points provided by the detector switches 399 or a pile-up or excess of cards in the treating chamber will cause a card jam relay 552 to be energized and effect immediate shut-down of the machine. This is visually indicated at the button of the feed switch 535 on the operator panel 510 which changes color, such as from white of the lamp 538 to red from a lamp 553 (FIG. 42A) indicating that the machine is stopped by a malfunction. This is a reminder that before the machine can be restarted, the feed button must be pressed to actuate a CLEAR switch 554 which is suitably coupled to it. This is evidenced by changing of the illumination from red to white as the lamp 538 resumes. Operation of the CLEAR switch 554 releases the locked malfunction detector relays and resets certain switches in the system.

*Response to malfunctions*

While certain malfunction responses have been briefly described hereinbefore, a more detailed examination is believed to be in order in view of the importance in the machine to detect and take appropriate action for effective results.

If there is no document in the document feeder, or if for any reason a document has not been positioned in the register rollers to actuate the edge sensing switch 197, by the time that a document delivery to the document drum 64 is called for, a NO-DOCUMENT shutdown of the machine occurs. At this time the relay 541 is energized and the relay 549 is released. Since the document edge sensing switch 197 is not actuated the relay 543 is energized, opening contact 543–2 in the circuit having timing cam switch 323*f* and the card feed circuits. Closing of relay contact 543–3 effects illumination of a NO-DOCUMENT indicator 555 on the operator panel 510 on the front of the machine. A trouble relay 557 is energized which closes contact 557–1 in the circuit for the red lamp 553 at the feed switch button and opens a contact 557–2 disabling the ON switch 511. The relay 541 is released through the circuit including contact 549–2 and 541–4. A thermal delay relay 558 is energized through a closed contact of a set of contacts 559–1 of a relay 559 which becomes energized as the contacts of the relay 558 close. The document and card feed are thereby stopped and the machine runs for a suitable brief interval to clear out cards that are on the card tracks. As the relay 559 energizes its normally closed contacts 559–1 open and its normally closed contacts 559–1 close, whereby the relay 558 is deenergized and can cool and reset. At this time also, contacts 559–2 close to release the relay 531. This opens contacts 531–3 and deenergizes relay 534, disconnecting power from the motors, etc. Contacts 531–2 transfer, releasing relay 537, relay 542, and relay 545, illuminating the OFF lamp 508, turning off the heaters in the card treating chamber, and the document feeder. The machine is now stopped with the malfunction indication still showing at the feed switch button 535. After correction has been made and the clearing switch 554 pressed, operation is resumed.

Where the double document detection device is switched in by means of the switch 195, and the double document sensing circuit is brought into play by double document, the sequence of events following detection of a double are the same as those just described for a NO-DOCUMENT situation, except that in addition to the relay 543 the relay 544 is energized and locks through contacts 544–3, as well as closing contacts 544–4 to illuminate a double document indicator 560 visible on the operator panel 510 at the front of the machine. Here, again, resumption of operation is effected through the CLEAR switch 554.

If the document feeder has fed out a document, but it did not get on the document drum for some reason, the situation is detected by the miss detector switch 242, as already explained. Since the contacts of the timing switch **323*f*** close once per document revolution, two modes of missed document malfunction action are possible, namely, where the document is missed during an eject-feed cycle, and where it is lost after card feeding has been started.

Where the document is missed during an eject-feed cycle, and the miss detector switch 242 has not been actuated so that its normally closed contacts remain closed, the miss relay 548 is energized which opens the contacts 548–2 and prevent the card feeder circuit from being actuated. Contacts 548–3 close and a missed document indicator 561 illuminates, showing on the front operator panel 510 of the machine. The trouble relay 557 is energized, the trouble lamp 553 illuminates, the ON switch 511 is disabled, the thermal delay relay 558 is energized, and the other sequence of events occurs as described in connection with a NO-DOCUMENT shut-down until the machine stops with the malfunction indicated and the "clear" reminder illuminated. Resumption of operation can be effected after the malfunction has been corrected by again pressing the button to actuate the FEED and CLEAR swtiches 535 and 554.

Card feeding starts during the second drum revolution of an eject-feed cycle so that the machine will continue feeding cards until an end-of-batch signal.

If the document comes off of the drum unintentionally after one or more revolutions, the trouble relay 557 is energized at about the first 73° point in revolution of the document drum after the document is lost. Upon energizing of the relay 557 and illumination of the missed document indicator 561, no further action is taken in the control circuitry until an end-of-batch card is sensed by the detector switch 394. At that time as the relay 541 is energized and the relay 549 is released, the events listed in the NO-DOCUMENT shut-down sequence take place, bringing the machine to a stop. This shut-down cycle starts before a further document can be fed onto the document drum.

Should a document jam occur in the area of the stripper rake 264 causing lifting of the hinged gate 283, 284, contacts of the jam detector switch 295 (FIG. 42D) are closed. This condition occurs at a time that an eject-feed cycle has been started wherein the gripper relay 541 is energized and the card feed relay 549 has been released. As a result of closing of the jam detector switch 295, a document jam relay 562 is energized, locking through contacts 562–1 and closing contacts 562–5. Normally closed contacts 562–2 (FIG. 42A) are opened to break the circuit to the register roller clutch 154 so that no document will be delivered to the document drum. Also, normally closed contacts 562–3 are opened to break the circuit to the miss detector switch 242 and the card feed circuits. At the same time, contacts 562–4 (FIG. 42C) are closed illuminating a document jam detector 563 signalling the malfunction on the front of machine operator panel 510. The trouble relay 557 is energized and the shut-down sequence thereafter progresses as previously described, with a slight delay before the machine is stopped if the document jam is sensed at any time in an eject-feed cycle before card feed relay 549 has been energized. If the card feed relay 549 is energized before the jam is detected, the sequence of events is the same as that when a document miss is detected after the card feeding has started.

A NO-CARD malfunction occurs if card feeding has been started and there are no cards in the card feeder magazine, or if a card fails to feed onto the card track. The circuitry is such that several card feeds can be missed in sequence and then feeding resumed without causing the machine to stop. In this instance, after about 30 seconds with no cards fed, the machine will stop. The conditions for a "no card" detection are that card feeding has been started and a circuit from the DC supply to the card cam switch 392 is completed. If a card has not actuated the card detector switch 391 at the time that the contacts of the card cam switch 392 close, the relay 550 will be energized through the normally closed contacts of the card detector switch 391. Thereupon the release coil of the NO-CARD relay 550 is connected to the normally open contacts of the card detector switch 391 so that a subsequent card feed will release the relay 550. The contacts 550–2 is opened and breaks the circuit from the cam switch **323*f* to the card feed relay 549, but this relay is already locked up through its contact 549–1. Contacts 550–4 (FIG. 42C) close and a NO-CARD indicator 564 is illuminated and shows on the operator panel 510 at the front of the machine. The relay 557 is energized, the red lamp 553 illuminated, the ON switch 511 is disabled and the thermal delay relay 558 is energized. The machine will continue to run, trying to feed cards, until the contacts of the thermal delay relay close and the associated relay 559 is energized, resulting in the sequence of events, previously described, to shut-down of the machine. However, the NO-CARD relay 550 will be relased by the card detector switch 391** if a card is fed during the time this shut-down sequence of events occurs, terminating the shut-down cycle and turning off the panel indicators, and the machine keeps running.

A CARD JAM on the card track between the card magazine and the card treating chamber occurs if any card gets out of position. This condition is also present if too many cards accumulate in the card treating chamber. If either of these faults is detected, the card jam relay 552 (FIG. 42D) is energized, locking through contacts 552–1. Contacts 552–2 close, illuminating CARD JAM indicator 565 which shows on the front operator panel 510 of the machine. At the same time, the red lamp 553 in the feed button illuminates, the ON switch 511 is disabled and the relay 531 is released, the machine coming to a stop by opening of the contacts 531–3 to deenergize the relay 534 and disconnecting the power to the drive motor, etc.

In respect to the card treating chamber, and more particularly the chamber 409′ of FIGURE 37, CARD JAM detection is controlled to assure that no more than a predetermined number of cards are present between the card position detector switch 399′ located immediately before the card transfer gate 471, and a card-out detector switch assembly 567 (FIG. 42D) located at the exit of the treating chamber. In this switch assembly, normally open contacts are closed first by the leading edge of the exiting card which then also causes the normally closed contacts of the switch assembly to open and to remain open until the card has passed, thereby affording a short pulse per card. In the present instance, the arrangement is depicted as oriented for a span accommodating not in excess of seven cards in the area between the detector switch 399' and the switch assembly 567. To detect card jams in this area, two rotary stepping switches 568 and 569 are employed in an add-subtract or accumulator circuit. Each of the stepping switches has three banks of stationary contacts arranged in an arc and a contact or wiper on a rotating shaft makes connection with each of the stationary contacts in sequence as it is driven by suitable means such as a ratchet and pawl (not shown) operated by a solenoid 570 (FIG. 42A) which is energized when the ON switch 511 is closed. Respective relay type contact devices 571 actuated by the solenoid 570 are connected to resetting banks of the switches to operate upon applying voltage to cause the switches to step continuously until a selected "home" position is reached where the switches stop. In addition to the resetting bank, the switches include a second or homing bank and a third or card jam signal bank. Each bank has eleven stationary contacts and each of the switches has three equidistantly spaced stepping arms for each bank.

In the "off" condition of the machine, the stepping switches 568 and 569 are in the relationships shown in FIGURE 42D, namely in the "home" condition wherein in each bank the eleventh contact of the switch 568 is engaged by its stepping contacts and the eighth contact in each bank of the switch 569 is engaged by its stepping contacts. This condition prevails until a card actuates the detector switch 399' causing it to send a pulse to the switch 568 to which it is coupled. This advances the stepping wiper arms of the switch 568 to the next contacts at the end of the input pulse, as the stepping solenoid deenergizes. After seven cards have been counted in, the wiper arm of the switch 568 will be at the seventh contact, while the wipers of the switch 569 will still be at the eighth contact. As the eighth card starts past the card track detector switch 399', a card should be fed out of the chamber 409' and the switch assembly 567 is actuated thereby and supplies a short pulse to the switch 569, stepping it to the ninth contact coordinated so that this step is completed before the switch 568 makes its eighth step. The detecting area now being full of cards, the two stepping switches 568 and 569 will continue counting cards in and out but always maintaining a one step difference in the position of their moving contacts.

If a card fails to leave on schedule, the switch 568 will catch up with the switch 569 and both will be in the same contact relationship. This completes a circuit to energize the card jam relay 552 through the series connected jam signal banks of the two switches, to stop the machine and illuminate a signal lamp 572. However, the treating chamber card track motor 492 continues running and clears the chamber of cards.

Thereafter, the machine can be started by closing the coupled feed and clear switches 535 and 554 and the ON switch 511. This will reset any of the malfunction detector hold relays, except the card jam relay 552, and energize the holding circuits of the stepping switches 568 and 569. Upon reaching the eight-eleven home position relationship, a circuit is closed through contacts 552–3 to the release coil of the card jam relay 552, deenergizing it and returning the card handling apparatus to normal operation.

Associated with the card flipper gate actuating cam 480 is a position detector switch **480*a* (FIG. 42D) causing intermittent lighting of an indicator lamp 480*b***.

*Modification in card treatment*

Where, instead of a liquid treating medium in the card treating chamber, merely a heat treatment is desired, suitable variations in the machine and including the operating circuitry may be effected. On reference to FIGURE 43, a control circuit for a heating element 573 is adapted for fast warm-up and adjustment for thermal lag in the treating area. For this purpose, a variable transformer 574 is used as a variable impedance in series with the heater 573. This variable impedance is driven in a step-wise fashion by a reversible motor 575. This motor is energized for adjustable portions of a fixed cycle by a motor driven warm-up timer 577 or a motor driven cooldown timer 578. The OFF or cool position has 0 heater series impedance. The upper or hot limit is adjustable. In series with the timer 577 is a limit switch 579 and in series with the timer 578 is a limit switch 580, and these switches are connected to one side of the power line through a control switch 581. Control of the power circuit through the heater 573 and the variable transformer 574 is through an on-off switch 582 having coupled contacts in the power lines. Through the switch 582, circuit for a fan motor 583 is controlled and in which circuit there is a thermally responsive switch 584 which closes after a warm-up.

It will be understood that modifications and variations may be effected without departing from the scope of the novel concepts of the present invention.

We claim as our invention:

1. A machine for reproducing on electronic accounting machine type filing cards respective images of data contained on larger size documents, comprising;
   a document magazine assembly having means for successively feeding data-bearing documents therefrom,
   means to receive the successive documents from the magazine assembly and uninterruptedly transport them in a path which returns the documents to the magazine assembly,
   a scanner aligned with said transporting means for scanning each document in said path and operating to project a reduced size image of the document data,
   transfer means to which the reduced size document data images are projected,
   a card magazine having means for feeding cards successively therefrom,
   means for conveying the fed cards into image-receiving relation to and then beyond said transfer means,
   said transfer means applying the reduced images to the successive cards,
   means beyond said transfer means for treating the cards to fix the images thereon,
   a card receiver beyond said treating means,
   and means operative to activate all of said means in continuous cyclical coordination.

2. A machine for reproducing on sheets such as filing cards respective images of data contained on documents, comprising;
   a document magazine assembly having means for successively feeding data-bearing documents therefrom,
   means to receive the successive documents from the magazine assembly and transport them in a path which returns the documents to the magazine assembly,
   a scanner aligned with said transport means for scanning each document in said path and operating to project an image of the document data,
   transfer means to which the document data images are projected,
   a magazine having means for feeding successively therefrom sheets to receive images,
   means for conveying the fed sheets successively to said transfer means,
   said transfer means applying the images to the successive sheets,
   a treating chamber beyond said transfer means having means for treating the images to affix same to said sheets,
   means for conveying the image-bearing sheets from the transfer means and through said chamber,
   a sheet stacker for receiving image-bearing sheets from the machine,
   and means operative to activate all of said means in cyclical coordination.

3. A machine for reproducing on sheets such as filing cards respective images of data contained on documents, comprising;

a document magazine assembly having means for successively feeding data-bearing documents therefrom, means to receive the successive documents from the magazine assembly and transport them in a predetermined path, flow camera type scanner and image applying structures aligned with said path, said image applying structure being operative to receive images from the scanner for applying the images to the sheets, a magazine having means for feeding successively therefrom individual sheets to receive images, means for conveying the fed sheets into image applying relation to the image applying structure to receive the images thereon, a receiver for the image-bearing sheets, and means operative to activate all of said means in continuous cyclical coordination.

4. A machine for reproducing on sheets such as filing cards respective images of data contained on documents, comprising;

a document magazine assembly having means for successively feeding data-bearing documents therefrom, means comprising a rotary drum to receive the successive documents from the magazine assembly and transport them uninterruptedly in a path which returns the documents to the magazine assembly, a flow camera scanning device trained on the documents as uninterruptedly transported thereby and operating to project a reduced size image of the document data, rotary image transfer means to which the reduced size images are projected, a magazine having means for feeding sheets successively therefrom, means for conveying the fed sheets into image-receiving relation to said transfer means and then away therefrom, said transfer means applying the reduced images to the successive sheets, means beyond said transfer means to which the conveying means deliver the image-bearing sheets for treating the image-bearing faces of the sheets to fix the images thereon, and means operative to activate all of said means in continuous cyclical coordination.

5. A machine for reproducing on sheets such as filing cards respective images of data contained on documents, comprising;

a document magazine assembly having means for successively feeding data-bearing documents therefrom, means to receive the successive fed documents and transport them in a predetermined path, structure for producing transferable reduced size images of the document-carried data as the documents are in said path, a sheet magazine having means for feeding sheets successively therefrom, means for conveying the fed sheets into operative relation to said structure to receive respective images thereon, heating and vapor treating means beyond said structure receptive of the image-bearing sheets to fix the images thereon, and means operative to activate all of said means in cyclical coordination.

6. A machine for reproducing on sheets such as filing cards respective images of data contained on documents, comprising;

a document magazine assembly having means for successively feeding data-bearing documents therefrom, means to receive the successive documents from the magazine assembly and transport them in a predetermined path, structure for producing transferable images of the document-carried data as the documents are in said path, a sheet magazine having means for feeding sheets successively therefrom, means for conveying the fed sheets into operative relation to said structure to receive respective images thereon, a sheet-treating chamber beyond said structure and through which chamber the conveying means transports the image-bearing sheets, a supply container and duct for delivering to the chamber a vaporizable treating liquid and including means for controlling delivery of the liquid to the chamber, means for vaporizing the liquid in the chamber, and means for operating and controlling all of said means in cyclical coordination.

7. A machine for reproducing on filing cards and the like respective images of data contained on documents, comprising;

means for transporting data-bearing documents and cards to receive images of the data in separate spaced paths, structure for producing and transferring images of data from the documents and transferring the same to the cards while in said respective paths, a card-treating chamber receptive of the image-bearing cards and through which chamber the cards are transported, a supply container and duct for delivering to the chamber a vaporizable treating liquid and including means for controlling delivery of the liquid to the chamber, a device for receiving the image-bearing cards from the chamber, a means for operating and controlling all of said means in cyclical coordination.

8. A machine for reproducing on filing cards and the like respective images of data contained on documents, comprising;

means for transporting data-bearing documents and cards to receive images of the data in separate spaced paths, structure for producing and transferring images of data from the documents and transferring the same to the cards while in said respective paths, a card-treating chamber receptive of the image-bearing cards and through which chamber the cards are transported, a supply container and duct for delivery to the chamber a vaporizable treating liquid, pulsing valve means in said duct for controlling delivery of the liquid to the chamber, means for vaporizing the liquid in the chamber, and means for operating and controlling all of said means in continuous cyclical coordination.

9. A machine for reproducing on filing cards and the like respective images of data contained on documents, comprising;

means for transporting data-bearing documents and cards to receive images of the data in separate spaced paths, structure for producing and transferring images of data from the documents and transferring the same to the cards while in said respective paths, a card-treating chamber receptive of the image-bearing cards and through which chamber the cards are transported, means for heating the card-borne images in the chamber, means for receiving the cards from the chamber, and means for operating and controlling all of said means in continuous cyclical coordination.

10. A machine for reproducing on filing cards and the like respective images of data contained on documents, comprising;

means for transporting data-bearing documents and cards to receive images of the data in separate spaced paths, structure for producing and transferring images of data from the documents and transferring the same to the cards while in said respective paths, a card-treating chamber receptive of the image-bearing cards and through which chamber the cards are transported, electrical resistance heating means for heating the card-borne images in the chamber, means for receiving the cards from the chamber, and means for operating and controlling all of said means in continuous cyclical coordination including electrical devices comprising a variable transformer serving as a variable impedance in series with the heating means and having a reversible motor controlled by warm-up and cool down timers.

11. A machine for reproducing on filing cards respective images of data contained on documents, comprising:

a frame structure including a base and upstanding parallel spaced substantially coextensive side wall panels, a document magazine and feed unit mounted between the upper portions of said side wall panels and including means for feeding documents successively therefrom, document receiving and carrying means mounted on and between said side wall panels aligned with said magazine and feeder unit and including means for receiving documents successively from the magazine and feeder unit and carrying the documents through a scanning zone and means for returning the documents to the magazine and feeder unit, document scanning and image projection means mounted on and between said walls in alignment with said document receiving and carrying means for scanning the documents as they pass through said scanning zone, an image transfer device mounted on and between said side walls and aligned with said scanning and projection device to receive images projected thereto, an elongated combination card magazine and feed assembly track unit mounted on said base and having an intermediate portion thereof cooperatively related to said transfer device and including a card hopper at one end, means for feeding the cards successively from the hopper, card transporting means receiving the cards from the card feeding means and operative to convey the cards into image-receiving relation to said transfer device and then to transport the image-bearing cards beyond the transport means, means receptive of the image-bearing cards for fixing the images thereon, and a card receiving stacker at the opposite end of the unit receptive of the cards after the images are fixed thereon, and driving means carried by said frame structure and operatively connected to said document magazine and feeder unit, said document receiving and carrying means, said image transfer device and said card track unit for driving the same in continuous cyclical coordination.

12. A machine for reproducing on filing cards respective images of data contained on documents, comprising:

a frame structure including a base and upstanding parallel spaced substantially coextensive side wall panels, a document magazine and feed unit mounted between the upper portions of said side walls panels and including document feeding means, document carrying means mounted on and between said side wall panels aligned with said magazine and feed unit and including means for receiving documents as fed successively from the magazine unit and carrying the documents through a scanning zone, document scanning and image projection and transfer means mounted on and between said walls in alignment with said zone, an image transfer device mounted on and between said side walls and aligned with said scanning and projection device to receive images projected thereto, and an elongated combination card magazine and feed assembly and card track unit mounted on said base and having an intermediate portion thereof cooperatively related to said transfer means and including a card hopper, means for feeding the cards successively from the hopper, card transporting means receiving the cards from the card feeding means and operative to convey the cards into image-receiving relation to said transfer means and then to transport the image-bearing cards beyond the transport means, means receptive of the cards as transported for fixing the images thereon, and a card receiving stacker receptive of the cards after the images are fixed thereon.

13. A machine for reproducing on filing cards respective images of data contained on documents, comprising:

a frame structure including a base and upstanding parallel spaced substantially coextensive side wall panels, a document magazine and feed unit mounted between the upper portions of said side wall panels and including document feeding means, document receiving and carrying means mounted on and between said side wall panels aligned with said magazine and feeder unit and including means for receiving documents successively from the magazine and feeder unit and carrying the documents through a scanning zone, document scanning and image projection and transfer means mounted on and between said walls in alignment with said zone, and an elongated combination card magazine and feed assembly track unit mounted on said base and having an intermediate portion thereof cooperatively related to said transfer means and including a card hopper, means for feeding the cards successively from the hopper, and card transporting means receiving the cards from the card feeding means and operative to convey the cards into image-receiving relation to said transfer means and then to transport the image-bearing cards beyond the transport means.

14. A machine for reproducing on filing cards respective images of data contained on documents, comprising;

a frame structure including a base and upstanding parallel spaced substantially coextensive side wall panels, aligned opposed respective pintles on said side wall panels, a document magazine and feed unit removably mounted on said pintles between the upper portions of said side wall panels, a document receiving and carrying drum mounted on and between said side wall panels aligned with said magazine and feeder unit and including means for receiving documents successively from the magazine and feeder unit, means for returning the documents to the magazine from the drum and feeder unit including document advancing roller means, idler roller means on said unit coactive with said advancing roller incident to mounting the unit, document scanning and image projection and transfer means mounted on and between said walls in alignment with said drum, and a combination card magazine and transfer unit mounted over said base under said drum and having a portion thereof cooperatively related to said transfer means to transport the card into image-receiving relation to said transfer means and then to transport the image-bearing cards beyond the transport means.

15. A machine for reproducing on filing cards respective images of data contained on documents, comprising;

a frame structure including a base and upstanding parallel spaced substantially coextensive side wall panels, a document magazine and feed assembly mounted between the upper portions of said side wall panels, a document receiving and carrying means mounted on and between said side wall panels aligned with said magazine and feed assembly and including means for receiving documents successively therefrom, document scanning and image projection and transfer means mounted on and between said walls in alignment with said document receiving and carrying means and scanning the documents on said receiving and carrying means, an elongated combination card magazine and transport unit, and means removably mounting said magazine and transport unit on said base by longitudinal assembly therewith and with an intermediate portion of the unit cooperatively related to said transfer means.

16. A machine of the character described comprising; supporting structure, a combination document magazine and feeder assembly on said supporting structure, said assembly having vertically spaced document supply and returned document receiving platforms, means for feeding documents successively from the document supply platform, a rotary document drum mounted on said structure in alignment with said assembly and having gripper means thereon receptive of documents fed from said assembly, and cooperating stripper rake and document jam detecting and signalling means providing guide means leading from the drum to said receiving platform.

17. A machine of the character described comprising; supporting structure, a combination document magazine and feeder assembly on said structure, said assembly including means for feeding documents successively therefrom, gripper fingers pivotally mounted on said drum, means normally biasing said fingers into document gripping position, said drum being mounted to bring said fingers into alignment with said assembly at one point in the revolution of the drum, means for opening said fingers at said point to receive the leading edge of a document as fed by said feeding means, and means for guiding the document to said point.

18. A machine of the character described comprising; supporting structure, a combination document magazine and feeder unit comprising a frame supported by said structure, said unit having vertically spaced document supply and returned document receiving platforms, means on said unit for feeding documents successively from the document supply platform and including in succession pull-in roller means followed by opposed feeding roller means and double document restraining reversely running roller means followed by double document detector means followed by register rollers and including means for squaring the leading edges of successive documents in the register rollers, a rotary document drum mounted on said structure in alignment with said unit and having gripper means thereon, means aligned with said register rollers for guiding respective documents from the register rollers into leading edge alignment with said gripper means, flow camera scanning means aligned with said drum for scanning each document on the drum after it is engaged by the gripper means, means for stripping documents from the drum after said scanning means, and means for guiding successive documents from the stripping means onto said receiving platform.

19. A machine of the character described comprising: supporting structure, a combination document magazine and feeder unit comprising a frame supported by said structure, said unit having vertically spaced document supply and returned document receiving platforms, means on said unit for feeding documents successively from the document supply platform and including in succession pull-in roller means followed by opposed feeding roller means and double document restraining reversely running roller means followed by double document detector means followed by register rollers and including means for squaring the leading edges of successive documents in the register rollers, a rotary document drum mounted on said structure in alignment with said unit and having gripper means thereon, means aligned with said register rollers for guiding respective documents from the register rollers into leading edge alignment with said gripper means, flow camera scanning means aligned with said drum for scanning each document on the drum after it is engaged by the gripper means, means for stripping documents from the drum after said scanning means, and means for guiding successive documents from the stripping means onto said receiving platform including propelling roller means adjacent to said receiving platform and presser roller means riding against the document on the drum.

20. A machine of the character described comprising: supporting structure, a combination document magazine and feeder unit comprising a frame supported by said structure, said unit having vertically spaced document supply and returned document receiving platforms, means on said unit for feeding documents successively from the document supply platform and including in succession pull-in roller means followed by opposed feeding roller means and double document restraining reversely running roller means followed by double document detector means followed by register rollers and including means for squaring the leading edges of successive documents in the register rollers, a rotary document drum mounted on said structure in alignment with said unit and having gripper means thereon, means aligned with said register rollers for guiding respective documents from the register rollers into leading edge alignment with said gripper means, flow camera scanning means aligned with said drum for scanning each document on the drum after it is engaged by the gripper means, means for stripping documents from the drum after said scanning means, means for guiding successive documents from the stripping means onto said receiving platform, and means associated with said guiding means for detecting and signalling a document jam while being stripped.

21. In a machine of the character described including a document magazine and feeding assembly comprising a document supporting platform providing a magazine area and having a front extension member pivotally mounted thereon adapted to be swung upwardly as a closure for the magazine area, means cooperating with the rear portion of the platform to define a document guide,
opposed upper feed rollers and lower reversing rollers aligned with said guide,
pull-in rollers coupled with said feed rollers and pivoted for downward engagement upon a stack of documents on the platform to advance the respective upper documents into the feed and reversing rollers, an anti-friction idler roller adjustably mounted to engage the lowermost document below the pull-in rollers,
document edge sensing switches having means associated with the feeder and reversing rollers to detect documents fed therebetween,
a double document switch having sensing means beyond said edge sensing switch means in the direction of movement of the documents by the feed rollers,
register rollers beyond the double document sensing means in the direction of feed of the documents,
a control switch having a detector engageable by the leading edge of the documents to signal the presence thereof at the register rollers,
means for driving said rollers including magnetic clutch means for said reversing rollers and magnetic clutch means for said feed rollers and magnetic clutch means for said register rollers,
electrical control circuitry connected with said switches and said clutch means,
means for adjusting said double document switch to accommodate documents of different thicknesses,
and a double document defeat switch operable to disconnect said double document switch from the electrical circuitry.

22. In a machine of the character described including a document magazine and feeding assembly comprising a document supporting platform,
means cooperating with the platform to define a document guide,
opposed upper feed rollers and lower reversing rollers aligned with said guide,
means for advancing respective documents from the platform into the feed and reversing rollers,
document edge sensing switches including means associated with the feed and reversing rollers to detect documents fed therebetween,
a double document switch having sensing means beyond said edge sensing switch means in the direction of document movement,
register rollers beyond the double document sensing means in the direction of document movement,
a control switch having a detector engageable by the leading edge of the documents to signal the presence thereof at the register rollers,
means for driving said rollers including magnetic clutch means for said reversing rollers and magnetic clutch means for said feed rollers and magnetic clutch means for said register rollers,
electrical control circuitry connected with said switches and said clutch means,
and means for adjusting said double document switch to accommodate documents of different thicknesses.

23. In a machine of the character described including a document magazine and feeding assembly comprising a document supporting platform,
means cooperating with the platform to define a document guide,
opposed upper feed rollers and lower reversing rollers aligned with said guide,
means engageable with respective documents on the platform to advance them into the feed and reversing rollers,
document edge sensing switch and detection means associated with the feed and reversing rollers, register rollers beyond the edge sensing means in the direction of feed of the documents,
a control switch having a detector engageable by the leading edge of the documents as fed to the register rollers,
means for driving said rollers including electro-clutch means for said reversing rollers and magnetic clutch means for said feed rollers and magnetic clutch means for said register rollers,
and electrical control circuitry connected with said switches and said clutch means and responsive to actuation of said control switch to operate the clutch means to halt the feed and reversing rollers.

24. In a machine of the character described including a sheet supply magazine and feeding assembly comprising a sheet supporting platform,
sheet feeding roller means,
means for advancing the sheets seriatim into the feeding roller means,
a plurality of sheet edge sensing electrical devices associated with the feeding roller means to detect sheets fed thereby,
register rollers spaced from the feeding roller means in the direction of feed of the sheets,
means for driving said feeding roller means including electro-clutch means,
and electrical control circuitry connecting said sensing devices and said clutch means,
said clutch means acting in response to said sensing devices to control said feeding roller means to square the documents before feeding to said register rollers.

25. In a machine of the character described including a sheet supply magazine and feeding assembly comprising a sheet supporting platform,
sheet feeding roller means,
means for advancing the sheets seriatim into the feeding roller means,
a plurality of sheet edge sensing electrical devices associated with the feeding roller means to detect sheets fed thereby,
means for driving said feeding roller means including electro-clutch means,
and electrical control circuitry connecting said sensing devices and said clutch means,
said clutch means responding to signals from said sensing devices to control said feeding roller means to square the documents before onward feeding by said feeding roller means.

26. In a machine of the character described including a sheet supply magazine and feeding assembly,
means for feeding sheets from the magazine,
a double sheet detection device having pivotally mounted sheet-engaging sensing means beyond said feeding means in the direction of sheet movement,
a control circuit for said feeding means including an adjustably mounted switch operatively associated with said sensing means,
and means for adjusting said switch on its mount and relative to said sensing means to accommodate sheets of different thicknesses.

27. In a machine of the character decribed including document magazine and feed means,
a document receiving and transport drum for receiving documents fed thereto by the feed means,
document gripper and ejector means on said drum including a pivoted gripper device and ejector pins opposing the gripper device,
respective control means for the gripper device and the ejector pins including cams and followers and an actuating solenoid,
a control switch including a detector cooperating with the perimeter of the drum to determine the presence of a document on the drum,
a shiftably mounted document stripper rake mounted for stripping from the drum documents released from the gripper device and ejected by the ejector pins, actuating means including a solenoid for operating the rake, document guide means coactive with the rake and including a document jam detector switch responsive to pressure of a jammed document against said guide means, and electrical control circuitry including said solenoids and said switches.

28. In a machine of the character described including document magazine and feed means, a document receiving and transport drum for receiving documents fed thereto by the feed means, document gripper and ejector means on said drum including a movable gripper device and ejector means cooperative with the gripper device, respective electrically operable control means for the gripper device and the ejector means, a shiftably mounted document stripper rake mounted for stripping from the drum documents released from the gripper device and ejected by the ejector pins, electrically operable actuating means for operating the rake, and electrical control circuitry for operating said control means and said actuating means.

29. In a machine of the character described including document magazine and feed means, a document receiving and transport drum for receiving documents fed thereto by the feed means, document gripper and ejector means on said drum including a movable gripper device and ejector means cooperable with the gripper device, pressure sensitive document guide means to receive documents ejected from the drum and including a document jam detector switch responsive to pressure of a jammed document against said guide means, electrically energized driving means for the drum, and electrical control means responsive to signal from said switch to stop said driving means.

30. In a machine of the character described including document magazine and feed means, a document receiving and transport drum for receiving documents fed thereto by the feed means, means supporting the drum rotatably, document gripper and ejector means on said drum including a pivoted gripper device and ejector pins opposing the gripper device, and respective control means for the gripper device and the ejector pins including cams mounted adjacent to the drum and held nonrotatable by said supporting means, and followers carried on the drum and respectively engageable with said cams.

31. In a machine of the character described including document magazine and feed means, a document receiving and transport drum for receiving documents fed thereto by the feed means, means supporting the drum rotatably, document gripper and ejector means on said drum including a pivoted gripper device and ejector pins opposing the gripper device, respective control means for the gripper device and the ejector pins including cams mounted adjacent to the drum and held non-rotatably by said supporting means, and followers carried on the drum and respectively engageable with said cams, and means for shifting the cam for the gripper device control into and out of position to be engaged by its follower including a releasable latch.

32. In a machine of the character described including document magazine and feed means, a cyclically rotatable document receiving and transport drum for receiving documents fed thereto by the feed means, document gripper and ejector means on said drum including a pivoted gripper device including plate means and reciprocable ejector pins opposing the plate means, means normally biasing the pins toward said plate means, control means operable in a portion of the drum cycle to open the gripper device for document ejection and next document reception, and means controlling said ejector pins to retract to inactive position away from the plate means for document reception and releasing the pins for ejection biasing toward the open gripper plate during document ejection.

33. In a machine of the character described including supporting structure and document magazine and feed means, a document receiving and transport drum aligned with the magazine and feed means and having document gripper means thereon operable to receive documents fed to the drum to retain the documents for movement with the rotating drum, a shaft rotatably mounting the drum on said support means, means relatively rotatably mounted on said shaft for driving the drum rotatably, and releasable clutch means carried by the shaft and operable to connect said driving means and the shaft corotatably and enabling adjustment of the drum relative to the magazine and feed means when the clutch means is disconnected.

34. In a machine of the character described including supporting structure and document magazine and feed means, a document receiving and transport drum aligned with the magazine and feed means and having document gripper means thereon operable to receive documents fed to the drum to retain the documents for movement with the rotating drum, a shaft rotatably mounting the drum on said support means, means relatively rotatably mounted on said shaft for driving the drum rotatably, an adjustment hand wheel longitudinally movably keyed to the shaft and opposing said driving means, cooperative opposing clutch means on said hand wheel and said driving means, and means on the shaft operable to secure the hand wheel in clutching engagement with said driving means but releasable for declutching the hand wheel to enable rotary adjustment movement of the drum free from said driving means.

35. A machine of the character described comprising; supporting structure including spaced apart side walls, a combination document magazine and feeder unit comprising a frame having side panels spaced apart less than said side walls, means on said frame and said side walls removably supporting said unit between the side walls, said frame having between said panels vertically spaced document supply and returned document receiving platforms, means between said panels for feeding documents successively from the document supply platform and including, in succession, pull-in roller means followed by opposed feeding roller means and double document restraining reversely running roller means followed by double document detector rollers followed by register rollers and including means for squaring the leading edges of successive documents in the register rollers, a document drum mounted on and between said side walls in alignment with said unit and having gripper means thereon, means aligned with said register rollers for guiding respective documents from the register rollers into leading edge alignment with said gripper means, flow camera scanning means aligned with said drum for scanning each document on the drum after it is engaged by the gripper means, diagonally directed smoothing strands holding the document smoothly on the perimeter of the drum while passing the scanning means, means for stripping successive documents from the drum and guiding them onto said receiving platform, and means for driving said feeding and reversing and register rollers and said drum and gripper means and stripping means in controlled cyclical coordination including:

a drive shaft supported by said walls and having a gear thereon, a driven shaft supported by said panels and having a pinion releasably meshing with said gear.

and means on the driven shaft affording a driving coupling for said feed and reversing and register rollers.

36. A machine of the character described comprising; supporting structure including spaced apart side walls, a combination document magazine and feeder unit, means on said frame and said side walls supporting said unit between the side walls, said unit having vertically spaced document supply and returned document receiving platforms, means on said unit for feeding documents successively from the document supply platform, a rotary document drum mounted on and between said side walls in alignment with said unit and having document gripper means thereon, means aligned with said unit for guiding respective fed documents into leading edge alignment with said gripper means, flow camera scanning means aligned with said drum for scanning each document on the drum after it is engaged by the gripper means, and diagonally directed smoothing strands holding the document smoothly on the perimeter of the drum while passing the scanning means.

37. In a machine for acting upon a sheet in transit between a feed point and a discharge point comprising;

a drum, means rotatably mounting the drum with peripheral travel in the direction of transport of the sheets, exposure means mounted adjacent to the drum and the path of movement of the sheets while engaged with the periphery of the drum for effecting electrically energized exposure of the sheets, strands thrusting toward the drum between said exposure means and the drum for pressing the sheets against the drum while undergoing exposure, said strands being disposed diagonally relative to the path of movement of the sheets, and means for maintaining said strands under tension.

38. In a machine for acting upon a sheet in transit between a feed point and a discharge point comprising;

a drum, means rotatably mounting the drum with peripheral travel in the direction of transport of the sheets, exposure means mounted adjacent to the drum and betwen the path of movement of the sheets while engaged with the periphery of the drum for effecting electrically energized exposure of the sheets, strands thrusting toward the drum between said exposure means and the drum for pressing the sheets against the drum while undergoing exposure, said strands being disposed diagonally relative to the path of movement of the sheets, and means for maintaining said strands under tension comprising a tensioning spring and a rockable pivoted tensioning lever.

39. In a machine for acting upon a sheet in transit between a feed point and a discharge point comprising;

a drum, means rotatably mounting the drum with peripheral travel in the direction of transport of the sheets, means mounted adjacent to the drum and between the path of movement of the sheets while engaged with the periphery of the drum for effecting electrically energized exposure of the sheets, strands disposed diagonally relative to the path of movement of the sheets for pressing the sheets against the drum while undergoing exposure, and means for stripping the sheets from the perimeter of the drum comprising a stripper bar adjacent to one end of the drum and under which an end portion of the respective sheets engages.

40. A machine for reproducing on filing cards respective images of data contained on documents, comprising;

a document magazine and feed unit, a document receiving and carrying drum mounted in alignment with said magazine and feed unit and including means for receiving documents successively from the magazine and feed unit and carrying the documents past a scanning zone, a document scanning and image projecting device mounted in alignment with said document drum and scanning the documents on the drum and projecting an image thereof, an image transfer drum mounted to receive images projected by said scanning and projecting device, a combination card magazine and feed assembly and card track assembly mounted to have a portion thereof cooperatively related to said transfer drum for transporting cards into image receiving engagement with the transfer drum, and respective flexible strands holding the documents against the drums.

41. In a machine including means for handling documents and means for transferring images of data on the documents to filing cards, supporting structure having a base, an elongated combination card magazine and transport track including a frame, means on said base providing supporting rails, means on said track frame engageable with said rails by longitudinal movement of the card track frame, means for securing the card track frame to said rails, means at one end of the card track frame providing a card supply hopper, means reciprocably mounted at the bottom of the hopper for feeding cards one at a time from the hopper toward the opposite end of the card track, latch means normally restraining said reciprocably mounted means against card feeding operation, means for selectively releasing said latch means, means for driving said reciprocably mounted feeding means in a card feeding cycle when released from said latch means, conveyor means carried by the card track frame and receptive of the cards from the feeding means to transport the cards longitudinally therefrom along the track into alignment with the image transferring means, means carried by the frame retaining the cards flat as they are transported by the conveyor means, means carried by the track frame for treating the cards after they have been transported beyond the transferring means by the conveyor to fix transferred images on the cards, means at the opposite end of the track for stacking the cards, and means carried by the card track frame and by said supporting structure for driving the reciprocating card feeding means and the conveyor and the stacking means and including a coupling automatically engaged as an incident to mounting of the card track frame on said rails.

42. In a machine including means for handling documents and means for transferring images of data on the documents to filing cards, supporting structure having a base, an elongated combination card magazine and transport track including a frame, means on said base providing supporting rails, means on said track frame engageable with said rails by longitudinal movement of the card track frame, means for securing the card track frame to said rails, means at one end of the card track frame providing a card supply hopper, means reciprocably mounted at the bottom of the hopper for feeding cards one at a time from the hopper toward the opposite end of the card track, means for driving said feeding means in a card feeding cycle, conveyor means carried by the card track frame and receptive of the cards from the feeding means to transport the cards longitudinally therefrom along the track into alignment with the image transferring means, and means carried by the card track frame and by said supporting structure for driving the reciprocating card feeding means and the conveyor and the stacking means and including a coupling automatically engaged as an incident to mounting of the card track frame on said rails.

43. In a machine including means for handling documents and means for transferring images of data on the documents to filing cards, supporting structure having a base, an elongated combination card magazine and transport track including a frame, means on said base providing supporting rails, means on said track frame engageable with said rails by longitudinal movement of the card track frame, means for securing the card track frame to said rails, means at one end of the card track frame providing a card supply hopper, means reciprocably mounted at the bottom of the hopper for feeding cards one at a time from the hopper toward the opposite end of the card track, means for driving said feeding means in a card feeding cycle, conveyor means carried by the card track frame and receptive of the cards from the feeding means to transport the cards longitudinally therefrom along the track into alignment with the image transferring means, and means carried by the track for treating the cards after they have been transported beyond the transferring means by the conveyor to fix transferred images on the cards.

44. In a machine including means for handling documents and means for transferring images of data on the documents to filing cards, a supporting structure having a base, an elongated combination card magazine and transport track including a frame and constructed as a bench assembly unit, means on said base providing supporting rails, means on said track frame engageable with said rails by longitudinal movement of the card track frame into assembled position, means for securing the card track frame to said rails, means carried on one end of the card track frame providing a card supply hopper, means reciprocably mounted at the bottom of the hopper for feeding cards one at a time from the hopper toward the opposite end of the card track, means for driving said feeding means in a card feeding cycle, and conveyor means carried by the card track frame and receptive of the cards from the feeding means to transport the cards longitudinally therefrom along the track into alignment with the image transferring means.

45. In a machine of the character described, a supporting structure, combination card magazine and transport frame, means on said structure supporting said frame, means on the frame providing a card supply hopper, means reciprocably mounted at the bottom of the hopper for feeding cards one at a time from the hopper, latch means normally restraining said reciprocable means against card feeding operation, means for selectively releasing said latch means, means for driving said reciprocable feeding means in a card feeding cycle when released from said latch means, and conveyor means carried by the frame and receptive of the cards from the feeding means to transport the cards therefrom.

46. In a machine including means for handling documents and means for transferring images of data on the documents to filing cards, the machine including a supporting structure, an elongated combination card magazine and transport track including a frame supported on said structure, means at one end of the card track frame providing a card supply hopper, means mounted at the bottom of the hopper for feeding cards one at a time from the hopper toward the opposite end of the card track, means for driving said feeding means, conveyor means carried by the card track frame and receptive of the cards from the feeding means to transport the cards longitudinally therefrom along and toward the opposite end of the track, said conveyor means being aligned with the image transferring means, means for driving said feeding means and said conveyor means, a conveyor extending downwardly and under said frame and having a starting end portion adjacent to and under said opposite end of the card track frame, a transfer gate structure pivotally mounted on said frame and operable to receive successive cards and transfer the same to said downwardly extending conveyor, suction means for holding the cards on the transfer gate structure while being transferred, card treating chamber means through which said downwardly extending conveyor extends to transport the cards transferred thereto through the chamber, means beyond the chamber means for delivering the treated cards below said hopper, and means for driving said downwardly extending conveyor.

47. In a machine including means for handling documents and means for transferring images of data on the documents to filing cards, the machine including a supporting structure, an elongated combination card magazine and transport track including a frame supported on said structure, means at one end of the card track frame providing a card supply hopper, means mounted at the bottom of the hopper for feeding cards one at a time from the hopper toward the opposite end of the card track, means for driving said feeding means, conveyor means carried by the card track frame and receptive of the cards from the feeding means to transport the cards longitudinally therefrom along and toward the opposite end of the track, said conveyor means being aligned with the image transferring means, means for driving said feeding means and said conveyor means,
a conveyor extending downwardly and under said frame and having a starting end portion adjacent to and under said opposite end of the card track frame,
a transfer gate structure pivotally mounted on said frame and operable to receive successive cards and transfer the same to said downwardly extending conveyor,
card treating chamber means through which said downwardly extending conveyor extends to transport the cards transferred thereto through the chamber, and means for driving said downwardly extending conveyor at a higher rate of speed than said conveyor means.

48. In a machine including means for handling documents and means for transferring images of data on the documents to filing cards and the like,
the machine including a base plate,
an elongated combination card magazine and transport track including a frame mounted on top of said base,
means at one end of the card track frame providing a card supply hopper,
means for feeding cards one at a time from the hopper toward the opposite end of the card track,
conveyor means carried by the card track frame and receptive of the cards from the feeding means to transport the cards longitudinally therefrom along the track toward said opposite end,
said conveyor means being aligned with the image transferring means,
a conveyor extending downwardly and under said base and having a starting end portion adjacent to and under said opposite end of the card track frame,
a transfer gate structure pivotally mounted on such opposite end and operable to receive successive cards and transfer the same to said downwardly extending conveyor,
card treating chamber means through which said downwardly extending conveyor extends to transport the cards,
and means attaching said downwardly extending conveyor and said chamber means to the underside of said base.

49. In a machine of the character described,
a base,
an elongated combination card magazine and transport track including a frame on said base,
means at one end of the card track frame providing a card supply hopper,
means for feeding cards one at a time from the hopper toward the opposite end of the card track,
conveyor rollers carried by shafts mounted on the card track frame and receptive of the cards from the feeding means to transport the cards longitudinally threfrom along the track,
and longitudinally extending bars carried by said shafts and retaining the cards flat as they are transported by the conveyor rollers.

50. A machine for reproducing on filing cards respective images of data contained on documents, comprising:
a frame structure including a base and upstanding parallel spaced substantially coextensive side wall panels,
a document magazine and feed unit removably mounted between the upper portions of said side wall panels,
document receiving and carrying means mounted between said side wall panels aligned with said magazine and feed unit and including means for receiving documents successively from the magazine and feed unit and carrying the documents past a scanning zone and means for returning the documents to the magazine and feeding unit,
document scanning and image projection means mounted on and between said walls in alignment with said document receiving and carrying means and scanning the documents as they pass through said scanning zone,
an image transfer device mounted on and between said side walls and aligned with said scanning and projecting device to receive projected images therefrom,
a combination card magazine and feed assembly and card track unit removably mounted on said base below said magazine and feed unit and having an intermediate portion thereof cooperatively related to said transfer means and including
a card hopper,
means for feeding the cards successively from the hopper,
card transporting means receiving the cards from the feeding means and operative to convey the cards into image-receiving relation to said image transfer device and then to transport the image-bearing cards therebeyond,
driving means carried by said frame structure and operatively connected to both of said units and said document receiving and carrying means for operating the same in continuous cyclical coordination,
a reversing conveyor below said base,
means for successively transferring the image-bearing cards to said reversing conveyor from said card track unit,
means associated with said reversing conveyor for receiving and treating the image-bearing cards to fix the images thereon,
and a card receiving stacker receptive of the cards after the images have been fixed thereon.

51. A machine for reproducing on filing cards respective images of data contained on documents, comprising;
a frame structure including a base and upstanding side walls,
a document magazine and feed unit mounted between the upper portions of said side walls,
a document receiving and carrying means mounted between said side walls aligned with said magazine and feed unit and including means for receiving documents successively and carrying the documents past a scanning zone,
document scanning and image projection means mounted on and between said walls aligned with said document receiving and carrying means and scanning the documents as they pass through said scanning zone,
an image transfer device mounted on and between said side walls and aligned with said scanning and projecting device to receive projected images,
a combination card magazine and feed assembly and card track unit mounted on said base and having an intermediate portion thereof cooperatively related to said transfer device,
a reversing conveyor mounted on and below said base,
means for successively transferring cards to said reversing conveyor from said card track unit,
means on said base and associated with said reversing conveyor for treating the cards,
and card receiving means beyond said treating means.

52. A machine for reproducing on file cards respective images of data contained on documents, comprising;
document supply means,
means for feeding documents from the supply means,
means for receiving fed documents and transporting them in a predetermined path,
means for scanning said documents in the predetermined path and projecting an image thereof,
means for transferring each image from a document onto a card,
means for transporting cards successively to the transfer means for receiving respective images thereon,
means for moving the image bearing cards away from the transfer means, means for treating the cards to set the images thereon,
means for receiving the cards after the images have been set thereon,
and means for effecting coordinated operation of all of the aforesaid means and including means responsive to signalling means on certain of the cards for controlling the number of images of any single document to be transferred to successive cards of a series associated with the card having the signalling means.

53. A machine for reproducing on one or more file cards an image of data contained on a document, comprising;
document supply means,
means for feeding documents from the supply means,
means for receiving fed documents and transporting them in a predetermined path,
means for deriving an image of the data on each document in said path and transferring such image onto a card,
means for transporting a series of cards successively into position for receiving the image thereon and one of said cards having end-of-batch signalling means thereon,
and means comprising a detector responsive to said signalling means for controlling the number of successive cards to receive the image.

54. A machine for reproducing on one or more file cards an image of data contained on a document, comprising;
document supply means,
means for feeding documents from the supply means,
means for receiving fed documents and transporting them in a predetermined path,
means for deriving an image of the data on each document in said path and transferring such image onto a card,
means for transporting a series of cards successively into position for receiving the image thereon and one of said cards having an end-of-batch signal hole,
and sensing means comprising a detector switch for completing an electrical circuit through said hole for controlling the number of successive cards to receive the image.

55. A machine for reproducing on file cards respective images of data contained on documents, comprising;
document supply means,
means for feeding documents from the supply means,
means for receiving fed documents and transporting them in a predetermined path,
means for scanning said documents in the predetermined path and projecting an image thereof,
means for transferring each image from a document onto a card,
a stack of cards in which certain cards have signal means to indicate the number of cards to receive the data image from the same document,
means for transporting the cards successively to the transfer means for receiving respective images thereon,
means for moving the image bearing cards away from the transfer means,
and means for effecting coordinated operation of all of the aforesaid means and including means responsive to said signal means for controlling the document feeding and transporting means.

56. In a machine for reproducing on electronic accounting machine cards and the like respective images of data contained on data-bearing documents and which machine includes document supply and feeding means, a document transport drum, a flow camera scanning and projection device aligned with the drum, image transfer means receiving projected images from the device, card supply and transport means arranged to bring the cards into image transferring relation to said transfer means, card treating chamber means, means for transferring the cards from the transport means to the treating chamber means, and electric driving motors having couplings with said various means;
an electrical energizing circuit for said motors and including control switches comprising
an on switch,
an off switch,
a feed switch,
a clear switch coupled with the feed switch,
document sensing switches in said document feed means including
a pair of document squaring switches,
a double document sensing switch,
a document ready signal switch,
and cam switch means,
control switch means for the card transport means including
a card detector switch,
a periodically operated pulsing switch,
and end-of-batch detecting switch responsive to signal means of predetermined cards,
and a series of card positions detecting switches along the path of the transport means,
said document drum having associated therewith missed document and document jam detection switches,
card jam detection switch means associated with said treating chamber means,
and an electrical circuit containing said switches and switch means for automatically controlling operation of the machine and stopping the machine when a malfunction occurs.

57. In a machine for reproducing on electronic accounting machine cards respective images of data contained on data-bearing documents and which machine includes document supply and feeding means, a document transport drum, a flow camera scanning and projection device aligned with the drum, image transfer means receiving projected images from the device, card supply and transport means arranged to bring the cards into image transferring relation to said transfer means, card treating chamber means, means for transferring the cards from the transport means to the treating chamber means, and electric driving motors having couplings with said various means;
electrical motor control switches,
document sensing switches in said document feed means including
a pair of document squaring switches,
a double document sensing switch,
a document ready signal switch,
and cam switch means,
control switch means for the card transport means including
a card detector switch,
periodically operated pulsing switch,
an end-of-batch detecting switch responsive to signal means of predetermined cards,
and a series of card position detecting switches along the path of the transport means,
and an electrical circuit having said switches and switch means therein and including means electrically coupled and correlated and responsive to operation of said switches for automatically controlling operation of the machine.

58. In a machine for reproducing on electronic accounting machine cards respective images of data contained on data-bearing documents and which machine includes document supply and feeding means, a document transport drum, a flow camera scanning and projection device aligned with the drum, image transfer means receiving projected images from the device, card supply and transport means arranged to bring the cards into image transferring relation to said transfer means, card treating chamber means, means for transferring the cards from the transport means to the treating chamber means, and electric driving motors having couplings with said various means;

an electrical energizing circuit for said motors and including control switches, document sensing switches in said document feed means, card sensitive control switches in the card transport means, said document drum having associated therewith missed document and document jam detection switches, a card jam detection switch associated with said treating chamber means, and an electrical control circuit including means energized by operation of said switches for automatically controlling operation of the machine.

59. In a machine for reproducing on electronic accounting machine cards respective images of data contained on data-bearing documents and which machine includes document supply and feeding means, a document transport drum, flow camera scanning and projection device aligned with the drum, image transfer means receiving projected images from the device, card supply and transport means arranged to bring the cards into image transferring relation to said transfer means, card treating chamber means, means for transferring the cards from the transport means to the treating chamber means, and driving means including electric motors having couplings with said various means;

an electrical energizing circuit for said motors and including control switches, document sensing switches in said document feed means, control switches for the card transport means, said document drum having associated therewith missed document and document jam detection switches, card jam detection switches associated with said treating chamber means, electrical circuits and control means in said circuits energized by operation of said switches for automatically controlling operation of the machine and stopping the machine when a malfunction occurs, and timing switches in said circuits and cams operated by said driving means controlling said timing switches.

60. A machine for reproducing on filing cards and the like respective images of data contained on selected documents and including means for feeding documents from a supply, means for scanning and projecting an image of the data on each document in flow camera fashion, means for guiding documents fed thereto by said feeding means past the scanning means, means for feeding from a supply card or the like to receive images, means defining an image transfer zone associated with said card feeding means, and means for treating the cards after they leave said transfer zone and including a chamber through which the cards are transported, electrically energized means for driving the machine and including manual control switches, and means for automatically responding to malfunctions to stop the machine including means for detecting the absence of a document in said document feeding means, means for detecting a double document in said document feeding means, means for detecting a missed document in said document guiding means, means for detecting a document jam, means for detecting the absence of a card in said card feeding means, and means for detecting a card jam in said card feeding means and in said chamber including stepping switches operative to initiate a machine shut-down if a card jam occurs in the treating chamber.

61. A machine for reproducing on filing cards and the like respective images of data contained on selected documents and including means for feeding documents from a supply, means for scanning and projecting an image of the data on each document in flow camera fashion, means for guiding documents fed thereto by said feeding means past the scanning means, means for feeding from a supply card or the like to receive images, means defining an image transfer zone associated with said card feeding means, and means for treating the cards after they leave said transfer zone and including a chamber through which the cards are transported, electrically energized means for driving the machine, and means for automatically responding to malfunctions in said means including stepping switches operative to initiate a machine shut-down if a card jam occurs in the treating chamber.

62. A machine for reproducing on filing cards and the like respective images of data contained on selected documents and including means for feeding documents from a supply, means for scanning and projecting an image of the data on each document in flow camera fashion, means for guiding documents fed thereto by said feeding means past the scanning means, means for feeding from a supply cards or the like to receive images, means defining an image transfer zone associated with said card feeding means, and means for treating the cards after they leave said transfer zone and including a chamber through which the cards are transported, electrically energized means for driving the machine, and means for automatically responding to malfunctions to stop the machine including means for detecting the absence of a document in said document feeding means, means for detecting a double document in said document feeding means, means for detecting a missed document in said document guiding means, means for detecting a document jam, means for detecting the absence of a card in said card feeding means, and means for detecting a card jam in said feeding means or in said chamber.

References Cited

UNITED STATES PATENTS

| | | | |
|---|---|---|---|
| 2,492,127 | 12/1949 | Hessert | 88—24 |
| 3,099,199 | 7/1963 | Bornemann et al. | 88—24 |
| 3,182,549 | 5/1965 | Thompson et al. | 88—24 |

NORTON ANSHER, *Primary Examiner.*

R. A. WINTERCORN, *Assistant Examiner.*